US011661161B2

(12) United States Patent
Bianchi

(10) Patent No.: US 11,661,161 B2
(45) Date of Patent: May 30, 2023

(54) NAUTICAL PROPELLER

(71) Applicant: Massimiliano Bianchi, Milan (IT)

(72) Inventor: Massimiliano Bianchi, Milan (IT)

(73) Assignee: Massimiliano Bianchi, Milan (IT)

(*) Notice: Subject to any disclaimer, the term of this patent is extended or adjusted under 35 U.S.C. 154(b) by 23 days.

(21) Appl. No.: 16/338,030

(22) PCT Filed: Oct. 3, 2016

(86) PCT No.: PCT/IB2016/055904
§ 371 (c)(1),
(2) Date: Mar. 29, 2019

(87) PCT Pub. No.: WO2018/065800
PCT Pub. Date: Apr. 12, 2018

(65) Prior Publication Data
US 2019/0276124 A1  Sep. 12, 2019

(51) Int. Cl.
*B63H 3/00* (2006.01)
*F16F 1/02* (2006.01)
*F04D 29/26* (2006.01)

(52) U.S. Cl.
CPC .......... *B63H 3/008* (2013.01); *F16F 1/025* (2013.01); *B63H 2003/004* (2013.01)

(58) Field of Classification Search
CPC ... B63H 3/008; B63H 2003/004; F16F 1/025; F16F 1/027; F16F 1/028; F04D 29/26
See application file for complete search history.

(56) References Cited

U.S. PATENT DOCUMENTS 2,998,080 A * 8/1961 Moore, Jr. ............ B64C 11/343
416/89
3,567,336 A * 3/1971 Bartha ................... B63H 3/008
416/136

(Continued)

FOREIGN PATENT DOCUMENTS

DE 2531054 1/1977
EP 0351986 1/1990

(Continued)

OTHER PUBLICATIONS

International Search Report issued by the EPO dated Jun. 14, 2017 for International patent application No. PCT/IB2016/055904.

*Primary Examiner* — Woody A Lee, Jr.
*Assistant Examiner* — Joshua R Beebe
(74) *Attorney, Agent, or Firm* — Silvia Salvadori

(57) ABSTRACT

A propeller (1) and a respective use method are described, comprising a cylindrical casing (3), a hub (2) couplable to an engine and rotatably mounted at least partially in the cylindrical casing of the propeller, and at least one blade (4) rotatably pivoted to the cylindrical casing. The hub (2) is rotatable with respect to the cylindrical casing of the propeller, or vice versa, to adjust the fluid dynamic pitch of the at least one blade (4). The propeller further comprises at least one elastic element (8) interposed between the hub (2) and the cylindrical casing (3) and it is characterized in that the elastic element (8) is preloaded to prevent its deformation until the resistant torque opposing the propeller rotation is lower than the torque generated by the preload of the elastic element (8), wherein said at least one blade is arranged on at least one first fixed fluid dynamic pitch before the deformation of the elastic element (8) begins. It is further described a flat spring (100) for propellers, which has a longitudinal development line (MS) and comprises a plurality of notches (103) transversally arranged with respect to (Continued)

the longitudinal development line. At least two distances (MD) between successive notches (103) are different from one another and/or at least two notches (103) are different from one another.

19 Claims, 23 Drawing Sheets

(56) References Cited

U.S. PATENT DOCUMENTS

| | | | | |
|---|---|---|---|---|
| 5,219,272 A * | 6/1993 | Steiner | ............... | B63H 1/26 |
| | | | | 416/139 |
| 5,286,166 A * | 2/1994 | Steward | ............... | B63H 3/008 |
| | | | | 416/136 |
| 5,368,442 A * | 11/1994 | Speer | ............... | B63H 3/008 |
| | | | | 416/167 |
| 5,554,003 A * | 9/1996 | Hall | ............... | B63J 3/04 |
| | | | | 416/140 |
| 8,449,256 B2 * | 5/2013 | Bianchi | ............... | B63H 3/008 |
| | | | | 416/43 |
| 2011/0133377 A1 * | 6/2011 | Ermilov | ............... | F16F 1/027 |
| | | | | 267/158 |
| 2013/0202436 A1 * | 8/2013 | Bianchi | ............... | B63H 3/008 |
| | | | | 416/9 |

FOREIGN PATENT DOCUMENTS

| | | |
|---|---|---|
| EP | 0545666 | 6/1993 |
| IT | MI20 081 667 | 3/2010 |
| WO | 9219493 | 11/1992 |
| WO | 2008075187 | 6/2008 |
| WO | 2012/007969 | 1/2012 |
| WO | 2012007970 | 1/2012 |
| WO | 2012007971 | 1/2012 |
| WO | 2013011338 | 1/2013 |

* cited by examiner

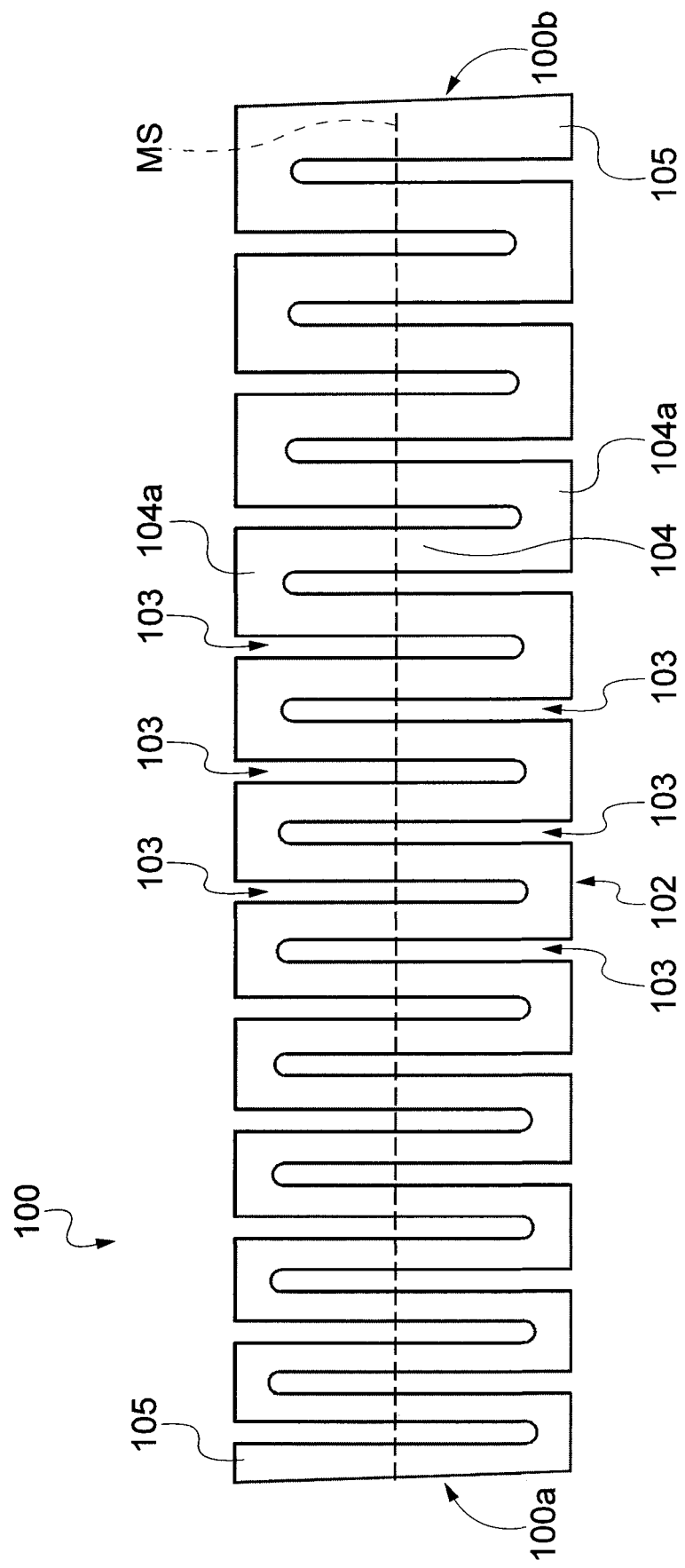

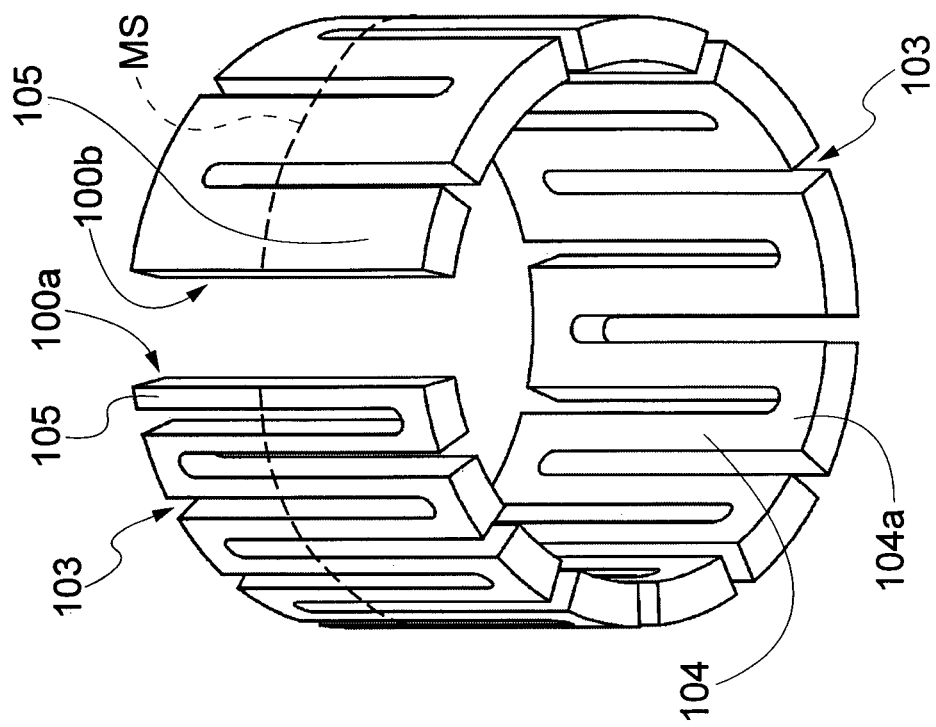
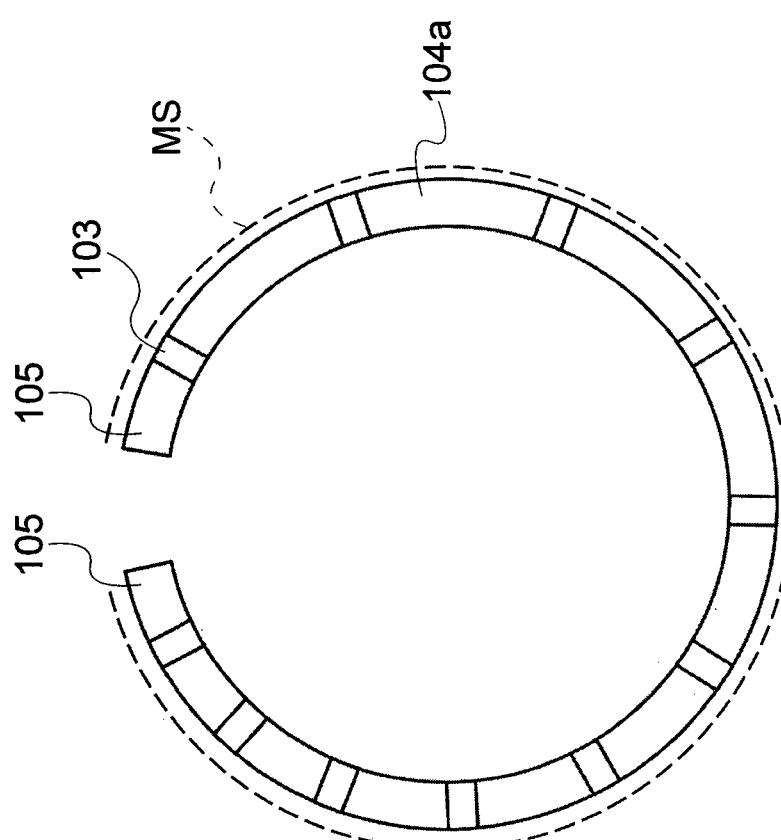
Fig. 4b
Fig. 4a

NAUTICAL PROPELLER

FIELD OF THE INVENTION

The present invention relates to a propeller, preferably for nautical use, and a respective use method, in which the blades can be arranged at the fluid dynamic pitch most suitable to the various propeller operating conditions. The present invention further relates to an elastic element, and in particular to a flat spring for a propeller preferably for nautical use.

KNOWN PREVIOUS ART

It is known that an arrangement with a proper and suitable incidence angle of the propeller blades with respect to the fluid hitting them, that is a proper fluid dynamic pitch, allows to maintain high efficiency and to achieve satisfying performances of the same propeller also as a function of use conditions and of the torque supplied by the engine of the boat to which the propeller is coupled.

In particular, the operation of the propellers used in nautical propulsion for heavy boats (not planing boats), in displacement mode, can be subdivided in three main steps, which follow one another based on the rotation speed of the engine the propeller is coupled with. The first propeller operation step, usually corresponding to the minimum rotation speed of the engine, is that in which the boat maneuvers are carried out. The second operation step, in which the rotation speed of the engine is increased with respect to the first step, is usually used for cruising navigation.

The third operation step, identifiable with a further increase of the engine rotation speed, up to reach the maximum rotation speed of the engine, is that in which the boat is driven at the maximum navigation speed.

In conventional fixed-pitch propellers, known in the art, the fluid dynamic pitch of blades is determined as a function of the power the engine supplies at the maximum rotation speed of the engine on which the propeller has to be installed.

The so-dimensioned propeller will be able to offer good efficiencys only in the first and third operation step. In fact, as mentioned above, the pitch of the traditional propeller is sized just to obtain the best efficiency in the third step, i.e. in the navigation at the maximum rotation speed of the propeller, the rotation speed being achievable only through low pitches.

Also in the maneuver step (first step), a low pitch does not give rise to any disadvantages (it is rather advantageous instead) as in this step no performance of navigation speed is required, but only quickness in responding to navigator's controls. A low pitch is, on the other hand, very advantageous in the second operation step, i.e. in the cruising navigation, as known this step being that one having the greatest importance since widely the most used. In this step, the efficiency of the propeller with low fixed pitch will be low and the power the engine supplies will not be effectively converted in propulsive thrust.

To guarantee a high efficiency at medium values of rotation speeds used in the cruising navigation, the blades of the propeller must be arranged with a high fluid dynamic pitch.

To cope with such needs, propellers have been developed in which the relative rotation angle of the hub with respect to the propeller casing, and vice versa, which becomes a rotation of blades around their pivot axis with respect to the propeller casing, through an appropriate kinematic system, can be modified during navigation.

In particular, a propeller is known in the art, being provided with an elastic element having particular shape adjusting the relative rotation of the hub with respect to the propeller casing during the operation of the propeller itself, as described in the application WO2008/075187.

In particular, when the propeller is still and the engine does not supply any engine torque, the elastic element is completely unloaded and it is in its undeformed condition of maximum extent. In such a position, the fluid dynamic pitch of blades is at its maximum value (very high).

As the engine, and then the propeller connected thereto, increases its own rotation speed, the resistant torque opposing the propeller rotation increases and the elastic element is compressed thereby causing a modification of the fluid dynamic pitch of the blades and, in particular, a decrease thereof, thus allowing the engine to reach its maximum rotation speed.

In other words, in such a propeller type, the initial pitch of blades (for a null rotation speed) is set to a high (great) value that decreases little by little as the propeller rotation speed, given by the engine, increases, up to reach the low pitch calculated for the fixed-pitch propeller as a function of the maximum speed rotation imparted by the engine.

It follows that this type of propellers allows achieving, in the second operation step (i.e. also in cruising navigation), efficiency decidedly better than those allowed by fixed pitch propellers. However, the need of providing a high fluid dynamic pitch during operations at low rotation speeds of the engine can not guarantee, in the maneuver step, to obtain the desired efficiency in some operating conditions, and in particular at low rotation speeds of the engine, for example when the propeller is coupled with certain engine types.

In fact the propellers, whose fluid dynamic pitch is set to high values at low rotation speeds and decreased when rotation speeds increase, are efficient only in case of coupling with conventional engines, for example conventional diesel engines, which supply high engine torques also at low rotation speeds. In such conditions, also if the fluid dynamic pitch is high, the maneuvers are effective also at low rotation speeds. However in some engine types, for example modern turbocharged engines, it is possible that in certain operating conditions, and in particular at low rotation speeds, the engine does not operate the propeller correctly, de facto obtaining unsatisfactory performances and efficiency values in the first step (maneuver step) of propeller operation.

In fact, in case wherein the engine on which the propeller is installed, would supply low torque values at low rotation speeds, there are problems on boat handling with the impossibility to make sudden and responsive maneuvers.

In fact, with this engine types, high fluid dynamic pitches given by the variable-pitch propellers known in the art, are too much high for low rotation speeds, and consequently the propeller does not allow to carry out correctly the maneuvers in the first operation step.

Such drawbacks are worsened in case of using engines that supply low torque values at low rotation speeds and have rather slopped characteristic curves (which, as known, describe the relation between torque and rotation speed), and in particular power curves (describing the relation between power and rotation speed).

It can be concluded that the traditional fixed-pitch propeller provides good performances only in the first and the third operation steps. The already known propeller, equipped with elastic element, provides good performances only in the second and third steps.

In the propeller selection it follows that the boat user will have to choose, depending on his needs, propeller features more suitable for the step of high-speed ahead cruising navigation, or features more suitable for the starting step to boat handling benefit.

For these reasons, in some propeller operating conditions, and in particular cases of coupling with some engines, most of all having high power or being of a new generation, or generally supplying low torque values at low rotation speeds, there is the need of providing an alternative mode for varying the fluid dynamic pitch of the propeller blades.

Furthermore it should be noted that, in case of propellers provided with an elastic element for adjusting the relative rotation of the hub with respect to the propeller casing during the operation, the components of the force generated by the at least one thrust tooth engaging the elastic element cause indirect effects that in turn can affect the proper and desired deformation of said elastic element. For example, if a compression stress is applied to the elastic element, the latter undergoes a resulting effect of outward warping thereby generating friction with the seat in which it is housed. Said friction can affect the proper and desired deformation of the elastic element. In other words, the friction forces oppose the uniform compression of the elastic element when the propeller is operating.

In fact, the currently used elastic element is shaped as a flat spring comprising cross notches.

The friction generated in the spring seat restricts the sliding of each individual spring portion delimited by the notches. Therefore, said friction forces opposing the aforesaid sliding (and therefore opposing the deformation of the elastic element) cause very small effect on the spring portion that rests on the tooth which transmits the compression force to the spring itself. On the subsequent spring portions, as the distance from the thrust tooth increases, the negative effect significantly increases. This is due to the fact that each spring portion following the first portion is affected not only by the negative effect of friction acting on itself, but also by the sum of the negative effects acting on all the preceding spring portions.

For example, spring portions away from each other can be deformed independently from each other due to friction.

The compression transferred on a strip will not be exactly equal to that applied on the preceding strip or strips because the generated friction will result in a decrease of the transmitted force and therefore the following strips will be deformed in a different way with respect to the preceding ones.

In this case, the spring could respond to a predefined stress in a different way from what desired, to obvious detriment of the control operated by means of the spring.

For example, it is also possible that one of the ends of the spring remains substantially undeformed while a central portion of the spring is deformed. Obviously, this situation causes a different response of the spring from what desired.

Moreover, the propellers known in the art are made such that under the force of the water the blades are arranged in their feathered position, for example when the propeller is dragged by the boat advancing during the sailing.

It should be noted that the so-called "feathered" position is obtained by orienting the blades with a substantially infinite fluid dynamic pitch, that is, so that the fluid dynamic resistance provided by the propeller can be minimized, for example during sailing, i.e. when the propeller does not have propulsive function and is dragged by the boat.

In order to obtain this result, it is essential to lock the propeller shaft, i.e. the drive shaft connected to the propeller (or the hub constrained to the drive shaft and thus to the engine), so as to prevent it from rotating.

In fact, when the drive shaft is locked, the propeller blades can reach their feathered position by means of the thrust force applied thereon by the fluid.

In traditional engines equipped with mechanical type transmissions, the propeller shaft (or directly the drive shaft) can be locked simply by switching off the engine and putting into gear. This operation must be carried out while the boat is moving, so as to allow the propeller blades to be brought in the feathered position, where they have infinite fluid dynamic pitch, by the fluid-dynamic force of water acting on them. Therefore, in order to arrange the blades in their feathered position, the rotation of the drive shaft must be locked so as to exploit the fluid dynamic action of the water acting on them and have them moved to their feathered position.

It should also be noted that modern technique has led to more frequent use of transmissions of the hydraulic type which, however, have the drawback of not allowing the rotation of the propeller shaft to be locked by simply putting into gear, as instead occurs in mechanical transmissions.

To cope with this drawback, and to allow the propeller shaft connected to the engine to be locked, the use of brakes controlled by means of various types of techniques known in the art has been provided. The purpose of the brake, or similar devices, is to allow, when desired, the propeller shaft to be locked in such a way that the fluid dynamic force acting on the blades can cause them to move to the feathered position.

However, the application of the brake creates several drawbacks, in fact, not only it implies a cost increase, but it is difficult to install and in many cases requires that the propeller shaft is disassembled. As a result, in addition to the cost of the brake, there are installation costs as well as installation difficulties of finding a suitable space to install it inside the boat.

Moreover, a further drawback of the propellers known in the art when a boat moves with a propeller placed in the feathered position at high speeds, is that the speed tends to cause the propeller casing (and therefore also the blades) to rotationally oscillate, i.e. to cause the propeller to rotate, around the feathered position.

In fact, more recent sailboats may achieve increasingly high navigation speeds by exploiting the sail, and so it is increasingly crucial the problem of rotational oscillation of the propeller, in which the blades arranged in the feathered position move from such position due to unwanted rotations (oscillations) of the propeller.

Same problems are found in motor boats equipped with two engines, for example one for navigating at high speeds and the other for moving at low speeds, that are used for example in some types of fishing, the propeller connected to the inactive engine is arranged in feathered position and is affected by problems due to oscillations (rotation) of the propeller, when navigating at high speeds.

As the boat speed increases, the oscillation amplitude increases. If during these oscillations the blades reach the pitch for the reverse motion, oscillations end substantially in an immediate way, and the propeller remains locked in its position of reverse motion.

The sudden lock of the propeller causes the boat to violently brake and transmits to the propeller, and to the elements connected thereto, a shock which may generate breakages. In general, the navigation is altered.

It is therefore an object of the present invention to overcome problems of the known art briefly discussed above, and to provide a propeller allowing to arrange the blades on an optimal fluid dynamic pitch during all operative conditions and, in the meanwhile, being economical and easy to implement.

In particular, it is an object of the present invention to provide a propeller having a high efficiency and allowing an effective use in all the three main operative steps of the propeller, independently from the engine features the blade is coupled with.

It is a further object of the present invention to provide an elastic element allowing to improve the propeller performances.

Another object of the present invention is to eliminate, or at least decrease, effectively the shocks and the dynamic stresses that might be generated during the propeller use, for example due to sudden maneuvers and/or impact against possible obstacles thus suddenly opposing the propeller rotation.

Another object of the present invention is to provide a propeller in which the blades are arranged in a predetermined position, preferably the feathered position (that is the position with infinite pitch), without using the fluid dynamic force of the fluid hitting the blades.

Another object of the present invention is to provide a propeller in which the blades, preferably when they are arranged in the feathered position, do not feel the drawbacks due to the above described oscillation phenomenon.

Another object of the present invention is to provide an elastic element able to be effectively deformed, without any possible frictions inside the propeller causing not-controlled deformations.

It has to be clarified that the functionality of the novel elastic element (hereinafter described in detail) is suitable to solve the objects of the present invention. The same elastic element will anyway be used in propeller applications different from those herein described (adjustment of the fluid dynamic pitch and/or to bring the blades back to a predetermined position and preferably to the feathered one and/or to eliminate shocks and/or locking means to lock the propeller in feathered position).

These and other objects will be achieved, singularly and/or contemporaneously, by a propeller. which is provided with an elastic element to adjust the fluid dynamic pitch that is preloaded, and a respective use method, and will achieved also by a propeller provided with an elastic element to bring the blades back to a predetermined position, preferably the feathered position, and with an elastic element (flat spring) object of the present invention too, also by a propeller provided with locking means for the lock in a predetermined position, preferably in the feathered position of the blades, also by a propeller provided with at least one elastic element sized to eliminate the shocks and the dynamic stresses between cylindrical casing and hub. Further specific characteristics are also object of the present invention.

It also has to be noted that, according to user's needs, the propeller according to the invention can be provided with, contemporaneously or singularly (independently), means for adjusting the preload and/or at least one elastic element for adjusting the pitch and/or with at least one elastic element for bringing the blades back to a predetermined position, preferably the feathered one, and/or with at least one elastic element for eliminating shocks between hub and cylindrical casing of the propeller and/or with locking means to lock the propeller in the feathered position.

According to an aspect, the propeller according to the invention comprises a cylindrical casing, a hub couplable to an engine and rotatably mounted at least partially in the cylindrical casing of the propeller, and at least one blade rotatably pivoted to the cylindrical casing. The hub is rotatable with respect to the cylindrical casing of the propeller, or vice versa, to adjust the fluid dynamic pitch of the at least one blade. The propeller further comprises at least one elastic element interposed between the hub and the cylindrical casing to adjust the fluid dynamic pitch of the propellers and it is characterized in that the elastic element is preloaded to prevent its deformation until the resistant torque, i.e. the torque opposing the propeller rotation, is lower (or equal) than the torque generated by the preload of the elastic element.

In other words, when the resistant torque exceeds the torque generated by the preload of the elastic element, the elastic element itself shall be deformed.

According to an aspect of the present invention, the at least one blade is arranged on at least one first fluid dynamic pitch before the deformation of the at least one elastic element begins.

It has to be immediately noted that the term "preload" will be used, here and in the following, to designate an initial deformation to which the at least one elastic element is subjected, independently from outer forces acting thereon. In other terms, the elastic element is initially maintained in a deformed condition that determines the preload, thereby not corresponding to its not-deformed condition. In detail, the elastic element is preloaded by its deformation and preferably its compression. As known, the preload of the elastic element shifts the beginning of its operation range, i.e. it shifts the beginning of its deformation due to outer forces the elastic element is subjected to.

Furthermore it has to be noticed that the term "resistant torque" is used herein and in the following to designate the torque, and generally the forces, opposing the rotation of the propeller during the operation thereof. For example, the resistance provided by the fluid to the propeller rotation is included. Moreover, it has to be noticed that the resistant torque could, for example, comprise also the resistance to the forward movement of the boat the propeller is coupled with.

As known the resistant torque, opposing the rotation of the propeller, increases as the speed rotation thereof increases, and then it increases as the rotation speed of the engine to which the propeller is coupled, increases, as well as it increases as the advance speed of the boat increases.

Since to increase the boat speed the propeller rotation speed is necessarily increased, and thus the speed of the engine the propeller is coupled to, it follows that the generated resistant torque increases as each of the boat advance speed and the engine rotation speed and the propeller rotation speed, increase.

It has to be further noticed that, also if here and in the following it will be referred to the resistant torque opposing the propeller rotation, the description can be obviously applied in reference to the boat advance speed or in reference to power, according to known mathematical relations.

In fact, as known, the resistant torque varies in function of about the advance speed squared, whereas the required power varies in function of about the cube of the boat advance speed.

Moreover, in the following it will be referred both to power curves, or absorption curves of a propeller, and to advance (cruise) speed curves of the boat. All' above mentioned curves provide for an indication of the torque resistant to the propeller rotation, through proper relations. According to an aspect of the present invention, the at least one blade is arranged on at least one first fixed fluid dynamic pitch, preferably adapted for the ahead navigation, following the rotation according to a first rotation way of the hub with respect to the cylindrical casing of the propeller in an angular range, preferably not null, of free rotation of the hub with respect to the cylindrical casing of the propeller.

It follows that, in the propeller according to the invention, substantially in the first and second use steps, i.e. in the maneuver and cruising navigation steps, the fluid dynamic pitch remains constant at a first fixed value that could be advantageously selected by the user, preferably through convenient means for setting the first fluid dynamic pitch.

In particular, before the beginning of the operation of the elastic element, and then before the beginning of the deformation of the elastic element, the propeller according to the invention acts as a fixed-pitch propeller in which the first selected fluid dynamic pitch can be set by the user.

Preferably, the means for setting the first fixed fluid dynamic pitch before the beginning of the deformation of the elastic element are interposed between the hub and the cylindrical casing, and more preferably between the hub and at least one intermediate element of which the propeller is provided with.

The means for setting the first fluid dynamic pitch, for example one or more inserts, preferably modify the size of the angular range of free rotation of the hub with respect to the cylindrical casing of the propeller.

Only subsequently, as the engine rotation speed increases, and the resistant torque opposing the propeller rotation increases, the elastic element will begin to deform, and preferably to compress, to allow pitch modification and adjustment. Preferably, the elastic element allows to decrease the fluid dynamic pitch allowing the engine to reach the maximum rotation speed.

When the resistant torque opposing the propeller rotation exceeds the torque generated by the preload of the elastic element, the latter being adjustable by convenient means for adjusting the preload, as will be evident in the following, the fluid dynamic pitch will be modified, and in particular it will begin to decrease and the propeller will act as a variable-pitch propeller allowing to maintain, also in this case, a high efficiency with respect to the absorption curve of the fixed-pitch propeller.

Moreover, the final pitch the blades can reach will also be able to be advantageously adjusted through a limit stop, or similar means, which allow to avoid an excessive decrease of the fluid dynamic pitch reached at the maximum rotation speed of the engine.

Advantageously, the propeller according to the present invention allows to maximize the propeller efficiency and to arrange the blades on a first fixed fluid dynamic pitch that can be set as suitable for carrying out maneuvers and cruising navigation, then allowing the beginning of the deformation of at least one preloaded elastic element as the resistant torque opposing the propeller rotation, and therefore its rotation speed, increases.

By modifying the preload of the elastic element it is possible to adjust the beginning of its operation range, which allows the subsequent modification of the fluid dynamic pitch, and in particular the pitch decrease, in order to enable the engine to reach high rotation speeds which allow the navigation at high/maximum speeds, still maintaining a high efficiency.

According to an aspect of the present invention, the preload of the elastic element can be adjusted by convenient adjusting means, so that to set the action range of the elastic element, i.e. the operating conditions of the propeller, and then of the engine, to which the fluid dynamic pitch will be adjusted following the deformation of the elastic element.

In particular, by modifying the preload of the elastic element it is possible to modify the value of the resistant torque of the propeller, the exceeding of which, the elastic element will begin to deform allowing a modification of the fluid dynamic pitch. It follows that it will then be possible to set also the engine rotation speed, to which the fluid dynamic pitch will be modified following the deformation of the elastic element.

On the contrary when the hub is rotated in the second rotation way, the free rotation between the hub and the propeller casing, preferably in a not null angular range, determines the blade arrangement on a pitch adapted to the reverse-motion navigation. Also the pitch suitable for the navigation in reverse motion can be advantageously modified, and set by the user.

Advantageously, the means for adjusting the preload according to the present invention allow to increase the propeller efficiency in the first operation step of the above described propeller.

As mentioned, the present invention further relates to an elastic element, and in particular to a flat spring usable for propellers preferably for nautical use.

By "flat spring" is meant a spring made from a substantially flat body, i.e. a body having a dimension smaller than the other two.

In an embodiment, the flat spring has a longitudinal development line and comprises a plurality of notches arranged in succession and transversally with respect to the respective longitudinal development line.

By "longitudinal development line" is meant a portion of straight line drawn on the spring, i.e. on the body of the spring, and parallel to the main dimension of the spring itself.

Thus, when the spring is arranged in planar condition (typically coincident with the spring rest position), the longitudinal development line coincides with a straight portion. On the contrary when the spring is bent, the longitudinal development line bends in turn, integrally with the spring, thus forming a curve.

According to an aspect of the present invention, the notches are used with arrangement at least partially variable along the spring.

Such an expression means that the shape and/or arrangement of the notches are different from one another.

In other words, at least two distances between successive notches are different from one another and/or at least two notches are different from one another.

The difference in notch shape and/or arrangement, and therefore the difference in sizes and/or positions among various notches, affect sizes of the intermediate portions of the spring. By "intermediate portion" or "strip" is generically meant the portion of spring comprised between two notches.

The intermediate portion, or strips, of the spring are then at least partially separated from one another by the notches arranged in succession and transversally to the longitudinal development line. Also the intermediate portions have then arrangement partially variable along the spring.

According to a preferred aspect of the present invention, at least one dimension selected from length and width of the notches is different for at least part of the notches. In other words, according to such aspect of the present invention, at least two notches have length and/or width different from one another.

In particular, the variation of distance among successive notches and the variation of width of the notches, define intermediate portions of spring having mutually different thicknesses.

According to an aspect of the present invention, the variation of length of the notches affects the thickness of the connecting portion among intermediate successive portions of the spring.

Advantageously, the spring according to the present invention has variable elastic modulus, preferably depending on its own length. In other words, the various portions of the spring (i.e. various zones of the spring) arranged along the longitudinal development line, have elastic modulus different from one another.

In particular, by conveniently selecting the arrangement of the notches, the elastic modulus of the spring can be varied along the spring itself. Advantageously, the spring according to the present invention allows the spring behavior to become independent from the friction forces, causing a deformation control better responsive to stresses than that of the springs known in the art, which have constant elastic modulus.

According to an aspect of the present invention, as better explained in the following, the notches have increasing sizes and/or distances, and preferably strictly increasing, along the longitudinal development line.

"Increasing" and "strictly increasing" definitions are meant in geometrical meaning, whereby the possibility that some successive notches have unchanged sized (increasing size/distance) is accepted.

In other words, every notch can have sizes equal to the preceding notch, or at least one size greater than that of the preceding notch.

Obviously, the case where all notches are equal and equidistant from one another is excluded, since already known in the art.

As mentioned, according to the present invention, at least two notches are different from one another, or at least two distances between successive notches are different from one another.

A preferred solution entails strictly increasing size/distance of the notches, whereby every notch has at least one size greater than that of the preceding notch and/or the distance between two successive notches is greater than the distance between two preceding notches.

It becomes apparent that "preceding" and "successive" definitions must be intended with respect to the longitudinal development line of the spring.

According to another aspect of the invention, per every two successive notches, the difference between the width of the spring and the length of at least one of the two notches, as measured perpendicularly to the longitudinal development line, is greater than the distance between the two successive notches.

In other words, considering two subsequent intermediate portions of the spring, the thickness of the portion connecting the successive intermediate portions of the spring, measured perpendicularly to the longitudinal development line of the spring, is greater than the thickness of both the intermediate portions of the spring, measured in a direction coincident with the longitudinal development line.

The Applicant found that such condition allows efficient definition of the elastic modulus (or better the elastic moduli) of the spring.

The notches are arranged in a general transverse way with respect to the longitudinal development line of the spring. According to a particular aspect of the invention, such notches are arranged substantially perpendicularly with respect to the longitudinal development line.

According to an aspect of the invention, the notches are cut alternately on opposite sides of the spring.

This embodiment allows the deformation of the spring to be balanced, so that the latter can be deformed, on the whole, in a manner substantially parallel to the longitudinal development line.

Therefore the elastic element, and in particular the spring according to the invention, provides several advantages with respect to the currently used springs having constant elastic modulus along their entire development. In fact, in many cases it was found that the use of this elastic element having constant elastic modulus does not allow to obtain the desired results in a complete and satisfactory way.

Advantageously the elastic element, and in particular the flat spring having variable elastic modulus according to the present invention, preferably in combination with means for adjusting the preload, allows a plurality of purposes to be achieved with markedly greater effectiveness, when the propeller is operating. In particular, a first object is to eliminate or at least more effectively decrease shocks and dynamic stresses caused by sudden maneuvers and/or obstacles that suddenly oppose the propeller rotation.

In this regard it should be noted that means for adjusting the preload can be advantageously used to adjust the stiffness of the spring when it is operating to decrease shocks to which the propeller may be subject during operation.

Furthermore, a second object is to effectively control the variation of the propeller pitch in function of the variation of the value of the resistant torque opposing the propeller rotation.

According to an aspect of the present invention, in order to individually achieve each of the purposes mentioned above with the maximum effectiveness, the elastic element is designed so that the thickness of each individual intermediate portion (strip) decreases as the distance from the thrust tooth acting on the spring increases and, on the contrary, the gap (i.e. the notch) obtained between a strip and the next one, simultaneously increases.

By doing so, the negative and unwanted effect of the friction force can be eliminated. In fact, the more distant intermediate portions (strips) will be thinner where the applied deforming force was reduced by friction and then, if they are suitably dimensioned, may undergo the same deformation of the strips having greater thickness and subjected to greater deforming force.

Moreover, a propeller comprising a spring according to one or more of the aspects and/or features described herein also falls within the object of the present invention.

In particular, it is an object of the present invention a variable-pitch propeller, comprising at least one blade rotatably pivoted to a cylindrical casing of the propeller, a hub couplable to an engine and preferably coaxial to the propeller casing, a kinematic system adjusting the rotary motion of the blade around its own axis pivoting to the propeller casing.

As discussed above, the propeller also comprises means for adjusting, i.e. modifying, the spring preload. Advantageously, the means for adjusting the preload act on the spring portion having higher elastic modulus, for example formed by strips thinner than the strips in other spring portions, so that the adjusting action can be definitely applied to the spring thereby causing the desired deformation thereof and thus a reliable and accurate preload modification.

According to an aspect of the present invention, the means for adjusting the preload cause at least one spring portion to be compressed, preferably the portion having higher elastic modulus. Advantageously, one or more notches having such a configuration as to determine higher elastic modulus with respect to one or more different spring notches, are at least partially compressed (at least partially closed) by the means for adjusting the preload.

According to a further aspect, the present invention relates to a propeller provided with at least one elastic element to bring the hub and the propeller casing in at least one predetermined position, preferably in at least one predetermined relative position corresponding to the feathered position of the at least one blade. It should be noted that the elastic element can be individually used in the propeller or may be present either combined with at least one elastic element for adjusting the fluid dynamic pitch, possibly provided with means for adjusting the its preload, or in combination with at least one elastic element to decrease shocks.

The present invention concerns a propeller comprising a cylindrical casing, a hub couplable to an engine and rotatably mounted at least partially in the cylindrical casing of the propeller, and at least one blade rotatably pivoted to the cylindrical casing of the propeller. The hub is rotatable with respect to the cylindrical casing of the propeller, or vice versa, for at least a non-null rotation angle, to adjust the fluid dynamic pitch of the blades.

The propeller comprises at least one elastic element interposed between the cylindrical casing and the hub, adapted to generate a torque for rotating the hub with respect to the cylindrical casing of the propeller, or vice versa, in at least one predetermined relative position when the engine imposes a null engine torque to the hub.

It should be noted that the expression "the engine imposes a null engine torque" refers both to the case in which the engine is not operating and thus is not transmitting the engine torque to the propeller, and to the case in which the transmission of motion between the engine and the propeller is not engaged, or else the transmission is in the neutral position and thus, also in this case, the engine torque is not transmitted from the engine to the hub and then to the propeller.

According to an advantageous aspect of the present invention, in the predetermined relative position reached thanks to the torque applied by the at least one elastic element, the blades are arranged in feathered position.

So, even without having to lock the propeller shaft, the blades are automatically arranged in the feathered position or at a predetermined fluid dynamic pitch suitable for example to restart the boat, when the engine begins to apply an engine torque; in fact, in the absence of an engine torque on the hub, the at least one spring imposes an elastic torque between the hub and the cylindrical casing which causes these two components to rotate with respect to one another. Unlike the propellers known in the art, the arrangement of the blades in the feathered position is not caused by the fluid dynamic force of the water but by the torque generated by the elastic element the propeller is provided with.

Advantageously, the propeller according to the present invention allows the automatic arrangement of the blades in the feathered position without the aid of a brake, or similar devices, to lock the propeller shaft, for example in the case where the engine is equipped with a hydraulic transmission.

In fact, the propeller according to the present invention allows the blades to move to the feathered position by means of the torque generated by the at least one elastic element the propeller is provided with.

It should be noted that, although in the present description particular reference is made to the feathered position as the predetermined position in which the blades are arranged as a result of the relative rotation of the hub with respect to the propeller casing through the at least one elastic element, such description should not be understood as restrictive but the propeller according to the present invention, and in particular the at least one elastic element the propeller is provided with, can be used to arrange the propeller casing and the hub in a predetermined relative position in which the blades are arranged with a predetermined fluid dynamic pitch. Preferably, the blades are arranged with a fluid dynamic pitch which is a pitch suitable for restarting the boat when the engine is reactivated to impose an engine torque.

According to an advantageous aspect of the present invention, the at least one elastic element the propeller is provided with is arranged so that the relative position of the hub and the cylindrical casing of the propeller, corresponding to have the blades in the feathered position or at a desired fluid dynamic pitch, is defined by the position of the elastic element when undeformed or minimally deformed.

By doing so, as a result of the elastic return of the elastic element to its undeformed or minimally deformed condition, the hub and the casing of the propeller are caused to move to their relative position corresponding to the predetermined relative position, in which the blades are in the feathered position or in which they are at a predetermined fluid dynamic pitch.

In fact, according to an aspect of the propeller according to the present invention, the at least one elastic element is undeformed or minimally deformed when the hub and the cylindrical casing are in the predetermined relative position.

According to an aspect of the present invention, the at least one elastic element operates between the undeformed, or minimally deformed, condition and the deformed condition until the maximally deformed condition is reached.

Advantageously, the at least one elastic element is selected so that, when not deformed or minimally deformed, it generates a torque having strength greater than the friction hampering the relative rotation of the hub with respect to the cylindrical casing of the propeller, when said engine imposes a null engine torque to the hub.

Furthermore, the at least one elastic element must be selected so that, when deformed or maximally deformed, it generates a torque whose strength is smaller with respect to the torque imposed by the engine to the hub, and thus to the propeller. By doing so, during the propeller rotation imposed by the engine, the at least one elastic element does not affect the adjustment of the fluid dynamic pitch of the blades.

According to another aspect, the present invention concerns a propeller comprising a cylindrical casing of the propeller, a hub couplable to an engine and rotatably mounted at least partially in the cylindrical casing of the propeller, and at least one blade rotatably pivoted to the cylindrical casing of the propeller. The hub and the cylindrical casing are rotatable with respect to each other to adjust the fluid dynamic pitch of the blades. In particular, there is at least one relative position of the hub and the cylindrical casing in which the blade are arranged in the feathered position. The propeller comprises reversible-locking means to lock the relative rotation between the hub and the cylindrical casing at least in one rotation way at a predetermined relative position, preferably in at least one predetermined relative position in which said at least one blade is arranged in feathered position.

Advantageously, the reversible-locking means to lock the relative rotation between the hub and the cylindrical casing the propeller is provided with, prevent the relative rotation of these components in at least one rotation way, from the relative position between the hub and the cylindrical casing allowing the at least one blade to be arranged in feathered position.

As known, the so-called "feathered position" is obtained by orienting the blades with a substantially infinite fluid dynamic pitch, that is, so that the fluid dynamic resistance provided by the propeller can be minimized, for example when the propeller is dragged by the boat.

Thanks to this aspect of the present invention and in particular thanks to the locking means, the negative effects of the propeller oscillations in feathered position, generated for example when the boat is moving at high speeds, can be eliminated or at least greatly restricted.

In particular, according to a preferred aspect of the present invention, the reversible-locking means lock the relative rotation between hub and cylindrical casing at least in the way in which the fluid dynamic pitch of the blades changes to a propulsive fluid dynamic pitch for the reverse-motion.

Thanks to this, the blades are prevented from arranging in a reverse-motion configuration, that is in such a position as to cause the boat to unexpectedly and suddenly brake.

According to different embodiments of the present invention, the locking-means prevent relative rotation between hub and cylindrical casing in both ways of relative rotation between hub and cylindrical casing of the propeller, at the relative position between the hub and the cylindrical casing which allows the blades to be arranged in feathered position.

Thanks to this, the blades are stably retained in feathered position. This solution allows the effective lock of the propeller in the feathered position to be obtained.

According to an embodiment of the present invention, the locking means comprise at least one movable element, preferably a pin, and at least one locking surface to lock the movable element. The movable element and the locking surface are alternately engageable and disengageable one to/from another. The movable element is rotationally integral (directly or indirectly) to the hub, and the locking surface is rotationally integral (directly or indirectly), to the cylindrical casing, or vice versa.

Movable element and locking surface can be made either directly on hub and cylindrical casing or they can be indirectly constrained thereto, so as to be each rotationally integral to the respective piece of the propeller.

According to an aspect of the present invention the movable element is operated, and thus moved, at least during the transfer from a position of engagement with the locking surface towards a position of disengagement from the locking surface.

In more detail, the movable element is moved at least when the hub and the movable casing are moved from the relative position that places the blades in the feathered position, thus opposing the action of the locking means that tend to restrain the propeller in feathered position. In other words, the locking means counter the relative rotation between hub and cylindrical casing of the propeller at least in one rotation way. When the hub and the cylindrical casing of the propeller are forced to move with respect to one another in that rotation way, the movable element is operated, i.e. moved. As better explained hereinafter, to carry out such movement the engine having the propeller constrained thereto must apply a torque, and preferably an propulsive torque, which exceeds a given threshold value between hub and cylindrical casing and obviously oriented according to the way in which the rotation is prevented by the locking means.

If such a torque is lower than the threshold value, then the movable element is not moved and keeps its position of engagement with the locking surface. In other words, the locking means are still operating and hub and cylindrical casing of the propeller keep their relative position, keeping the blades in the feathered position.

On the contrary, if such value is greater than the threshold value, then the movable element is moved and is able to disengage from the locking surface. In this case, hub and cylindrical casing can be rotated with respect to one another so as to arrange the blades with a propulsive pitch.

This threshold is preferably set so as to be greater than possible stresses imposed on the propeller in feathered position during the navigation, but can be easily overcome by the engine torque.

According to different possible embodiments, the at least one locking surface to lock the movable element is arranged either on a projecting portion or a recessed portion, made directly on the cylindrical casing (or the hub) of the propeller, or on an element, for example ring-shaped, rotationally integral to the cylindrical casing (or the hub) of the propeller, and thus indirectly constrained thereto.

According to an aspect of the present invention, the propeller comprises at least two locking surfaces facing one another, to lock the movable element. These surfaces allow the movable element to be substantially stably restrained, thereby preventing hub and cylindrical casing from rotating with respect to one another in both the possible rotation ways.

These facing locking surfaces preferably form a seat intended to at least partially receive the movable element.

According to a further aspect of the present invention, the movable element is constrained to elastic means, such as for example a spring. The elastic means push the movable element in engagement with the locking surface. In other words, the elastic means force the movable element to its position of engagement with the locking surface.

Additionally, or alternatively, the movable element can be elastically deformable. According to another aspect of the present invention, at least part of the locking surface and/or the movable element is inclined with respect to the relative sliding direction between hub and cylindrical casing.

This inclination facilitates the disengagement of the movable element from the locking surface when, for example, a propulsive torque (engine torque) is applied to the hub in order to move the blades from the feathered position.

According to another aspect of the present invention, the propeller is provided with at least one guiding surface distinct from the locking surfaces. The guiding surface can be connected to, and/or arranged near, at least one locking surface to lock the movable element. Preferably, the guiding surface has different, and preferably lower, inclination (has lesser slope) than the locking surface with respect to the relative sliding direction between hub and cylindrical casing.

According to a further aspect, the present invention concerns a propeller comprising a cylindrical casing, a hub couplable to an engine and rotatably mounted at least partially in said cylindrical casing of the propeller, and at least one blade rotatably pivoted to said cylindrical casing of the propeller, said hub being rotatable with respect to said cylindrical casing of the propeller, or vice versa, to adjust the fluid dynamic pitch of said at least one blade. The propeller is characterized by comprising at least one elastic element directly or indirectly interposed between cylindrical casing and hub and sized to eliminate shocks and dynamic stresses between cylindrical casing and hub. Further characteristics are presented in the following description and/or in the respective dependent claims.

Further characteristics and advantages of the present invention will be more evident in the following description, for illustrative purposes referring to the attached figures, wherein:

FIG. 1 shows is a sectional view of a possible embodiment of the propeller according to the present invention;

FIG. 1a schematically shows a sectional view in a plane perpendicular to the hub axis, in which the limit stops of the hub rotation with respect to the cylindrical casing of the propeller, and vice versa, are visible, to adjust the pitch to a given value adapted for navigating at the maximum speed, according to a possible propeller embodiment of the present invention;

FIG. 4 is a plan view of a spring according to the present invention;

FIGS. 4a and 4b are plan and perspective views, respectively, of the spring according to FIG. 4, the latter being bush bent;

Figure 13:
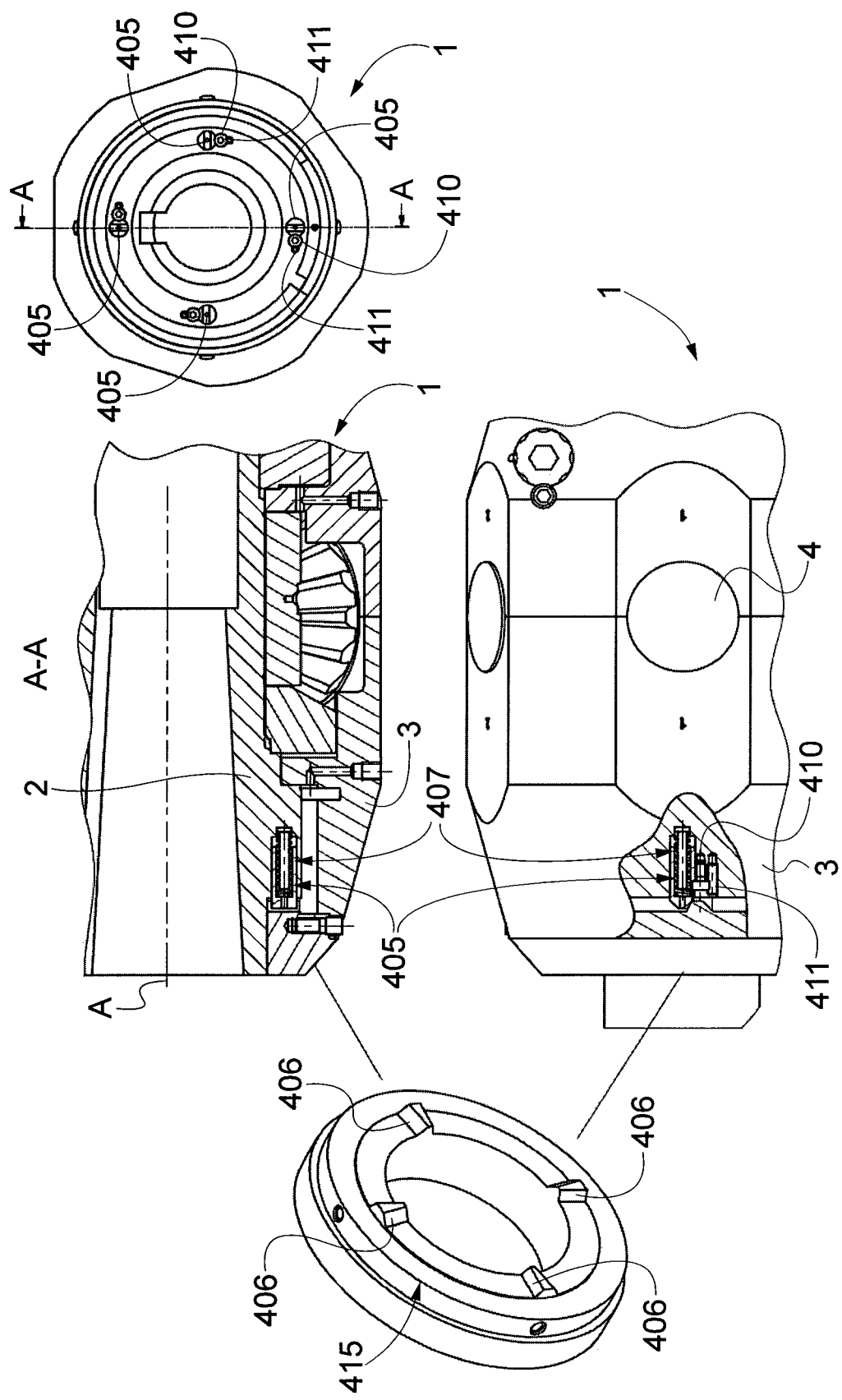
Figure 14:
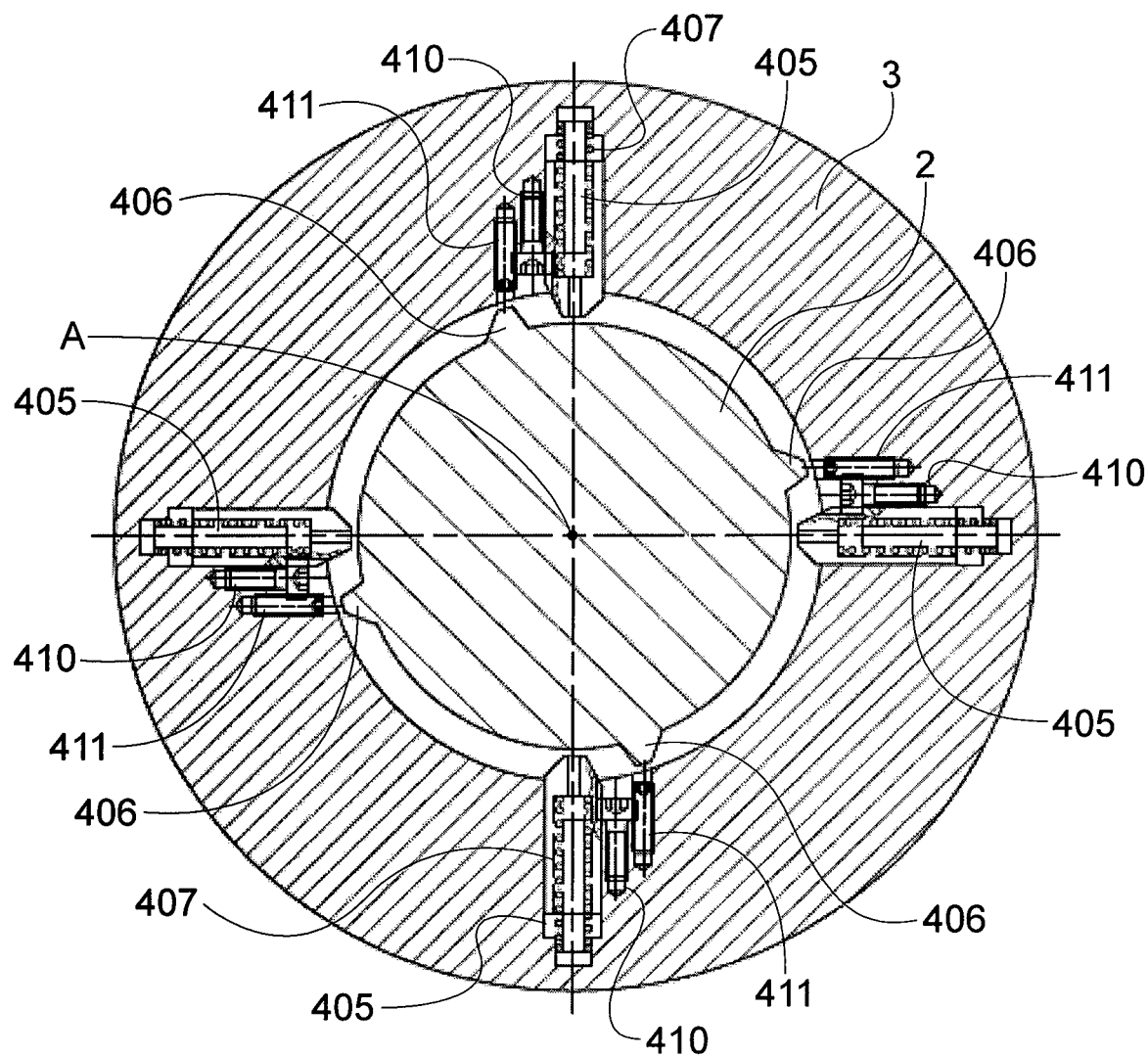
Figure 15:
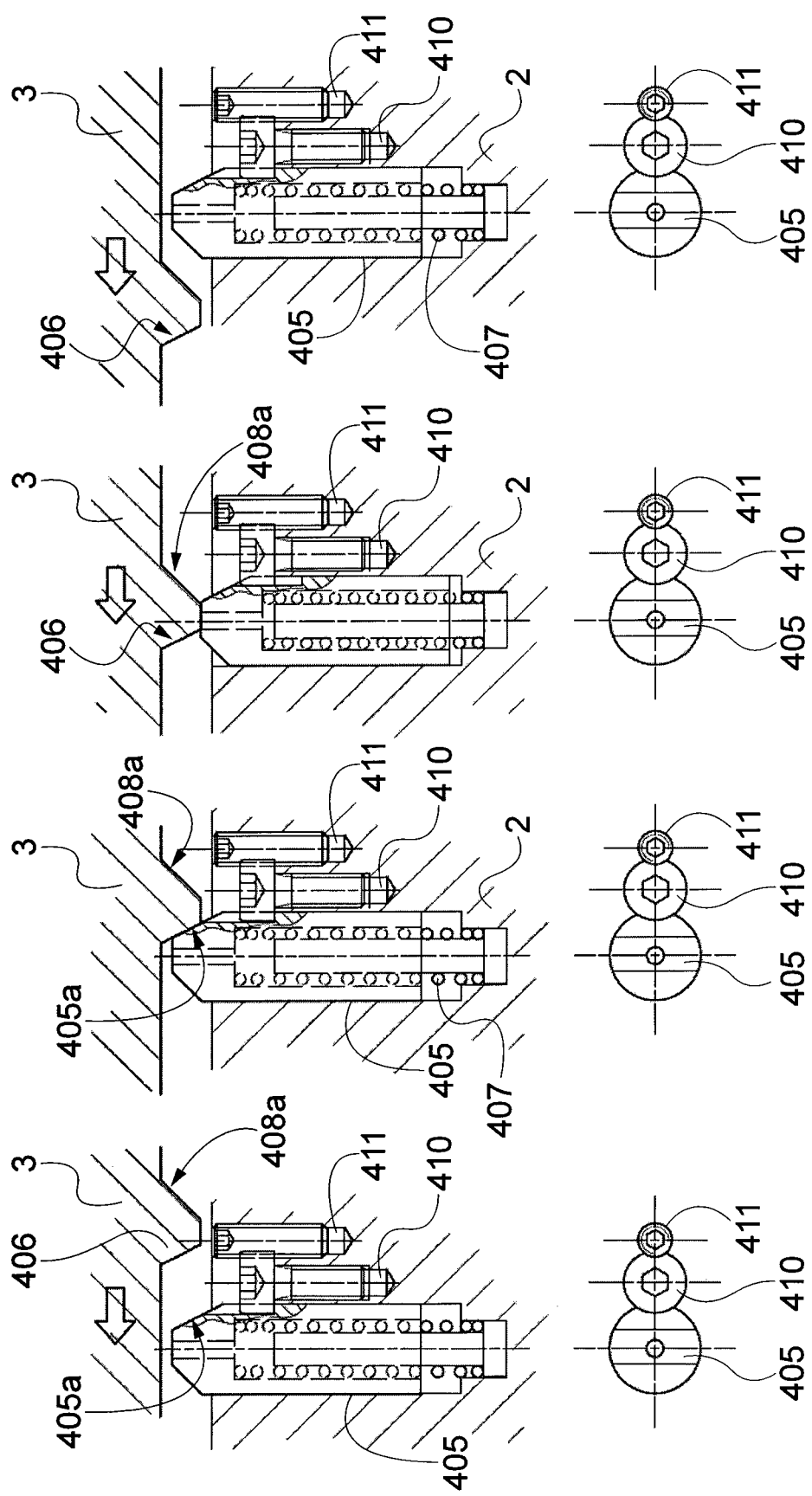
Figure 16:
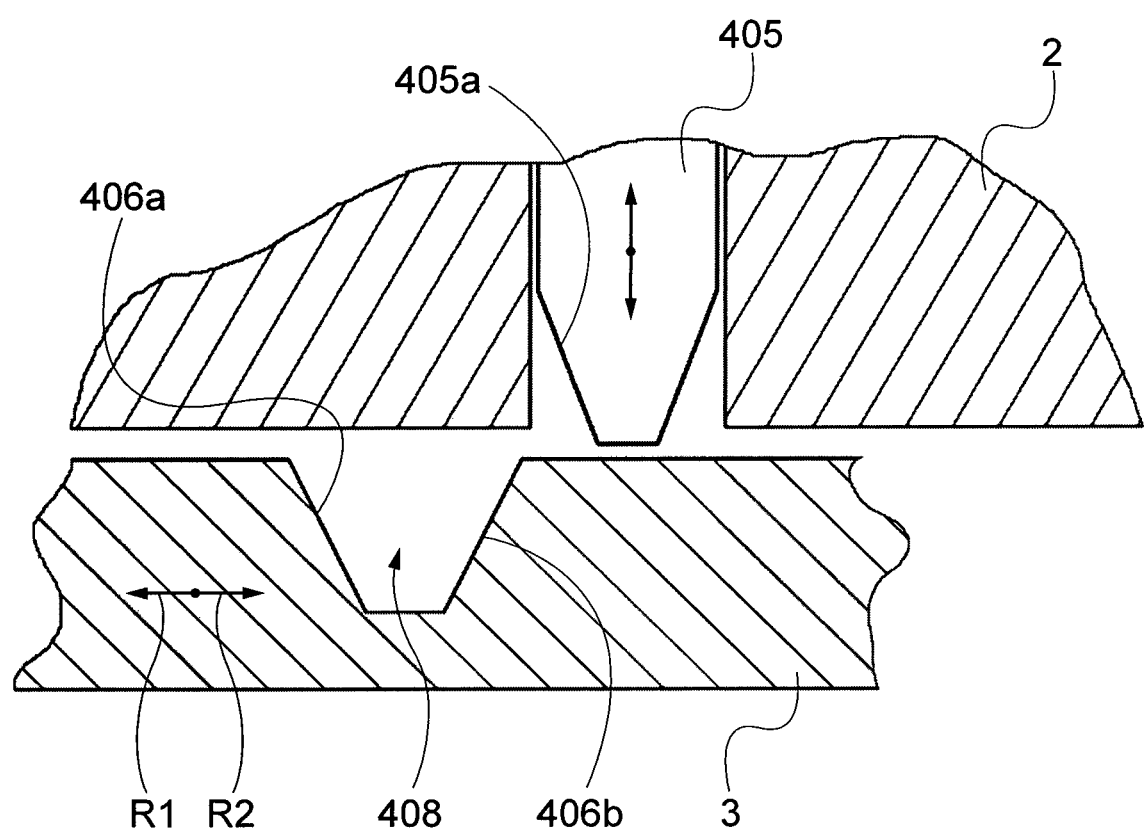
Figure 16A:
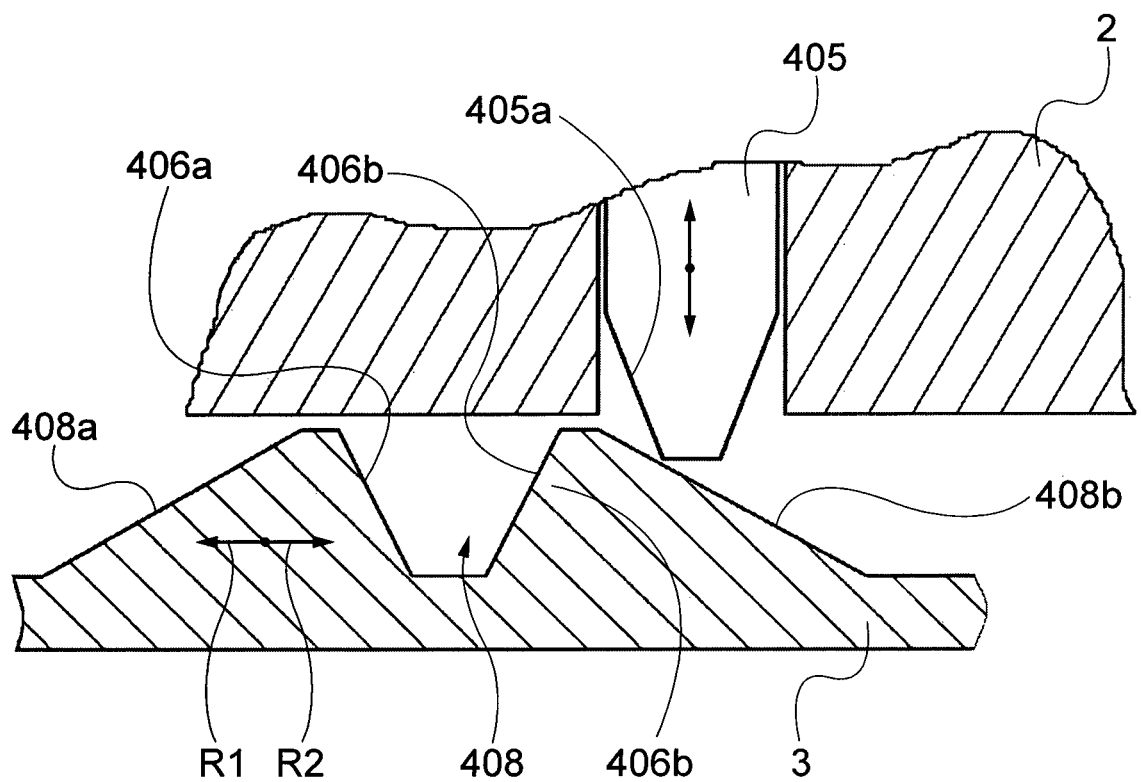

FIG. 13 shows a partially sectional view, a partially perspective view of a propeller according to the present invention, which is provided with reversible-locking means to lock the relative rotation between hub and the cylindrical casing at a predetermined relative position, preferable in feathered position; the figure further shows in detail a ring on which the locking surface is arranged and the detail of the movable locking means inserted in the hub according to a possible embodiment;

FIG. 14 sectionally shows a possible embodiment of the reversible-locking means to lock the relative rotation between the hub and the cylindrical casing at a predetermined relative position, preferably in feathered position, in which at least one movable element is arranged perpendicularly to the axis A of the propeller;

FIG. 15 is a magnification of the locking means shown in four different positions of the movable element with respect to the locking surface, following the relative movement between cylindrical casing the hub;

FIGS. 16-16a are schematic views of two possible embodiments of locking means.

DETAILED DESCRIPTION OF THE PRESENT INVENTION

Right from the beginning it also has to be noted that, even if reference will be made to a propeller provided with at least one elastic element for adjusting the pitch that is preloaded and with at least one elastic element for bringing the blades back to a predetermined position, preferably the feathered one, and with at least one elastic element for eliminating shocks between hub and cylindrical casing of the propeller, in addition to locking means to lock the hub and the cylindrical casing in a predetermined relative position, preferably the feathered position, such elements can be used separately or in combination with two or more of these elements in a nautical propeller.

It should also be noted that the herein described elastic elements 8, 8', 8" are preferably embodied through a flat spring object of the present invention, but additional implementation modes of these elastic elements are not excluded.

Figure 1:
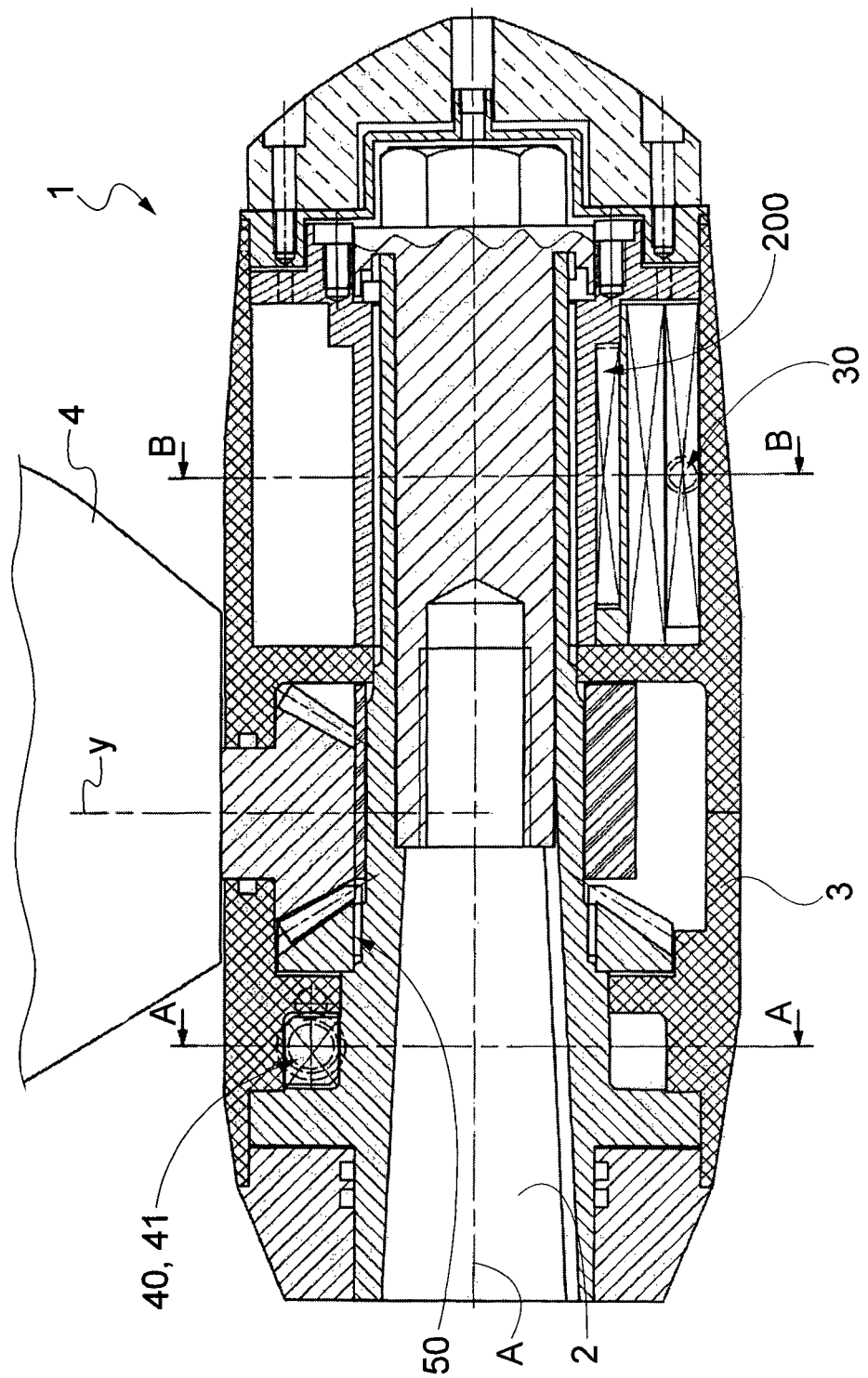
FIG. 1b is a sectional view in a plane perpendicular to the hub axis in a position different from that of FIG. 1a, in which the spring allows adjusting, during the navigation, the variation of the propeller pitch depending on the value of the torque opposing the propeller rotation, according to a possible propeller embodiment of the present invention.
FIG. 1c is a sectional view of FIG. 1b, in which furthermore there are means for adjusting the fluid dynamic pitch of the blades for navigating at low rotation speeds (such as, for example, the pitch during the maneuver step), according to a possible propeller embodiment of the present invention.

The propeller 1 according to the present invention, referring to the attached figures, comprises a hollow cylindrical casing 3 to which one or more blades 4 of the propeller are constrained (for example three blades), of which only one is visible in the sectional view of FIG. 1. In spite of this, the propeller according to the present invention can be provided with a number of blades 4 variable according to construction and use needs.

The propeller 1 is constrainable to a drive shaft activated by an engine. It has to be noticed that, according to possible different embodiments, the propeller can be constrained directly to the drive shaft of the engine, or else it can be constrained through known means to a hub 2 (as in the embodiment illustrated in FIG. 1), which in its turn is integrally constrained as rotating with the drive shaft, or else the hub 2 can be an end of the same drive shaft. For easiness, in the following it will be referred to the hub 2 as the element of the propeller 1 that is rotated by the engine the propeller is connected with.

The hub 2 of the propeller is coaxially coupled to the cylindrical casing 3 so that to allow, as it will be better described in the following, the transmission of the rotary motion of the drive shaft to the cylindrical casing 3. Moreover, it is useful to know that the cylindrical casing 3 can be made in one piece, or else it can be formed by two or more parts constrained one to another in a known way, so that to constitute the outer cylindrical casing of the propeller. The blades 4 of the propeller, of which in FIG. 1 the lower ending part is visible, are pivoted to the casing 3 of the propeller so that they can rotate around its own pivot axis Y. In other terms, the blades 4 can rotate along an axis Y that is preferably orthogonal to the axis A of the propeller rotation, which generally coincides with the advance direction of the propeller during the forwards and backwards motion.

It has to be noted immediately that in the following it will be referred to the rotation axis A of the propeller around which it is rotated as a consequence of the engine activation. Preferably, the rotation axis A of the propeller coincides with the longitudinal axis of the hub 2, around which the latter is rotated.

The propeller according to the present invention further comprises a kinematic system 50, schematically visible in FIG. 1, adapted to transform the rotary motion of the drive shaft, and of the hub 2 with respect to the casing 3 of the propeller, or vice versa, into the rotary motion of each of the one or more blades 4 around its own axis Y pivoting to the casing 3 of the propeller.

More in detail, the kinematic system causes the rotation of the blades 4 around its own pivot axis Y, thereby varying the incidence angle with respect to the fluid (and then the fluid dynamic pitch), when the drive shaft, and then the hub 2, rotates with respect to the cylindrical casing 3 of the propeller of a not null rotation angle, or vice versa.

Such a rotation of each blade 4 around its own axis Y causes the variation of the relative incidence angle and then of the fluid dynamic pitch of the propeller.

In consequence, the free relative rotation of the drive shaft, or of the hub 2, relatively to the cylindrical casing 3 of the propeller, causes the blade rotation around the axis Y according to an angle that obviously is a function of the relative rotation angle between the hub 2 and the cylindrical casing 3 of the propeller.

Preferably, the kinematic system transforming the motion is of gear wheel type, the gear wheel having preferably a truncated-cone shape. More in detail, the at least one gear wheel is constrained at the root of each blade 4, and at least one toothed pinion is constrained and becomes integrally rotating with the hub 2.

Obviously, further embodiments of the at least one kinematic system of motion transformation can be provided, provided that the relative rotation motion of the hub 2 with respect to the cylindrical casing 3 of the propeller can be transformed in the rotation motion of the at least one blade 4 around its own pivot axis Y.

The rotation of the hub 2 imposed by the engine in a first rotation way R1, preferably clockwise, is usually used for the ahead navigation. On the contrary, the rotation of the hub 2 imposed by the engine in a second rotation way R2, preferably anticlockwise, is usually used for the reverse-motion navigation.

The propeller further comprises at least one elastic element 8 interposed between the hub 2 and the cylindrical casing 3 of the propeller and, as it will be better seen hereinafter, according to a possible embodiment between at least one intermediate element 11 and the cylindrical casing 3 of the propeller. The at least one elastic element is adapted to control and adjust the relative rotation motion between the hub 2 and the cylindrical casing 3 of the propeller, when the elastic element is working, as it will be better detailed in the following. In fact, the preload of the elastic element allows the deformation thereof only when the resistant torque opposing the rotation of the propeller exceeds the torque given by the preload of the elastic element 8. Before the deformation of the elastic element 8 begins, preferably the propeller will act as a fixed-pitch propeller.

It should also be noted that according to an aspect of the present invention, the propeller can be provided with at least one elastic element 8' properly sized in order to bring the blades back to the feathered position, i.e. the position with infinite pitch, when the engine is off.

Advantageously, such elastic element 8' allows the blades to be brought back to the feathered position, and thus with relative angular position of hub and cylindrical casing of the propeller, without using the fluid dynamic force of the blades. As better explained in the following, such elastic element 8' sized to bring the blades back to the feathered position, can be arranged between the hub and the cylindrical casing in a predefined position along the hub axis, so that the latter is arranged between a driving portion (tooth) of the hub and a driven portion of the cylindrical casing of the propeller (as can be seen, for example, in FIG. 9).

According to an aspect of the invention, the elastic element 8' is interposed between the cylindrical casing 3 and the hub 2, in order to generate a torque adapted to rotate the hub 2 with respect to the cylindrical casing 3 of the propeller, or vice versa, so as to arrange these components 2, 3 in at least one predetermined relative position in which the blade, or blades 4, are arranged in feathered position with respect to the fluid hitting them, or in a position in which the blades are arranged according to a predetermined fluid dynamic pitch.

The torque generated by the at least one elastic element 8' is able to bring the blades back to the predetermined position when the engine rotationally coupled to the propeller and, in particular to the hub 2, imposes a null engine torque to the hub 2.

In other words, when the engine torque is no longer transmitted from the engine to the propeller, and in particular to the hub 2, or when the engine torque is decreased, the generated torque by the elastic element 8' causes the relative rotation of the hub 2 and the cylindrical casing 3 of the propeller so that these two components can be brought back to a predetermined relative position.

The hub 2 reaches a relative angular position with respect to the cylindrical casing 3 so that the fluid dynamic pitch of the blades is infinite, that is, so that the fluid dynamic resistance provided by the propeller can be minimized. Therefore, when no engine torque is applied to the hub 2 by the engine and in general when a null torque (null engine torque) is applied to the propeller by the engine, the blades 4 are automatically arranged in feathered position, or according to a preset fluid dynamic pitch.

In fact, the at least one elastic element 8' the propeller is provided with, generates a torque having strength greater than the friction hampering the relative rotation of the hub 2 with respect to the cylindrical casing 3 of the propeller, when the engine imposes a null engine torque to the hub 2.

Indeed, the at least one elastic element 8' is selected so that, when not deformed or minimally deformed, it generates a torque having strength greater than the friction hampering the relative rotation of the hub with respect to the cylindrical casing of the propeller, when said engine imposes a null engine torque to the hub.

Furthermore, the at least one elastic element 8' is selected so that when deformed or maximally deformed, it generates a torque whose strength is smaller than the torque imposed by the engine to the hub, and thus to the propeller.

In other words, the strength of the torque generated by the elastic element 8' the propeller is provided with, is such as not to affect the kinematic system adjusting the fluid dynamic pitch the propeller is provided with.

Figure 9:
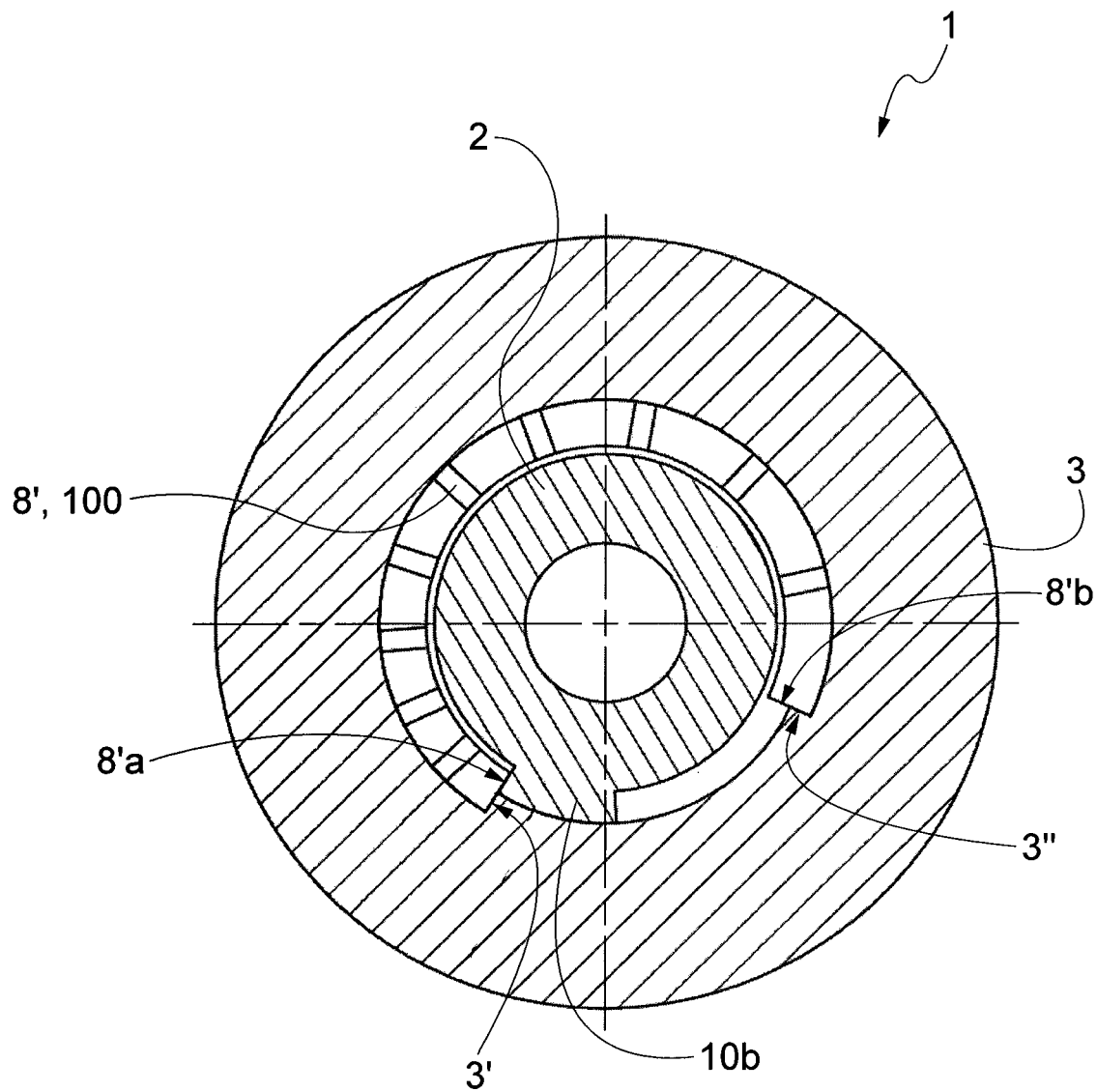
FIG. 9 is a sectional view along a plane perpendicular to the hub axis, in which there is at least one elastic element sized to bring back the blades to the feathered position, according to a possible embodiment of the propeller of the present invention.

In detail, as can be seen for example in FIG. 9, in a predefined section along the axis of the hub the latter is provided with a driving portion 10b intended to contact the ends 8'a, 8'b of the elastic element 8' arranged in a cavity of the cylindrical casing 3 of the propeller, and in particular between two surfaces 3' and 3".

When the engine is stopped and no engine torque is transmitted to the propeller, the hub portion 10b, as a result of the contact with the end 8'a of the elastic element, is automatically brought back to the angular position with respect to the cylindrical casing of the propeller, thus causing the blades to be positioned at their feathered position.

Alternatively, the elastic element 8' can be arranged at the propeller section along the hub axis where the elastic element 8 designed to adjust the fluid dynamic pitch, is arranged. In this case, as can be seen for example in FIGS. 10 and 10a, the elastic element 8' to bring the blades back to the feathered position will be interposed between the hub 2 and the intermediate element 11 (as can be seen for example in FIGS. 10, 10a).

It should be noted that the elastic element 8' to bring the blades back to the feathered position, is properly sized in order to generate on the hub and the cylindrical casing of the propeller very low torsional moments able to overcome frictions that oppose the relative rotation between the hub and the cylindrical casing when the engine is off. In fact, the function of such elastic element 8' is to cause the blades to rotate around their axis, when the engine is off (and therefore with null propulsive thrust). As a result, in these operating conditions, the only force to be overcome is given by frictions.

In detail, according to a possible embodiment, the propeller may comprise at least one elastic element 8 for adjusting the fluid dynamic pitch during the propeller operation, i.e. when the engine imposes an engine torque to the propeller.

Therefore, the strength of the elastic element 8' adapted to bring the blades back to the feathered position will be negligible, or in any case lower than the at least one elastic element 8, so as not to affect such adjustment.

At the same time, the strength of the elastic element 8' adapted to bring the blades back to the feathered position will be such as to allow the overcoming of friction forces acting on the propeller when no engine torque is transmitted to the propeller by the engine.

It should also be noted that, according to an aspect of the present invention, the propeller can be provided with at least one elastic element 8", which is appropriately sized in order to eliminate shocks and dynamic stresses caused by sudden maneuvers and/or any obstacles that can suddenly oppose the propeller rotation. The elastic element 8" is sized so as to prevent abrupt contact between the hub and the cylindrical casing of the propeller in given conditions, for example when the rotation way of the engine is suddenly reversed (abrupt maneuvers) and/or when the propeller rotation is suddenly stopped, for example as a result of a contact with an external body.

As will be better seen in the following, this elastic element 8" may be arranged inside the hub 2, by interposing an intermediate element 2' between the hub and the drive shaft. Said element 2', that is preferably tubular-shaped, is integral with the drive shaft, as depicted for example in a possible embodiment in FIGS. 11 and 12.

As already mentioned referring to the elastic element 8', in order to bring the blades back to the feathered position, as an alternative even the elastic element 8" can be arranged at the propeller section along the hub axis where the elastic element 8 designed to adjust the fluid dynamic pitch, is arranged. In this case, as can be seen for example in FIGS. 10 and 10a, the elastic element 8" to eliminate shocks, will be interposed between the hub 2 and the intermediate element 11. (as can be seen for example in FIGS. 10, 10a). It should be noted that in these FIGS. 10, 10a) the elastic elements 8' and 8" are depicted between the hub 2 and the intermediate element. Clearly, depending on the size of the elastic element and particularly on the generated torsional moment, the elastic element will operate either to bring the blades back to the feathered position or to eliminate shocks.

It should be noted that the choice of introducing the elastic elements 8', 8" (in combination with, or as an alternative to, one another), to bring the blades back to the feathered position and to decrease shocks, is made based on the needs of the propeller user, thereby providing high degree of customization of the propeller itself.

According to a preferred embodiment, the at least one elastic element 8 for adjusting the fluid dynamic pitch, and/or the at least one elastic element 8' to bring the blades back to the feathered position, and/or the at least one elastic element 8" to eliminate shocks and dynamic stresses caused by abrupt maneuvers and/or obstacles, comprises at least one spring 100 made by a leaf which will be described in more detail below with reference to FIGS. 4-8a. Such a spring 100 is preferably provided with cross notches and is bent to form a bush.

What described herein referring to the elastic element 8, 8', 8" can be referred to the spring 100, and vice versa.

Advantageously, as mentioned, the flat spring is bent to form a bush housed in an annular space (if seen in a section crossing the propeller axis).

According to an aspect of the present invention, the at least one elastic element 8 for adjusting the fluid dynamic pitch, is preloaded to prevent its deformation until the resistant torque opposing the propeller rotation is lower than the torque generated by the preload of the at least one elastic element 8.

Moreover, before the deformation of the elastic element 8 begins, and then from the beginning of the engine rotation until the beginning of the deformation of the elastic element, the blade/s 4 is/are preferably arranged on at least one first fixed fluid dynamic pitch.

As mentioned, advantageously the propeller according to the present invention allows the at least one elastic element to be preloaded.

More in detail, the at least one elastic element 8 is preloaded and then its action range, i.e. its activation range, can be set based on the use needs. The elastic element will not start immediately to adjust the fluid dynamic pitch of the blades, by deforming itself, when the engine is started. In fact, advantageously the preload of the elastic element allows its deformation, and preferably its compression, only when the torque opposing the propeller rotation exceeds the torque generated by the at least one preloaded elastic element 8.

It follows that, until a value of the resistant torque becomes higher than the torque generated by the elastic element 8, the propeller according to the present invention will act as a fixed-pitch propeller and the blades 4 will be arranged on a first fixed fluid dynamic pitch that, as will be evident in the following, the propeller user could select and modify.

Preferably, the blades are arranged at the first fluid dynamic pitch, preferably adapted for the ahead navigation, following the rotation according to a first rotation way R1 of the hub 2 with respect to the cylindrical casing 3 of the propeller in an angular range α of free rotation of the hub 2 with respect to the cylindrical casing 3 of the propeller.

The first fixed fluid dynamic pitch of the blades 4 is preferably selected so that to be the fluid dynamic pitch most suitable for the ahead navigation and, in particular, in the first and second propeller use steps, i.e. in the maneuver and cruising steps.

In fact, as the engine rotation speed increases, the first fluid dynamic pitch of the blades 4 is not modified and, in particular, it will not begin immediately to decrease under the adjustment effect of the elastic element 8, as it happens for the propellers of the known art.

In fact, the preload of the elastic element 8 makes the first fluid dynamic pitch constant until the resistant torque opposing the propeller rotation would exceed the torque generated by the preload elastic element.

Only subsequently, when the resistant torque will be higher than the torque generated by the preloaded elastic element, it will be able to deform and then to modify the fluid dynamic pitch, preferably causing a decreasing thereof, so that the engine can reach its maximum rotation speed and to allow the high speed navigation in the third use step of the propeller.

Figure 2:
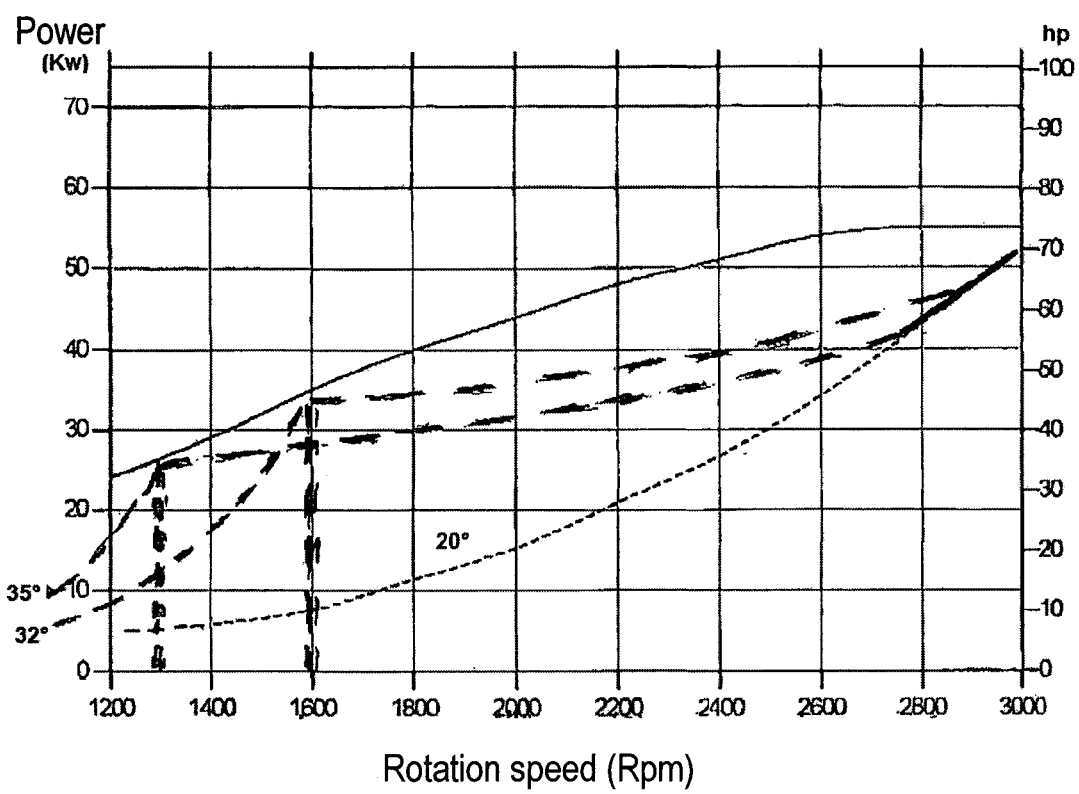
FIG. 2 is a graph showing the power curve of an engine to which the propeller can be coupled, in which it can be seen the absorption curve of a fixed-pitch propeller known in the art and the absorption curves of two possible embodiments of the propeller according to the present invention, in which the first set fluid dynamic pitch is different.
Figure 3A:
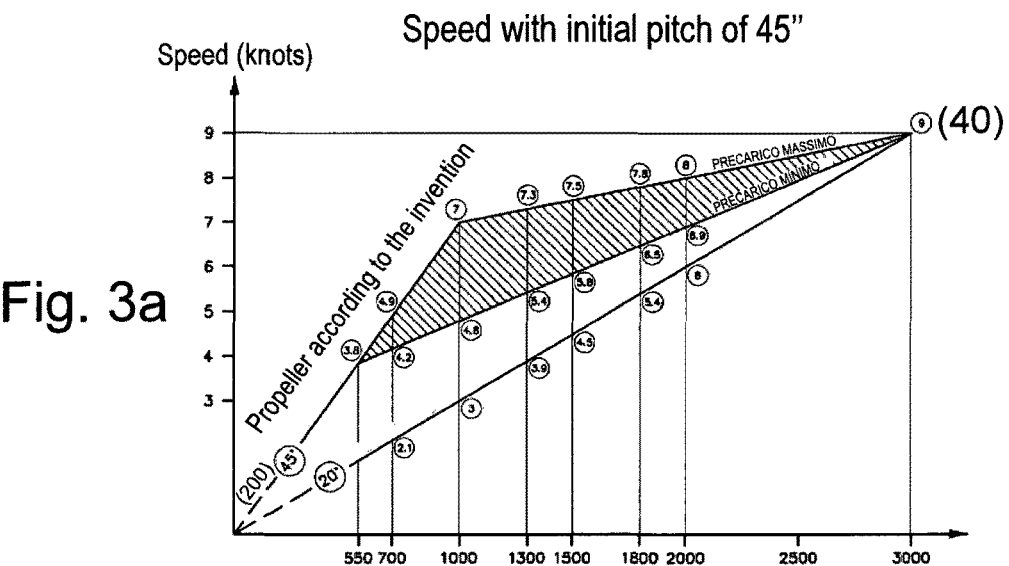
FIGS. 3a, 3b and 3c show the variation of the navigation speed depending on the rotation speed of the engine of a propeller according to the present invention, respectively for different values of the first set fluid dynamic pitch, in which the comparison with a fixed pitch propeller known in the art is further visible.
Figure 3B:
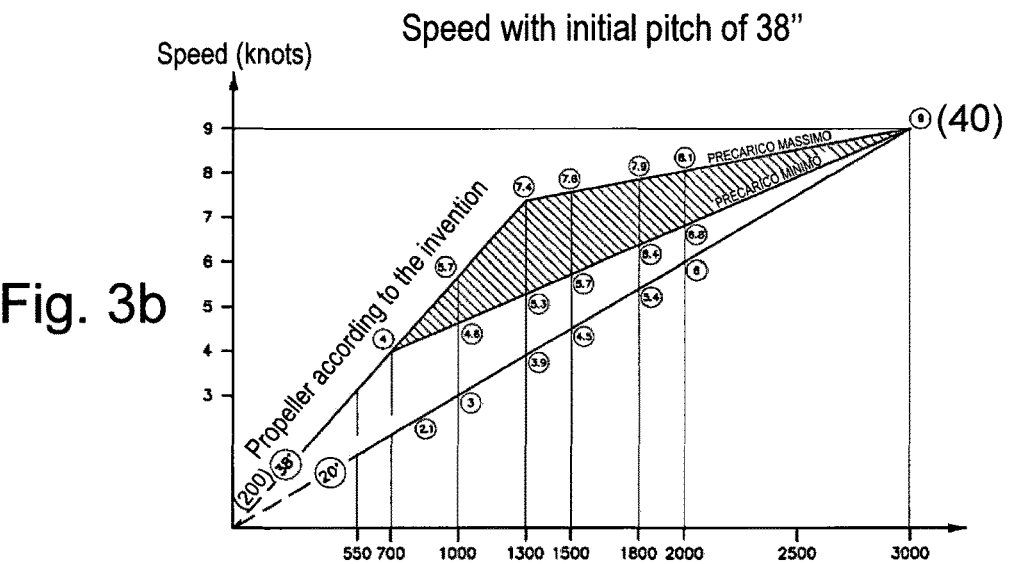

The above described operation of the propeller is graphically visible in FIG. 2, as well as in FIGS. 3a, 3b e 3c. FIG. 2 shows the power curve of an engine (supplied power in relation to the rotation speed, depicted as a solid line) and the absorption curve of a propeller known in the art and having fixed pitch (depicted as a tightly-dashed line and usually approximated by an exponent equal to 2.5 or 3) and two absorption curves of two possible propeller embodiments according to the present invention (depicted as dashed lines).

As mentioned, the absorption propeller curves refer to the power and then the load the propeller requests, and they can provide information of the resistant torque opposing the rotation of the propeller itself.

In the embodiment depicted in FIG. 2, the fixed-pitch propeller of the known type has a fluid dynamic pitch of 20°, whereas the first embodiment of the propeller according to the present invention has a first fluid dynamic pitch set to 38° (the dashed line on top), whereas in the second propeller embodiment according to the present invention the first fluid dynamic pitch is set to 30° (the dashed line on the bottom). In fact, the graph of FIG. 2 shows two absorption curves of two propeller embodiments according to the present invention, in which the first fixed fluid dynamic pitch is different and it has been selected and set based on the user needs.

Figure 3C:
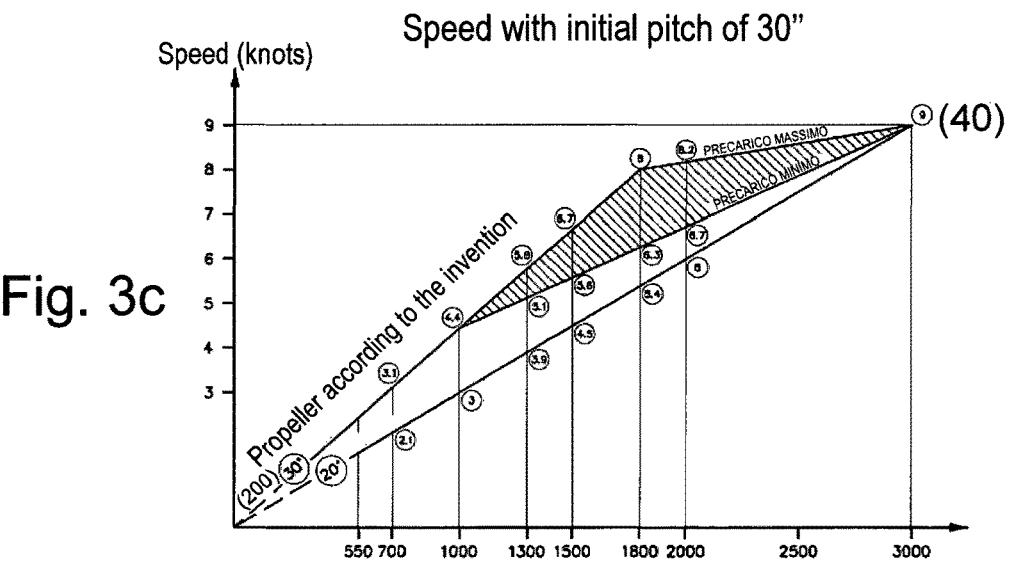

The fixed fluid dynamic pitch, as better detailed in the following, is of a type the user can modify and allows having a high efficiency during the maneuvers and the cruising step. The modification of the slope in the absorption curve of the propeller according to the invention (slope change of dashed lines happening in the two curves at 1300 revolutions and 1600 revolutions, respectively) points out the deformation beginning of the elastic element and the consequent modification of the fluid dynamic pitch, and in particular its decrease until the final pitch has been reached, the latter being adjustable too as it will be more evident in the following. FIGS. 3a, 3b and 3c show the variation of the navigation speed depending on the rotation speed of the engine of a propeller according to the present invention, respectively for different values of the first set fluid dynamic pitch, in comparison with a fixed pitch propeller known in the art.

In the example depicted in FIGS. 3a, 3b, 3c, the fixed-pitch propeller of the known type has a fluid dynamic pitch of 20°, whereas the first embodiment of the propeller according to the present invention has a first fluid dynamic pitch set to 45° (FIG. 3a), in the second propeller embodiment according to the present invention the first fluid dynamic pitch is set to 38° (FIG. 3b), and in the third propeller embodiment according to the present invention the first fluid dynamic pitch is set to 30° (FIG. 3c).

The numeral reference (200) placed in the lower left part of the charts of FIGS. 3a, 3b, 3c denotes that the first fluid dynamic pitch is adjusted by convenient means 200 better described in the following.

The numeral reference (40) placed in the upper right part of the charts of FIGS. 3a, 3b, 3c denotes that the operation range of the propeller is limited by a stop 40 of the rotation of the hub 2 with respect to the cylindrical casing of the propeller that will be better described in the following.

The fixed fluid dynamic pitch, as mentioned being of a type the user can modify, allows having a high efficiency during the maneuvers and the cruising step. The modification of the slope of the straight line (at 1000 rpm in the chart of FIG. 3a, 1300 rpm in the chart of FIG. 3b, 1800 rpm in the chart of FIG. 3c) points out the elastic element starts to deform and the consequent modification of the fluid dynamic pitch, and in particular its decrease until the final pitch has been reached, the latter being adjustable too as it will be more evident in the following.

The dotted area denotes how the incidence point with the straight line defining the initial pitch can be modified by modifying the preload of the elastic element. It follows that the preload adjustment allows thus displacing the point in which the deformation of the elastic element starts and, consequently, allows modifying the fluid dynamic pitch.

The advantageous operation of the propeller according to the present invention is graphically visible in FIG. 2. In fact, the absorption curves of the propeller according to the present invention are much closer to the curve of power supplied by the engine than to the absorption curve of a known fixed-pitch propeller. Moreover, from the charts of FIGS. 3a, 3b, 3c, it can be immediately noticed how cruising navigation speeds much higher than those of fixed-pitch propellers can be reached, and how it is further possible modifying the propeller operation and, in particular, the start point of modification of the fluid dynamic pitch by adjusting the preload of the elastic element. According to an aspect of the present invention, as visible in FIGS. 1b, 1c, 10, 10a, the at least one elastic element 8 for adjusting the fluid dynamic pitch is interposed between the hub 2 and the cylindrical casing 3, preferably in a space S having annular shape.

The hub 2 comprises a driving portion 10, that can be made for example as a circumference section having diameter greater than that of the hub 2 itself, which is adapted to engage the driven tooth 3a, directly or indirectly, obtained on the inner surface of the cylindrical casing 3 of the propeller.

Preferably the elastic element 8 comprises two ends 8a and 8b which are contacted against two corresponding abutting surfaces 7a, 7b between which the elastic element extends. More in detail, according to a preferred embodiment, the spring 100 has two ends 100a and 100b placed in contact with two corresponding abutment surfaces 7a, 7b. Also if in the following reference will be made to the ends 8a, 8b of the elastic element, the description is applied to the ends 100a, 100b of the spring 100.

The abutting surfaces 7a, 7b can be made, at least partially, directly on the hub 2 and the cylindrical casing 3 so that the elastic element could extend, and then being interposed, between these two components 2, 3 of the propeller. According to a possible embodiment and as shown in attached figures, the ends 8a and 8b of the elastic element are contacted against two abutting surfaces 7a and 7b made on the cylindrical casing 3 of the propeller.

According to an embodiment of the present invention, an intermediate element 11 is interposed between the hub 2 and the cylindrical casing 3 so that the contact between the driving portion 10 and the driven tooth 3a would happen directly by means of the intermediate element 11. Moreover, at least part of an end 8b of the elastic element is in contact with the hub 2 and/or the intermediate element 11, to allow the deformation, and preferably the compression, of the elastic element 8.

Figure 1A:
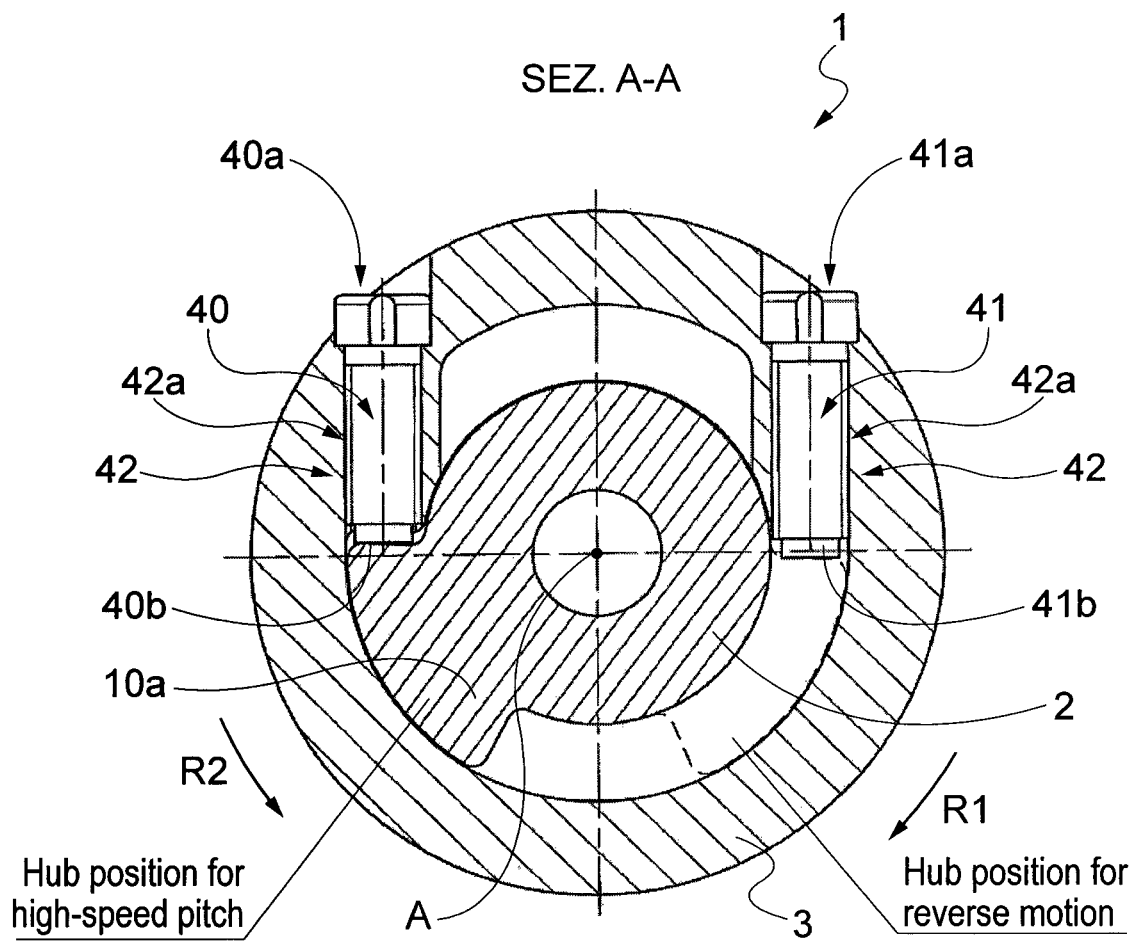
Figure 1B:
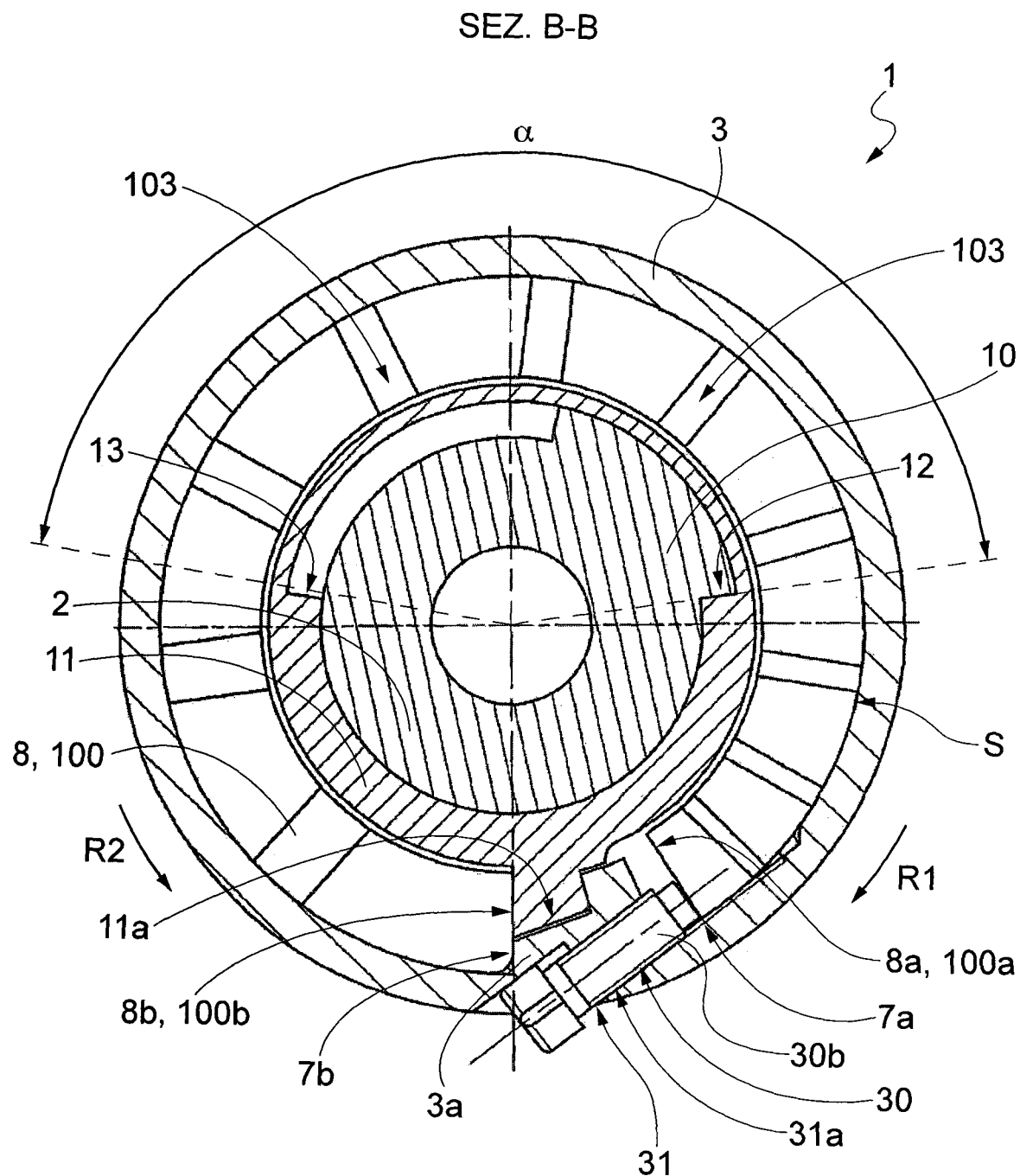

According to a preferred embodiment and as shown in FIGS. 1b, 1 c, 10, 10a, the intermediate element 11 comprises at least one driving tooth 11a engaging an end 8b of the elastic element to allow its deformation when the hub 2 is rotated in the first rotation way R1 and rotates the intermediate element 11 in the same way.

As mentioned, the propeller comprises means or elements 30 to modify the preload of at least one elastic element 8. Such means 30 allow to set the operation range of the elastic element 8, i.e. they allow to set when the elastic element will start its deformation in order to modify the fluid dynamic pitch of the blades.

In particular, by modifying the preload it is possible to determine at which resistant torque opposing the propeller rotation, and then also at which engine operating conditions, and in particular at which engine rotation speeds, the elastic element will begin to deform and then to allow the modification of the fluid dynamic pitch for the high-speed navigation.

The means 30 for modifying the preload of the elastic element 8 can modify the space S available for its extension, i.e. the space inside which the elastic element 8 is housed. Preferably, the space S is defined by two abutting surfaces 7a and 7b for the ends 8a and 8b of the elastic element and then such means 30 can modify the position of at least one abutting surface 7a, 7b for at least one end 8a, 8b of the elastic element.

According to a preferred embodiment, the means 30 modify the position of the abutting surface 7a for the end 8a of the elastic element 8, thereby reducing the spaces for its extension and then preloading it, following its compression, in a reduced space.

As it will be better seen later, the means 30 for adjusting the preload act on the spring 100 directly or indirectly, preferably at the portions of the spring 100 with higher elastic modulus, i.e. at the portions of the spring 100 deforming before other portions of the spring, the applied force being equal.

Such portions have typically intermediate thin portions (or strips), or anyway having size smaller than other strips of the spring 100.

According to an embodiment, the means 30 for modifying the preload of the elastic element 8 comprise at least one element, preferably elongated, extending through the cylindrical casing 3 of the propeller so that to reach the elastic element 8 placed inside the propeller.

According to an aspect of the present invention, the means 30 for adjusting the preload comprise an element, at least partially threaded such as for example a screw, which is housed in a corresponding seat 31, having at least one threaded portion 31a, of the cylindrical casing of the propeller.

According to an aspect of the present invention, the at least one threaded element 30 is a screw comprising at least one shank 30b. The threaded element comprises a tightening head 30a that could reach a contact position with at least one abutting portion of the seat 31 of the cylindrical casing of the propeller in which it is installed.

Preferably, the threaded elements, or screws 30, are installed completely by a complete screwing inside the appropriate seat 31 the propeller is provided with. With the expression "completely installed" it is intended that the screws reach a contact position with at least one abutting portion of which the seat 31 is provided with and in which they are installed. By doing so, the user inserts and screws the mobile element completely inside the seat up to reach the position contacting the abutting portion of the seat, so that the threaded element reaches a fixed and univocal position inside the seat and then could determine the modification of the preload of the elastic element in the desired way.

It has to be noticed that the term "screw" is herein used to suggest any element provided with at least one threaded shank having a predetermined length. The screw and generally every other element, can be further provided with at least one portion, or head, able to reach at least one position contacting the at least one abutting portion of the seat inside which the screw is installed.

It has to be noticed that the propeller according to the present invention can comprise a plurality of threaded elements having different length one from another. By doing so, the elements 30 will each define a determined preload of the elastic element.

The user can then have different elements 30, or screws, having different lengths and being interchangeable with each other, in order to adjust the preload of the elastic element as desired.

Alternatively, the threaded elements 30 can not be inserted-sunk in the seat 31 completely, and then their extent inside the cylindrical casing of the propeller for the modification of the preload will be adjusted depending on their penetration depth inside the seat 31. The position modification of the abutting surface 7a for the elastic element 8 can be carried out directly by said means 30, i.e. the end of the elongated element constituting the abutting end. In this case, the position of the abutting end, and then of the preload of the elastic element, is directly modified following the modification of the extent inside the cylindrical casing of the propeller. Alternatively, the means 30 and in particular the threaded element modifies directly the displacement of the mobile abutting surface, following its insertion inside the cylindrical casing of the propeller.

It has to be further noticed that, according to possible embodiments, a plurality of means 30, for example a plurality of screws having different length, can be provided to the user. Alternatively, the modification of the preload can be carried out by modifying the extent of the means 30 inside the corresponding casing of the propeller, for example by modifying the screwing of the threaded element 30 into the corresponding seat 31.

In this case the adjustment of the preload is achieved by selecting a screw whose length provides for a well-defined high preload (to be set). The adjustment of the preload will be made by decreasing the afore said high preload by amounts precisely defined by the grooves notched in the head of the screw 30.

Referring to dotted areas shown in FIG. 3a, 3b, 3c (i.e. the areas in which the torque opposing the rotation exceeded the minimum preload, and therefore the at least one elastic element 8 could begin to compress) by rotating the screw, for example counterclockwise, of a single range between one groove and the next one (thus reducing the preload), the fluid dynamic pitch of the blades is reduced, for example by one degree, the torque opposing the rotation being unchanged.

The thus obtained preload is fixed by inserting into the appropriate seat the locking grub screw which prevents any rotation of the screw 30, as and a result during navigation the propeller pitch is not changed in any unwanted way (for example due to undesired loosening of the screw 30).

It should also be noted that, according to an aspect of the present invention, the adjusting screw or screws 30 may comprise one or more grooves on the outer surface of the head, thus allowing a predetermined and fine adjustment of the angular position of the screw, as described for example in the Patent Application WO2014/102559.

As mentioned, the propeller according to the present invention comprises at least one intermediate element 11 interposed between the hub 2 and the casing 3 of the propeller. The intermediate element is provided with a first and a second contacting surfaces 12, 13 contacting the hub 2, which are spaced one from another and define an angular range α. As can be seen in the embodiment shown in FIGS. 1b, 1c, the angular range α is the angle of free rotation of the hub 2 with respect to the cylindrical casing 3.

The angular space α determines the formation of a space of free relative rotation of the hub 2 with respect to the cylindrical casing 3, which allows a modification of the fluid dynamic pitch of the blades 4, following the idle relative rotation of these two components 2 and 3 without the intervention of the at least one elastic element 8.

As mentioned, the hub 2 of the propeller according to the invention, comprises a driving portion 10, i.e. a circumference section having a diameter greater than that of the hub 2 itself, which is adapted to engage, through the intermediate element 11, the driven tooth 3a obtained on the inner surface of the cylindrical casing 3 of the propeller.

The intermediate element 11 is interposed in the circumferential space between the hub 2 of the propeller and the cylindrical casing 3 of the latter, and it fills said circumferential space partially. According to a possible embodiment, the intermediate element 11 is preferably realized in the ring shape, or at least a ring-portion shape, preferably made of metal.

The relative rotation of the hub 2 with respect to the cylindrical casing 3 of the propeller in the angular range α, allow the blades to be arranged at a fluid dynamic pitch by means of the kinematic system transforming the rotatory motion of the propeller.

As can be seen in figures, the driving portion 10 engages the intermediate element 11 in two different positions. In other words, the intermediate element 11 is shaped so that to comprise two contacting surfaces 12 and 13 (directly or indirectly) in contact with the driving portion 10, depending on the rotation way of the hub 2 to transfer the rotation from said hub to said intermediate element 11.

Figure 10:
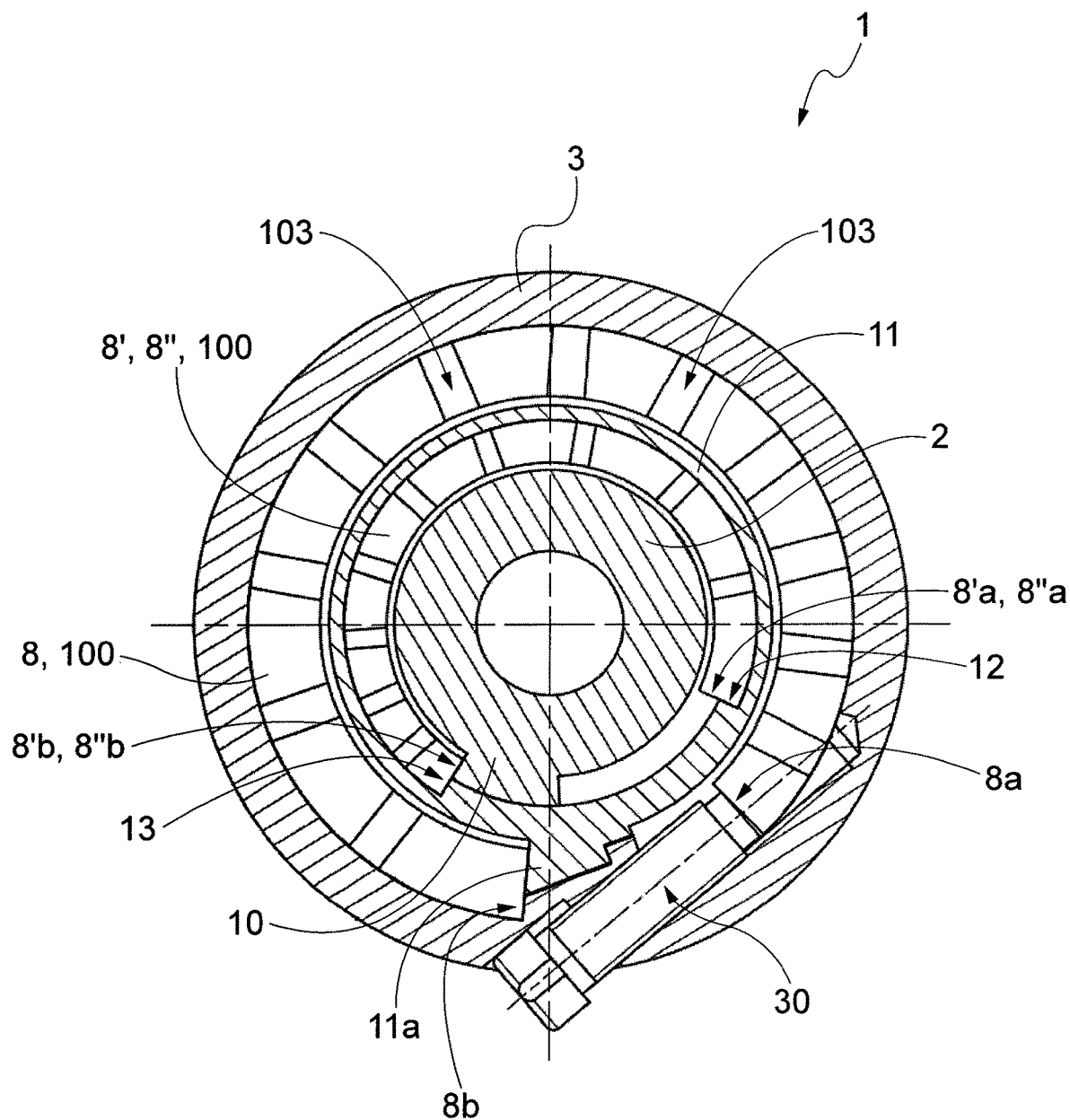
FIG. 10 is a sectional view of FIG. 1b in which, in addition to an elastic element for adjusting the pitch, there is at least one second elastic element sized, according to possible embodiments, to bring the blades back to the feathered position or to eliminate or at least decrease shocks and dynamic stresses that may be caused by sudden maneuvers and/or obstacles opposing the propeller rotation.
Figure 10A:
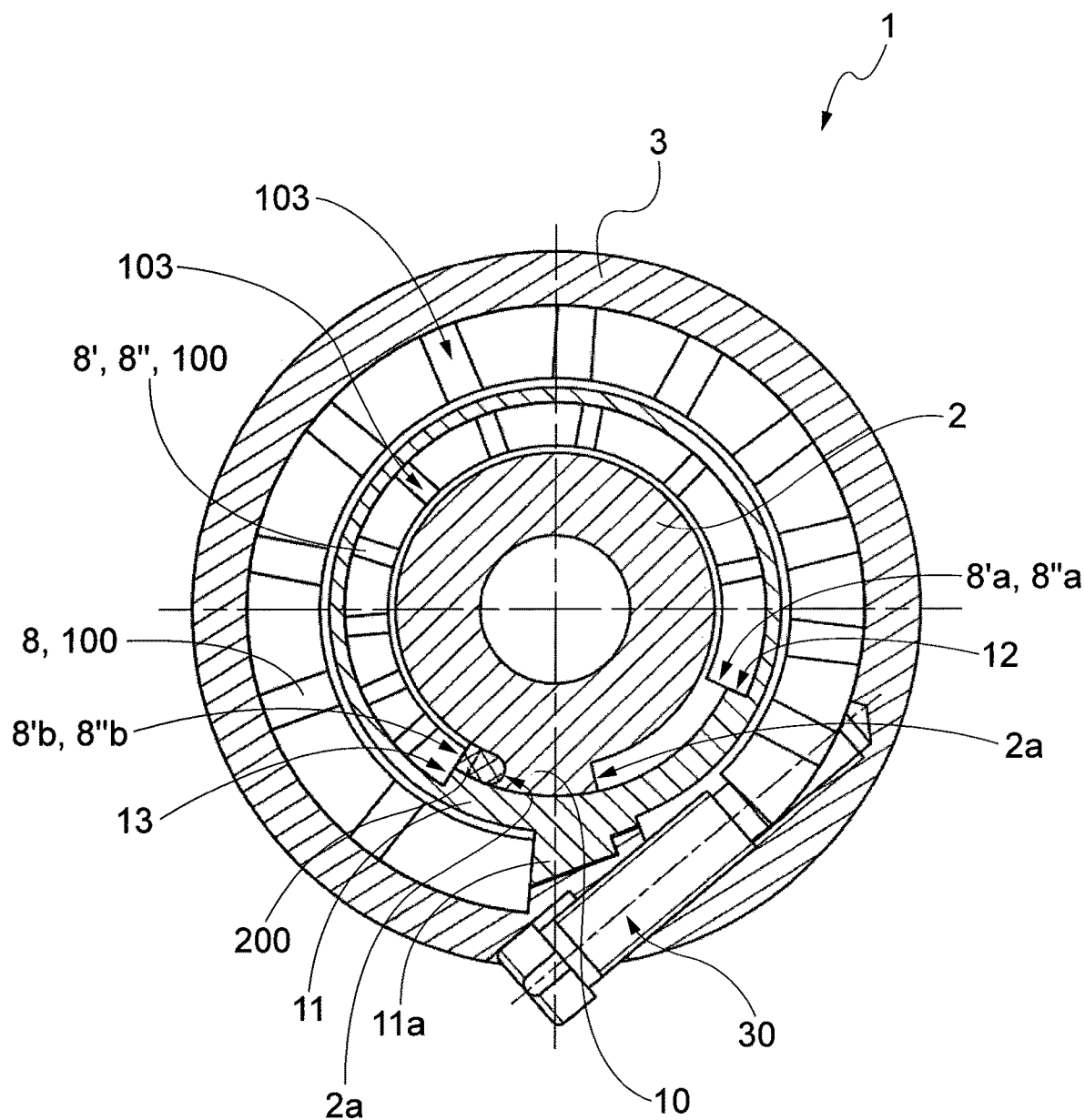
FIG. 10a is a sectional view of FIG. 10, in which there are means for adjusting the fluid dynamic pitch of the blades for navigating at low rotation speeds (such as, for example, the pitch during the maneuver step), according to a possible propeller embodiment of the present invention.

By reference to the direct or indirect contact between the surfaces 12 and 13, it is meant that the force can be transmitted from the hub 2 to the intermediate element 11 for example by interposing a further elastic element 8', 8'' which can be sized, as above mentioned, either to bring the blades back to the feathered position or to decrease shocks, as can be seen for example in the embodiment of FIGS. 10 and 10a.

It has to be noticed that an elastic element 8', 8'' is arranged with its own ends (8'a and 8'b, 8''a and 8''b) partially contacting the two surfaces 12 and 13 of the intermediate element 11. At least part of the ends of the elastic element 8', 8'' comes into contact with the driving portion 10, depending on the rotation way of the hub 2, thereby transferring the rotation to the intermediate element, by means of the interposition of the elastic element 8', 8''.

As mentioned above, if the elastic element 8' is sized to bring the blades back to the feathered position, then the generated torsional moment will be so as to only overcome the friction forces when the engine is off in order to bring the blades back to the feathered position, and thus to take the position illustrated in FIGS. 10 and 10a. On the contrary, when the engine is operating and the hub contacts the ends of the elastic element 8'a or 8'b, it will not affect the pitch modification adjusted by the other elastic element 8 previously described, because the torsional moment generated by the elastic element 8' is very small. Therefore, the elastic element 8' will be immediately compressed, when the engine is operating, thus not affecting the adjustment of the fluid dynamic pitch through the elastic element 8.

The same applies to the case in which the elastic element 8'', interposed between the hub 2 and the intermediate element 11, is sized to decrease shocks and dynamic stresses. It will not affect the pitch adjustment through the elastic element 8.

Now, turning back to the adjustment of the fluid dynamic pitch of the blades, by means of the elastic element 8, the first surface 12 of the intermediate element 11 is intended to contact the driving portion 10 (as mentioned directly or indirectly, for example by the interposition of the elastic element 8', 8'' such as shown in FIGS. 10 and 10a) when the drive shaft, and then the propeller hub 2, is rotationally activated in the first rotation way R1. When the driving portion 10 of the hub 2 contacts the first surface 12 of the intermediate element 11, or when the elastic element 8', 8'' causes transmission of the rotation force from the hub 2 to the intermediate element 11, the rotation in the angular range α causes the first fluid dynamic pitch to be reached. As it will be better seen in the following, the contact between the driving portion 10 of the hub 2 and the first surface 12 of the intermediate element 11 can happen by the interposition of means 20 to set the first fluid dynamic pitch of the blades (see for example FIG. 1c). Clearly, as shown for example in FIG. 10a, also in the embodiment in which the intermediate element 8', 8'' to bring the blades back to the feathered position or to decrease shocks is interposed between the hub and intermediate element 11, there may be the means 20 for setting the first fluid dynamic pitch.

On the contrary, when the rotation way of the engine is reversed, according to the rotation way R2, the driving portion 10 of the hub 2 contacts the second surface 13 of the intermediate element 11, or when the elastic element 8', 8" causes the transmission of the rotation force from the hub 2 to the intermediate element 11. Also in this case, the contact between the driving portion 10 of the hub 2 and the second surface 13 of the intermediate element 11 can happen by the interposition of means 25 to set the blade pitch for the reverse motion (see for example FIG. 1c).

By doing so, the blades 4 will be arranged on the pitch suitable for the reverse-motion navigation.

In fact, as mentioned, preferably the clockwise rotation way is used for the advance motion, whereas the anticlockwise rotation for the reverse motion.

More in detail, when the engine imposes a clockwise rotation way R1, the driving portion 10 engages at least in part the first contacting surface 12 of the intermediate element 11 and causes the first fluid dynamic pitch to be reached which is maintained as constant until the elastic element begins to deform, and in particular to compress. As mentioned, the beginning of the deformation of the elastic element 8 will happen only when the torque opposing the propeller rotation will exceed the torque generated by the preload of the elastic element.

Only successively, as the torque opposing the propeller rotation increases, and then substantially as the engine rotation speed increases, the elastic element will begin to deform, and in particular to compress, in order to allow the modification and adjustment of the fluid dynamic pitch, and preferably a decrease of the fluid dynamic pitch suitable for the high-speed navigation.

On the contrary, when the hub is rotated in the second rotation way R2, the free rotation between the hub 2 and the casing 3 of the propeller causes the blades to be arranged on a pitch suitable for the reverse-motion navigation, which could be modified as it will be evident hereinafter.

Still referring to FIG. 1b, the rotation of the hub 2 with respect to the cylindrical casing 3 of the propeller, and in particular the relative rotation, equal to the free portion of the arc of the α angle, of the driving portion 10 up to reach the position abutting with the second surface 13 of the intermediate element 11, determines the modification of the blade pitch and the pitch suitable for the reverse-motion navigation to be reached.

The angular space α comprised between the two contacting surfaces 12 and 13 of the intermediate element 11 is adjustable by the user and it allows modifying the first fixed fluid dynamic pitch and/or the fluid dynamic pitch for the reverse-motion navigation rapidly and simply.

In fact, the propeller according to the present invention comprises means 200 for setting the first fixed fluid dynamic pitch before the deformation of the elastic element begins.

In particular, the means 200 for setting the first fixed fluid dynamic pitch modify the size of the angular range α of free rotation of the hub 2 with respect to the cylindrical casing 3 of the propeller, and in particular of the hub 2 with respect to the intermediate element 11, in the first rotation way R1.

Preferably, these means comprise at least one insert 200, such as for example a calibrated rod or a pin, to modify the size of the angular range α of free rotation of the hub 2 with respect to the cylindrical casing 3.

Preferably, the means 200 for setting the first fluid dynamic pitch before the deformation of the elastic element 8 begins, are interposed between the hub 2 and the intermediate element 11.

Figure 1C:
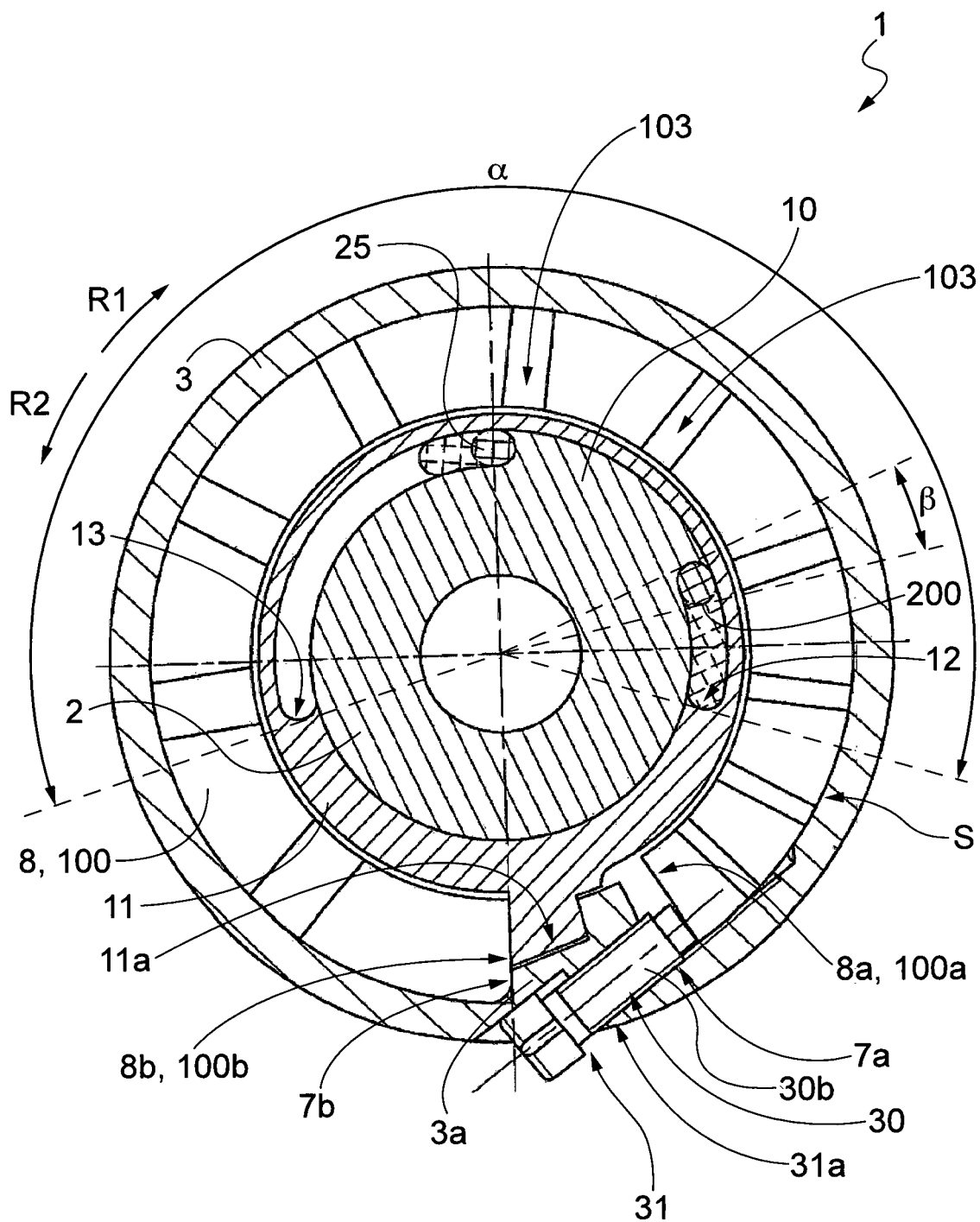

In fact, the propeller user can vary the first selected fluid dynamic pitch of the blades by installing means 200, such as for example calibrated rods with different size, as illustrated in FIG. 1c, interposed between the driving portion 10 of the hub and the contacting surface 12 of the intermediate element 11, by varying the rotation angle α between the hub and the cylindrical casing of the propeller of a 13 value corresponding to the bulk of the installed insert 200.

The substitution operations of the insert 200 are very easy and they do not need the intervention of a skilled mechanic. In fact, the insert 200 can be constrained to an ending portion of the propeller by means of a screw couple, or similar means, not shown in the attached figures.

A plurality of inserts 200 are provided to the user, such as for example calibrated rods having different size with respect to the others.

The ending portion of the propeller can be accessed easily from the outside by simply removing the propeller tip, not shown in the attached figures.

For this reason, the user can adjust the first fluid dynamic pitch by replacing the insert 200 with another one having the desired size through few and simple operations.

According to an alternative embodiment of the propeller according to the present invention, the means 200 for setting the first fluid dynamic pitch comprise one or more pins, made of a metal material. As mentioned above, the pins can be installed in the angular space between the driving portion 10 of the propeller hub 2 and the contacting surface 12 of the intermediate element 11. The rotation angle α of the hub 2 with respect to the intermediate element 11 is modified by increasing or decreasing the angle β equal to the bulk of the installed metal pins 200.

Obviously, what afore said about means 200 for setting the first fluid dynamic pitch of the propeller is applied to means 25 for setting the fluid dynamic pitch for the reverse motion, the propeller is provided with.

Furthermore, this description also applies to the embodiment in which there is the elastic element 8', 8" to bring the blades back to the feathered position, or to decrease shocks and dynamic stresses, respectively. In fact, as can be seen for example in FIG. 10a, the means 200 for adjusting the pitch can be interposed between the driving portion 10 of the hub 2 and an end of the elastic element 8', 8".

According to an aspect of the present invention, the propeller comprises at least one limit stop 40 of the rotation of the hub 2 with respect to the cylindrical casing 3 of the propeller, such as for example illustrated in the sectional view of FIG. 1a. The limit stop 41 can be used to set the fixed fluid dynamic pitch for the reverse motion of the at least one blade 4 following the rotation, in the second rotation way R2, of the hub 2 with respect to the cylindrical casing 3 of the propeller. In fact, the limit stop 41 is intended to be contacted by the portion 10a of the hub 2, which can correspond to the driving portion 10 illustrated in FIG. 1b, or else it can have an additional portion jutting from the hub 2. The limit stop 41 can be used alternatively to the afore described means 25, to set the fixed pitch for the propeller reverse motion. In fact, if means 25 are used, the means 41 cannot be used; as means 41 can be used as well if means 25 are not used.

The propeller according to the present invention comprises at least one limit stop 40 of the rotation of the hub 2 with respect to the cylindrical casing 3 of the propeller in order to set at least one final fluid dynamic pitch of the at least one blade 4 following the rotation according to the first rotation way R1 of the hub 2 with respect to said cylindrical casing 3 of the propeller. In other words, the limit stop 40 allows to adjust the final pitch the blades 4 reached when, as mentioned, following the beginning of the operation of the elastic element as the torque opposing the propeller rotation increases (and then as the engine rotation speed increases), the fluid dynamic pitch is modified and preferably decreased. Obviously, the propeller can be provided with other means, different from the limit stop 40 herein described, to set the final fluid dynamic pitch of blades that is reached at the maximum rotation speed of the engine.

Preferably, the limit stop allows to adjust the final pitch the blades reach for the maximum resistant torque opposing the propeller rotation, and then substantially at the maximum speed rotation of the engine.

Preferably, the final pitch the blades reach is selected so that the fluid dynamic pitch at the maximum resistant torque, and then substantially at the maximum rotation speed of the engine, is not too much low, and generally so that, following a possible excessive deformation (compression) of the elastic element, the final pitch does not decrease below the absorption curve of a fixed-pitch propeller that is usually used with the engine, as visible in FIG. 2.

Also if in the sectional view of FIG. 1a both limit stops 40, 41 are shown, the propeller can be provided with only one limit stop for the rotation of the hub in the first rotation way R1, or with only one limit stop for the rotation of the hub in the second rotation way R2.

It has to be noticed that the at least one limit stop 40, 41 for adjusting the final fluid dynamic pitch for the ahead motion and/or the fluid dynamic pitch for the reverse motion, is adjustable.

According to a possible embodiment, the limit stop 40, 41 comprises at least one element, at least partially threaded, that can be installed in at least one seat 42 comprising at least one threaded portion 42a.

The rotation and the consequent axial displacement of the threaded element in the at least one threaded seat, allow to modify, directly or indirectly, the position of the limit stop 40, 41 of the rotation of the hub 2 with respect to the cylindrical casing 3 of the propeller.

As before described referring to means 30 for modifying the preload, the threaded element of the limit stop 40, 41 can be composed of a thread comprising at least one shank 40b, 41b and an activating head 40a, 41a. What described referring to means 30 can be also applied to limit stops 40 and 41.

Figure 11:
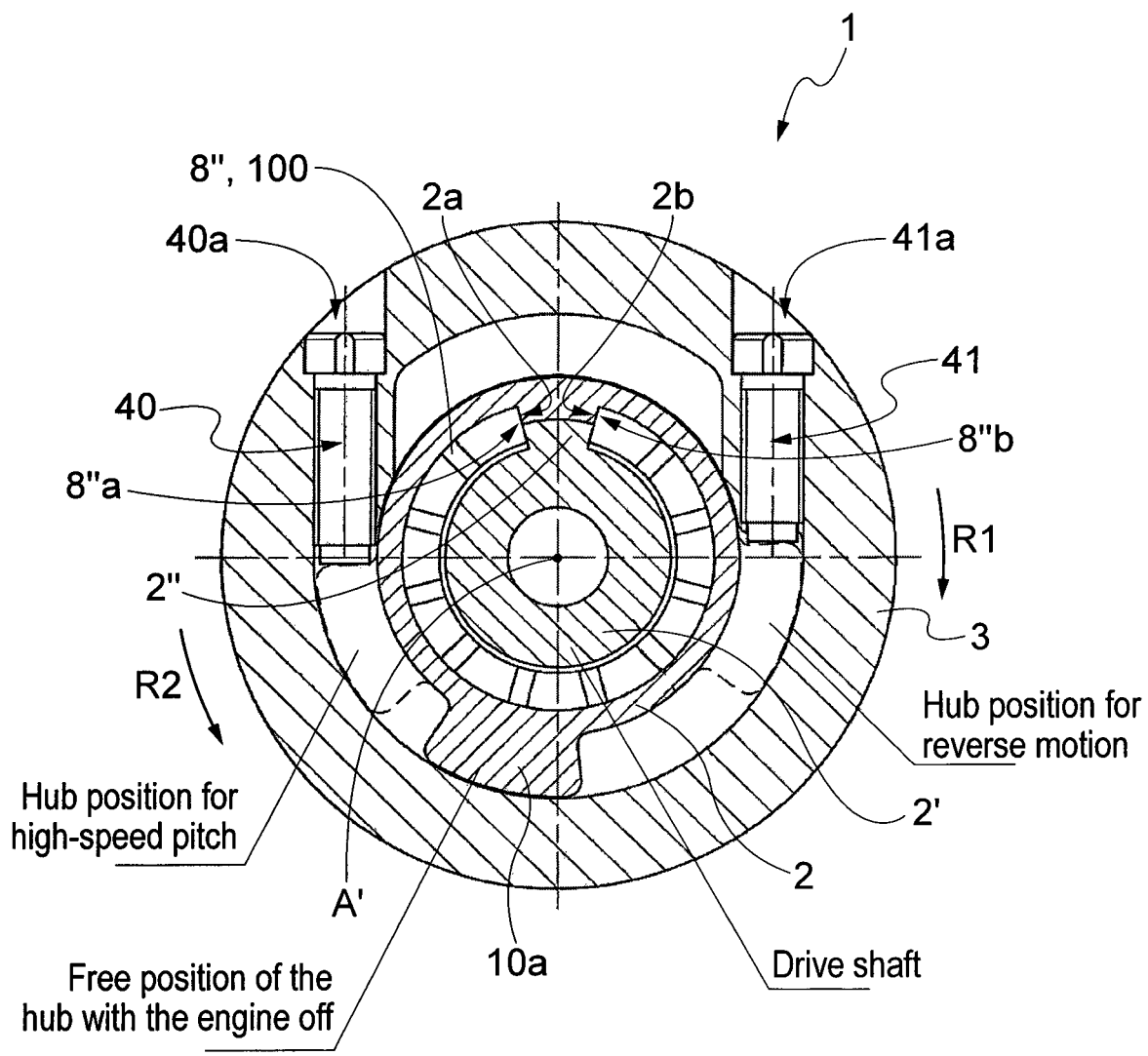
FIG. 11 is a sectional view of FIG. 1a in which there is at least an elastic element sized to eliminate or at least decrease shocks and dynamic stresses that may be caused by sudden maneuvers and/or obstacles opposing the propeller rotation.

It should be noted that according to a possible embodiment, such as shown for example in FIG. 11, the elastic element 8″ sized to decrease shocks and dynamic stresses can be arranged in the propeller section in which the limit stops 40, 41 are installed.

According to this possible embodiment, the hub 2 is partially ring-shaped and inside it there is a cavity adapted to receive an intermediate element 2′ integral with the drive shaft A′. The intermediate element 2′ is provided with a driving portion 2″ (for example shaped as a projecting tooth) intended to come in contact with two ends 8″a, 8″b of the elastic element to decrease shocks, that is housed in the cavity between the hub 2 and the intermediate element 2′.

More in detail, the hub is shaped in a way similar to the previously described intermediate element 11 and comprises two surfaces 2a and 2b spaced one from another to form a cavity in which the elastic element 8″ is installed.

Figure 12:
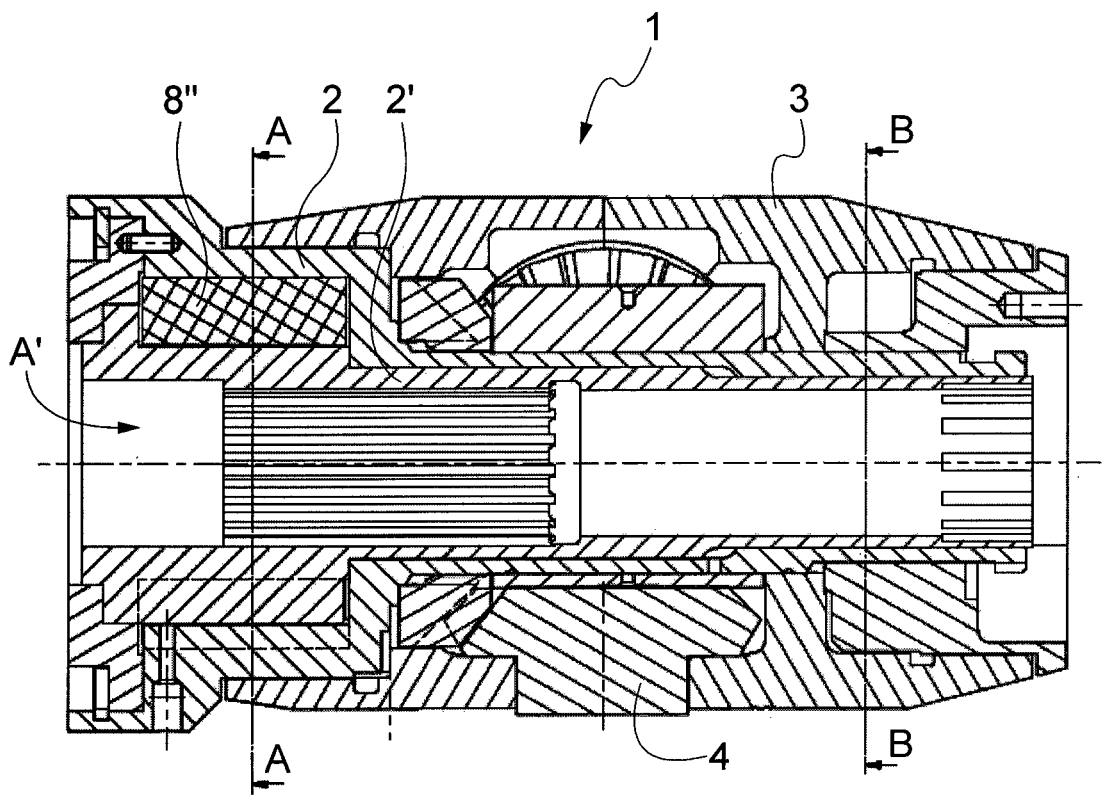
FIG. 12 shows a possible installation mode of an elastic element sized to eliminate or at least decrease shocks and dynamic stresses that may be caused by sudden maneuvers and/or obstacles opposing the propeller rotation.
Figure 12:
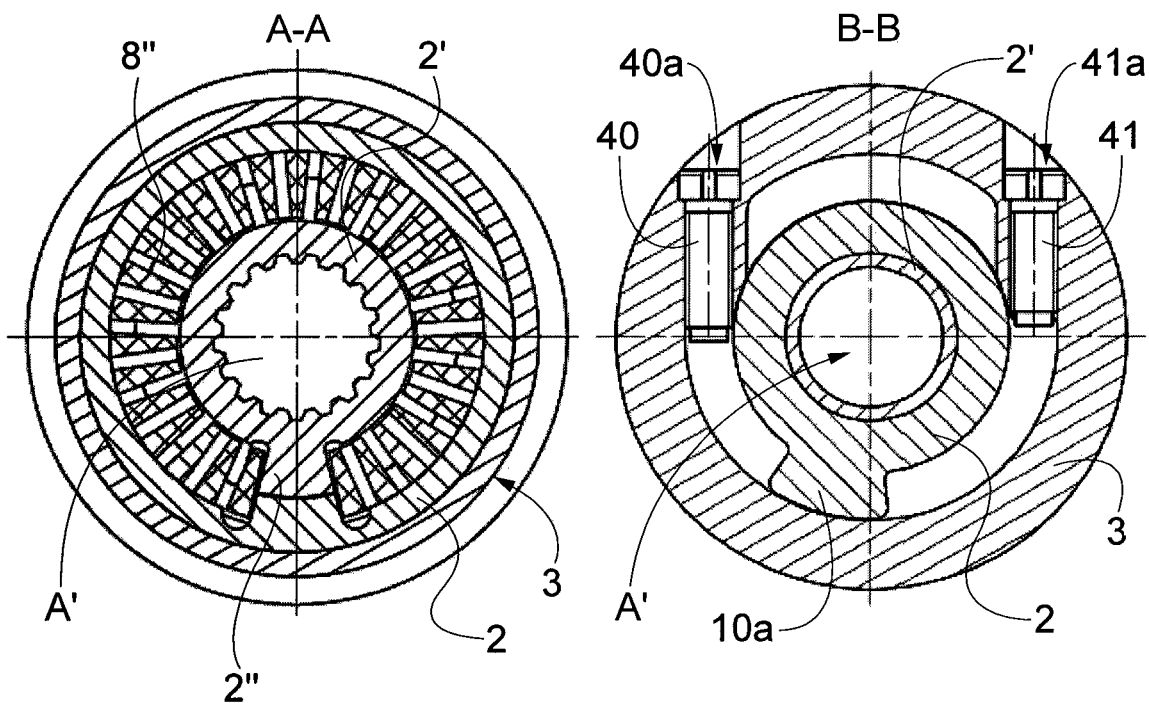

In particular, the elastic element 8″ is arranged with its ends 8″a and 8″b partially contacting the two surfaces 2a and 2b of the hub 2. At least part of the ends of the elastic element 8″ comes into contact with the driving portion 2″ of the drive shaft, depending on the rotation way thereof, thereby transferring the rotation to the hub 2 by the interposition of the elastic element 8″. Thanks to the elastic element 8″, interposed between the intermediate element 2′ and then between the drive shaft A′ and the hub 2, it is possible to decrease shocks and dynamic stresses which are generated as a result of abrupt maneuvers and/or impacts with objects therefore preventing the propeller from rotating. Another possible embodiment is shown in FIG. 12, where the elastic element 8′ is arranged in a different section from the one in which the limit stops 40, 41 are installed.

In the following it will be described a possible method of using the propeller according to the present invention, in which the at least one blade is arranged on at least one first fluid dynamic pitch, which is fixed according to a preferred embodiment, following the rotation according to the first rotation way R1 of the hub 2 with respect to the cylindrical casing 3 of the propeller in the angular range α of free rotation of the hub 2 with respect to the cylindrical casing 3 of the propeller. Such a first fluid dynamic pitch is maintained as preferably constant until the resistant torque opposing the propeller rotation is lower than, or equal to, the torque generated by the preload of the at least one elastic element 8.

In other terms, before the elastic element begins its operation, i.e. before it is deformed, the propeller acts preferably as a fixed-pitch propeller.

In fact, the at least one elastic element 8 is deformed to allow the fluid dynamic pitch of the blades 4 to be modified, when the resistant torque is greater than the torque generated by the preload of the elastic element 8.

Advantageously, the preload of the elastic element 8 can be adjusted by the propeller user to determined when, and then in which propeller and engine operating conditions, the elastic element becomes active and then it is deformed to allow the modification of the fluid dynamic pitch of the blades.

In fact, the method according to the present invention comprises the step of modifying the preload of the at least one elastic element 8 to modify the torque generated by the elastic element 8 and then to determine the value of the resistant torque opposing the propeller rotation, the at least one elastic element 8 starting to deform and adjusting the modification of the fluid dynamic pitch of the at least one blade 4 when such a value is exceeded.

The modification of the preload of the elastic element 8 is carried out preferably acting on means 30 for adjusting the preload, and preferably by modifying the extent inside the cylindrical casing of the propeller of the elongated element, or screw 30. In other words, the method provides to modify the position of at least one abutting surface 7a for an end of the elastic element so that to modify the space available for its extension, and then to cause an initial compression of the elastic element.

According to an aspect of the method of the present invention, it is provided the step of setting the first fluid dynamic pitch of the blades, i.e. the fluid dynamic pitch suitable for the ahead navigation during the maneuvers and the cruising navigation step. This step can be carried out before carrying out the step of adjusting the preload of the elastic element.

Preferably, the setting of the first fluid dynamic pitch at the desired value happens by acting on the means 200. In detail, preferably the means 200 for setting the first fixed fluid dynamic pitch are selected in order to modify, of a desired value, the size of the angular range α of free rotation of the hub 2 with respect to the cylindrical casing 3 of the propeller in the first rotation way R1.

In general, it is convenient to select the first fluid dynamic pitch for maneuvers and cruise as the pitch generating the propeller absorption curve that crosses the power curve of the engine at those revolutions, i.e. the engine rotation speeds, the user wants to use more frequently during the navigation (see FIG. 2).

In other words, depending on the engine rotation speed the user wants to use more frequently during the navigation, and in particular during the cruising step, the user will select the most suitable first fluid dynamic pitch, in addition to the most suitable preload of the elastic element.

In order to determine which are the most suitable values of the cruising navigation speed, of the cruising rotation speed and thus of the cruising pitch to meet the needs of each single user and in order to better understand which are the remarkable advantages provided by the innovative propeller object of this patent application, we believe it is useful to refer (to recall) to the concept of economical navigation. Such navigation allows the boat to travel a path as long as possible while consuming the least amount of fuel possible, i.e. it allows the maximum possible cruising range to be obtained. We recall that the innovative propeller herein described is particularly suitable for the propulsion (navigation) of heavy boats (not planing boats), namely in displacement mode, therefore what herein discussed concerns the navigation of those boats.

If a fixed-pitch propeller is used, the economical navigation is very unadaptable because the only parameter adjustable by the user is the navigation speed, obviously the engine must be able to freely rotate and easily reach its maximum rotation speed simply by accelerating. Therefore, in the art known up to now, economical navigation has always been identified, simplistically, with the value of navigation speed allowing the maximum possible cruising range to be obtained, namely the value of economical speed. For the sake of completeness, it should be noted that the value of the economical speed can be precisely determined and verified per each single boat. It can be said to a good approximation that, generally, this value is about half (and maybe even a little less) the value of the maximum speed the boat can reach, that is, the economical speed corresponds to about half of the hull speed of the boat. By using the propeller object of the present invention, the simplistic identification used hitherto, economical speed equal to economical navigation, becomes insufficient and inaccurate. In fact, by complying only with the economical speed, good cruising range can be achieved but it is still less than the maximum possible cruising range. Therefore in this way the economical navigation is not achievable, since as seen (and as defined) it provides to obtain the maximum possible cruising range. Therefore, the use of the innovative propeller discussed herein, de facto, makes obsolete the concept and identification of economical navigation used so far. Thus, this identifying concept must be replaced by a new, more complete and correct, identifying concept that we call economical navigation mode. In order to navigate with the economical navigation mode, that is, to obtain the maximum possible cruising range, three constraints-parameters must be met:

i. The navigation speed must be the economical speed which, as seen, has very specific and definite value per each single boat.

ii. The engine must generate a very specific and definite power, whose value must depart as little as possible from the value of the power strictly necessary to the boat for navigating at economical speed. In order to generate such power, the engine must therefore rotate at very specific and definite speed.

iii. The engine must be free to rotate, i.e. it must not be constricted. In other words, for any sea condition or loading condition of the boat or the like, met by the propeller, the latter should be always able to easily reach its maximum rotation speed provided by the manufacturer, simply by accelerating.

It is clear that the economical navigation mode (which requires to simultaneously comply with the three constraints), is made possible only by using a propeller which allows the variation of the pitch during the navigation. As seen, the propeller object of the present patent application provides this opportunity. Therefore, the above described result is particularly advantageous if compared with the inferior result that can be obtained by using known propellers.

If a fixed-pitch propeller (whose pitch must be very small to allow the engine, in case of need, to reach the maximum rotation speed) is used to navigate at the economical speed, then the user is forced to maintain an unnecessarily high rotation speed of the engine in relation to the limited power required. High rotation speed means high shaft horsepower. As a result, the user is forced to navigate with a shaft horsepower considerably higher than the power required to navigate at the economical speed. This results in a considerable energy waste due to the so-called no-load consumption that is identified with mechanical losses.

In other words, the fixed-pitch propeller, as known, is sized so as to have its ideal conditions of maximum efficiency when the engine rotates at the maximum speed, that is when the maximum shaft horsepower and the maximum navigation speed are obtained. Only in this situation the fixed-pitch propeller is able to turn the entire available power into thrust. By reducing the rotation speed of the engine, the curve of the power that the fixed-pitch propeller is able to turn into thrust decreases faster than the decrease of the fuel consumption curve. Therefore, at low rotation speeds, the fixed-pitch propeller is able to turn into thrust (and therefore into longer path) only a part of the shaft horsepower, the residual part is dispersed in the form of heat. On the contrary, if the propeller object of the present patent application is properly adjusted, it can turn into thrust (and thus into longer path) the entire shaft horsepower at any rotation speed. To give an idea of what are the obtainable values of cruising range it should be noticed that, when navigating with an ideal propeller at a speed of 50% the maximum speed, a purely theoretical cruising range is obtained that is four times greater than the range obtained by navigating at the maximum speed. In fact, as known, during navigation Newton's law is valid, i.e. the resistance opposing the advancement of a boat increases with the square of the navigation speed, as a result the driving power required to navigate will increase in proportion to the cube of the advance speed. Therefore, the power required to navigate at the maximum speed V will be equal to $K \cdot V^3$. The power consumption and therefore the fuel consumption during one hour navigation will be equal to the time of use (1 hour) multiplied by the power used $K \cdot V^3$ i.e. $1 \cdot K \cdot V^3$. On the other hand, by navigating at the economical speed V/2, the power required will be $K \cdot (V/2)^3 = 1/8 \cdot K \cdot V^3$. For traveling the same path the navigation should last 2 hours. Therefore, fuel consumption will be equal to $2 \cdot 1/8 \cdot K \cdot V^3 = 1/4 \cdot K \cdot V^3$, namely will be equal to one fourth of the consumption required navigating at maximum speed. As a result, as stated above, the theoretical cruising range will be four times greater.

Actually, the cruising range generally obtained by navigating at the economical speed with a fixed-pitch propeller is about twice the range obtained by navigating at maximum speed. On the other hand, in the same conditions, by using the propeller object of the present patent application suitably sized and adjusted, a cruising range three times greater can be obtained.

The necessary adjustment to obtain the economical navigation mode will be carried out on the new propeller in the following way. The cruising pitch required to obtain the economical navigation mode (a pitch having a fairly high value) will be calculated so as to comply with the constraints i. and ii. It can be noted that said calculation is simple because the value of the pitch is given by the ratio between the navigation speed and the rotation speed of the propeller. As seen, the two speeds are known. The initial cruising pitch will then be set on the propeller using the means 200. Next, by using the available means 30, the preload of the elastic element will be adjusted and set so as to comply with the constraint iii. Also the preload adjustment is very simple and will be carried out by successive approximations.

The economical navigation mode described heretofore obviously represents the borderline case, which occurs when the user needs to travel long distances without the possibility of fuel supply, which means that the main request is to be able to have a cruising range as great as possible.

It should be noted that the same procedure followed so far to obtain the economical navigation mode may also be used in all other cases in which the user needs to navigate with a cruising speed different from the economical one. In any case, by varying the cruising speed (which usually is required to be greater than the economical one, i.e. greater than the one at the maximum range limit), a cruising range clearly higher than the one allowed by the fixed-pitch propeller will be always obtained in any case, with the same cruising speed selected. In calculating the adjustment and tuning of the propeller object of the present patent application, the limit value must be only and simply replaced by the new economical speed value required by the user.

Table I at the end of this description shows the comparison of the results that may be obtained on the same boat by using a fixed-pitch propeller or the propeller according to the invention, in navigation conditions that are most likely to be required-preferred by the user. The reported shaft power are the real ones provided by the engine manufacturer, the maximum speed pitch corresponds to a blade tilt=20°, the cruising pitch to a blade tilt of 32°, and begins to decrease at a navigation speed of about 6.5 knots. It should be noted that in the case described in Table I, in order to navigate with the economical navigation mode, the cruising pitch must be 47°. This result is obtained in the following way: the economical navigation speed is 4.5 knots or, as previously illustrated, equal to half the hull speed that is equal to 9 knots in the case analyzed in Table I. At this speed, the power required for the navigation is 13 HP. Therefore, in order to navigate in economical mode, a shaft power of 13 HP must be obtained so that the power loss is 0 HP. In the case considered herein, the shaft power of 13 HP is obtained by rotating the engine at 800 revolutions per minute (RPM). The blade pitch allowing a speed of 4.5 knots at 800 RPM to be obtained is 47°, i.e. RPM=800=(4.5.20): (0.00237.47).

As mentioned, the economical navigation mode is an extreme situation hardly ever used in practice. This mode can be used as benchmark to help the user to choose.

For the sake of completeness it should be noted that, obviously, the advantages given by the new propeller are not only the important fuel saving, but with the navigation at lower rotation speed of the engine many other advantages are provided, such as less wear and thus longer life and less maintenance operations for all the elements in motion, a more pleasant navigation with less noise, vibration reduction, etc.

Furthermore, it should be noted that in practice it is fairly likely that the boat is equipped with sail and during the powered navigation the user decides to obtain the thrust also through the sail. Under these conditions, thanks to the high cruising pitch allowed by the new propeller compared to the smaller fixed pitch of the traditional small propeller, a real thrust cooperation between the two types of propulsion can be obtained. In fact, thanks to the combined action of sail and high pitch of the propeller, the engine is able to turn its power (energy) into a significant increase of cruising range while minimizing waste.

In such conditions of combined action, the use of the new propeller with respect to the use of the fixed-pitch propeller allows the achievement of advantages even larger than the considerable advantages described up to now and achieved by using the new propeller instead of the fixed-pitch propeller under conditions of navigation only powered by engine.

In particular, the method of using the propeller can comprise the step of setting, by subsequent modifications (subsequent approximations) and then gradual modifications, the first fluid dynamic pitch preferably through the means 200, and/or the preload of the elastic element 8, preferably through the means 30.

By doing so, the user can come gradually closer to the optimal propeller operation, in terms of first selected fluid dynamic pitch and in terms of beginning of the deformation of the elastic element for modifying the pitch, most suitable for his/her needs.

As previously seen, thanks to the action of the preloading device, it is possible to make sure that the initial pitch remains constant (without decreasing) as the propeller rotation speed increases, until reaching the cruising speed. In the known art, where the preloading device was not available, the value and range of the rotation speed within which the pitch is kept constant were neither obtainable nor adjustable. In fact, if the elastic element (8) for adjusting the fluid-dynamic pitch is not preloaded, the same starts to compress already from the beginning of the rotation (as soon as the engine is started) and the pitch immediately begins to decrease. Therefore, to obtain a sufficiently high pitch during the cruising navigation, the initial pitch was to be set unnecessarily and disadvantageously high, thereby resulting in maneuvering difficulty. The user was forced to find a compromise solution. The preloading device allowed the reduction/removal of this drawback. Thanks to this device, an initial range can be obtained in which the pitch remains constant as the rotation speed increases. At low rotation speed, said constant pitch will be sufficiently low so as to allow rapid maneuvers, furthermore at medium speed it will be sufficiently high so as to allow good propeller efficiency during the cruising navigation. By doing so, at low-medium rotation speed, the propeller will operate as a fixed fluid dynamic pitch propeller. Only when the rotation speed exceeds the cruising speed, the pitch will start to decrease until reaching its minimum value.

Moreover, according to a further aspect of the present invention, the use method allows the simple setting of the cruising pitch and the maximum speed pitch selected by the user as shown in FIG. 2.

The adjusting means 200 are temporarily pulled out of the propeller casing so that the elastic element 8 is excluded from the propeller operation. Under said conditions, the propeller operates as a normal fixed-pitch propeller and therefore it will be easy, by using the adjustment means 40, to check and set, by successive approximations, each of the two pitches complying with the conditions required by the user, as shown in FIG. 2. For example, according to an aspect of the invention the final pitch imposed by the limit stop 40, reached by the hub portion 10a (tooth), can be obtained by removing the adjusting means 200 without causing the elastic element to be deformed.

Therefore, the maximum speed pitch will be left as found and the means 200, whose thickness corresponds to that of the cruising pitch as stated above, will be reassembled. It should be observed that, after setting only the maximum speed pitch by following the procedure described above, the cruising speed pitch may also be set through an alternative procedure, which replaces the one described above.

The user is free to choose whether to adopt this alternative procedure.

Using the means 30, the elastic element 8 completely compresses, thus causing it to lose all elasticity and making it rigid. Subsequently, the means 200 having a thickness meeting the conditions required by the user, are introduced in the propeller by proceeding by successive approximations, for example as shown in FIG. 2.

After setting the two pitches, by following the above described procedures (which are alternative to each other, as mentioned), the preload on the elastic element 8 is decreased by using the means 30, up to a point where the engine is able to reach its maximum rotation speed, by accelerating.

Moreover, the method can comprise the step of setting the fluid dynamic pitch for the reverse-motion navigation. As described before, such a setting can be carried out by acting on the means 25 in order to set the pitch for the reverse motion, or else by acting on the limit stop 41.

Obviously, one procedure excludes the other one. The user can choose the procedure he/she considers most favorable. It can be observed that, in most cases, it is simpler to determine—set the optimal pitch for the reverse motion by acting on the limit stop 41.

The locking means 405, 406 allowing the hub 2 and the cylindrical casing 3 to be reversibly, and thus temporarily, locked in a predetermined relative position, preferably in the relative position in which the blades 4 are arranged in feathered position, will be now described referring to FIGS. 13-16a. It should be noted that, for ease of illustration, in the lower part of FIG. 13 only part of the shafts of the blades 4 is shown in perspective view.

It should be noted that the locking means 405, 406 can be used in combination with, or as an alternative to, the other propeller devices described herein, namely at least one elastic element to bring the blades to the feathered position and/or at least one elastic element for dampening shocks and/or at least one elastic element for adjusting the fluid dynamic pitch and/or together with means to adjust the preload of the elastic element for adjusting the preload.

These locking means 405, 406 prevent the relative rotation between the hub 2 and the cylindrical casing 3 at least in one way, and preferably at least in the way R2 arranging the blades 4 with a propulsive fluid dynamic pitch for the reverse-motion.

Preferably, the means 405, 406 prevent the relative rotation between the hub 2 and the cylindrical casing 3 in both possible ways R1, R2 of such relative rotation, by holding in a substantially stable way, even if reversibly, the cylindrical casing 3 and the hub 2 in the relative position in which the blades 4 are arranged in the feathered position.

The lock caused by the locking means 405, 406 between hub 2 and cylindrical casing 3 is "reversible". In particular, the locking means 405, 406 apply to the relative rotation between the hub 2 and the cylindrical casing 3, a resistance force and particularly a resistant torque.

The application of a propulsive torque (engine torque), typically a torque provided to the hub 2 by the engine, greater than the resistance force (torque) generated by the locking means 405, 406 allows the relative rotation between the hub 2 and the cylindrical casing 3 of the propeller.

More in detail, the propulsive torque has way opposite with respect to the resistant torque and strength greater than a given threshold value (preferably corresponding to the resistant torque generated by the locking means), overcomes the action of the locking means 405, 406, that is to say it allows relative rotation between the hub 2 and the cylindrical casing 3 away from the relative position in which the blades 4 are arranged in the feathered position.

This threshold value is preferably selected so as to be higher than the external stresses applied to the propeller 1 when the blades 4 are arranged in the feathered position. Therefore, briefly, the locking means 405, 406 prevent the rotation of the hub 2 with respect to the cylindrical casing 3 of the propeller, by resisting possible forces applied to the propeller when the blades are arranged in the feathered position, but allow the relative rotation between the hub 2 and the cylindrical casing 3 of the propeller when the engine is started and the hub 2 is rotated.

According to a possible embodiment and as shown in FIGS. 13-16a, the locking means 405, 406 comprise at least one movable element 405, preferably a pin movable along its own axis, cooperating with at least one locking surface 406 at least partially contacted by the element.

It should be noted that the movable element 405 may be arranged on the hub 2 and the locking surface 406 may be arranged on the cylindrical casing 3 of the propeller (as shown, for example, in the embodiment of FIGS. 13, 15, 16, 16a) or vice versa (as shown, for example, in the embodiment of FIG. 14). It should also be noted that the movable element 405 and the locking surface 406 may be arranged on elements, for example a ring 415 (shown in FIG. 13), which are rotationally constrained, respectively, to the cylindrical casing 3 of the propeller and the hub 2, or vice versa. The ring 415 is rotationally constrained to the cylindrical casing 3.

Generally, the movable element 405 engages the locking surface 406 when the cylindrical casing 3 and the hub 2 are in the relative position in which the blades 4 are arranged in the feathered position.

Advantageously, the movable element 405 can move between a position in which it engages, i.e. at least partially contacts, the locking surface 406 in order to allow the blades to be locked in a feathered configuration, and a position of disengagement from the locking surface 406.

In particular, the movable element applies a resistance to the transfer (displacement) from the engagement position to the disengagement position, so as to allow the mentioned "reversible" locking of the relative rotation between the hub 2 and the cylindrical casing 3. In particular, thanks to the resistance against the movement (displacement) of the movable element 405, the blades 4 can be kept in the feathered position when the forces acting between the hub 2 and the cylindrical casing 3 do not overcome the resistance of the movable element 405, and vice versa.

Preferably, elastic means 407 (shown in FIGS. 13-16*a*) comprising for example a spring and adapted to maintain the movable element 405 in a position of engagement with the locking surface 406, are provided.

Generally, when the engine imposes to the propeller 1 such an engine torque as to overcome this resistance generated by the elastic means 407, the movable element 405 will be moved to the position of disengagement from the locking surface 406, by overcoming the resistance of the elastic means 407 and allowing the hub 2 to rotate with respect to the cylindrical casing 3 of the propeller, or vice versa.

In this regard, the movable element 405 can be provided with at least one inclined surface 405*a* at the portion designed to engage with the locking surface 406, in order to facilitate the disengagement between the movable element 405 and the surface 406 itself, when the engine imposes an engine torque to the propeller. In addition, or alternatively, as better explained hereinafter, the locking surface 406 can be in turn partially or entirely inclined.

The inclination angle is preferably less than 90° with respect to the straight line tangent to the direction of relative sliding between the hub 2 and propeller 3, at the movable element 405.

A substantially rigid movable element 405 stressed by elastic means 407 has been previously described. In addition (or alternatively), the movable element 405 can be only partially movable; for example it can have an elastically deformable portion.

The locking surface 406 can have different configurations according to some possible embodiments.

In general, the locking surface 406 intercepts the movable element 405 at the relative position between the hub 2 and the cylindrical casing 3 causing the blades 4 to be arranged in feathered position.

In a first embodiment shown in FIGS. 13, 14 and 15, the locking surface 406 is arranged on a protrusion of the cylindrical casing 3 or the hub 2 (or in general on the element of the propeller not having the movable element 405 rotationally integral therewith).

As previously mentioned, the locking surface 406 is preferably inclined whereby, when the engine applies to the hub 2*a* torque oriented so as to push the movable element 405 against the locking surface 406 and having strength higher than a given threshold value, the movable element 405 can slide on the locking surface 406 and disengage therefrom.

In other words, thanks to the inclination of (at least part of) the surface 406 (and/or the surface 405*a*), the engagement between the movable element 405 and the locking surface 406 generates a torque resisting the relative rotation between the hub 2 and the cylindrical casing 3 and having a value lower than the torque that may be provided by the engine.

In different embodiments, for example those shown in FIGS. 16 and 16*a*, there are at least two locking surfaces 406*a*, 406*b*, preferably arranged so as to face each other. Preferably, the locking surfaces 406*a*, 406*b* form a seat 408 for the movable element. The engagement between the movable element 405 with one of the locking surfaces 406*a*, 406*b*, applies a torque resisting the relative rotation between the hub 2 and the cylindrical casing 3. Similarly to what previously mentioned, a torque (typically provided by the engine) having strength higher than a given threshold value (preferably corresponding to the resistant torque applied by the locking means), counters the action of the resistant torque and disengages the movable element 405 from the locking surface 406*a* or 406*b*, thereby allowing again the relative rotation between the hub 2 and the cylindrical casing 3.

According to an aspect of the present invention, the locking surface 406 can be formed on a recessed portion, such as for example shown in the embodiment of FIG. 16 in which the locking surfaces 406*a*, 406*b* are obtained without protruding from the cylindrical casing 3.

In a possible variation shown in FIG. 16*a*, the seat 408 is obtained so as to at least partially protrude from the hub 2.

It should also be noted that at least one guiding surface 408*a*, 408*b* for cooperating with the movable element 405 may be provided so as to deform the latter, before the engagement between the movable element 405 and at least one locking surface 406, 406*a*, 406*b*.

Preferably, therefore, the guiding surfaces 408*ah*, 408*b* are connected to a locking surface 406, 406*a*, 406*b*, or arranged near the same.

According to an aspect of the present invention, one or more movable elements 405 and the at least one respective locking surface 406 are arranged in such a way as to prevent the undesired engagement of the movable element 405 with the locking surface 406 during the normal operation of the propeller in which the hub 2 and the cylindrical casing 3 of the propeller are rotated relative to one another to cause the fluid dynamic pitch of the blades to be changed. More in detail, the movable elements 405 and the locking surfaces 406 are arranged angularly spaced out with respect to each other so that during the relative rotation between the hub 2 and the cylindrical casing 3 of the propeller for the modification of the fluid dynamic pitch (in both forward motion and reverse motion), the propeller is not locked by said locking means 405, 406.

Additionally, it should be noted that in further possible embodiments the movable element 405 is movable in a direction substantially parallel to the rotation axis A of the propeller 1, such as illustrated in FIG. 13.

However, other embodiments in which the movable element is radially movable with respect to the rotation axis A, as shown for example in FIG. 14, or in any case is inclined (i.e., not parallel) with respect to said axis A, are not excluded.

Furthermore, according to an aspect of the present invention, the movable element is provided with one or more inclined surfaces preferably inclined so as to match the locking surfaces with which they must cooperate.

According to a further aspect, the movable element 405 cooperates with a positioning screw 410 which adjusts the maximum travel of the movement of the movable element 405. Furthermore, the screw 410 advantageously restrains the movable element by limiting the rotation of the movable element about its own axis, i.e. it allows the proper alignment and the adaptation of the surface of the movable element to the locking surface to be kept, while preventing the movable element itself from over rotating and thus allows the proper alignment with the locking surface 406 to be kept. At least one groove (seat) is obtained in the head of the screw 410 (as described for example in Patent Application WO2014/102559) for inserting the locking grub screw 411 in the designated groove (seat). Thanks to this system it is possible to adjust the travel of the movable element 405 and the size of the projection of such movable element from its seat.

As above mentioned, the elastic element 8, 8', 8" of the propeller according to the present invention comprises, according to a preferred embodiment, a flat spring 100 according to the present invention.

What above described referring to the elastic element 8, 8', 8" can refer to the spring 100 according to the invention, which will be described hereinafter.

With reference to the attached FIGS. 4-8a, a spring 100 according to the present invention is a flat spring. By this expression is meant that the spring has a substantially flat body 102, i.e. a body having a dimension smaller than the other two.

In particular, the spring 100 is preferably obtained from a metallic flat body 102, within which notches 103 are obtained.

The flat body 102, and thus the spring 100, has longitudinal development line MS and the notches 103 are substantially transversally arranged with respect to the longitudinal development line MS, hereinafter also named simply MS.

As previously described, by "longitudinal development line" is meant a portion of straight line ideally drawn on the spring 100, in particular on the flat body 102 of the spring 100 and parallel to the main dimension of the spring 100.

As shown in FIG. 4, when the spring 100 is arranged in planar configuration, the line MS coincides with a portion of straight line.

On the other end when the spring is bent, as can be seen for example in FIG. 4b, the line MS is integrally deformed with the spring itself, thereby forming a curve. In FIG. 4a for illustrative purposes, the line MS is shown slightly spaced from the spring 100, however the line MS is actually integral with the body 102 of the spring 100.

The arrangement and shape of the notches define the elastic modulus of the spring 100. As mentioned, according to an aspect of the present invention, the notches 103 are different from each other and/or are arranged irregularly on the spring 100. Preferably, the notches 103 are arranged alternately to one another along the longitudinal development line MS.

In other words, preferably the notches 103 are formed on the flat body 102 by cutting it alternately on opposite sides of the flat body 102.

These notches are preferably straight and perpendicular to the longitudinal development line MS. Alternative shapes are however possible.

Figure 7:
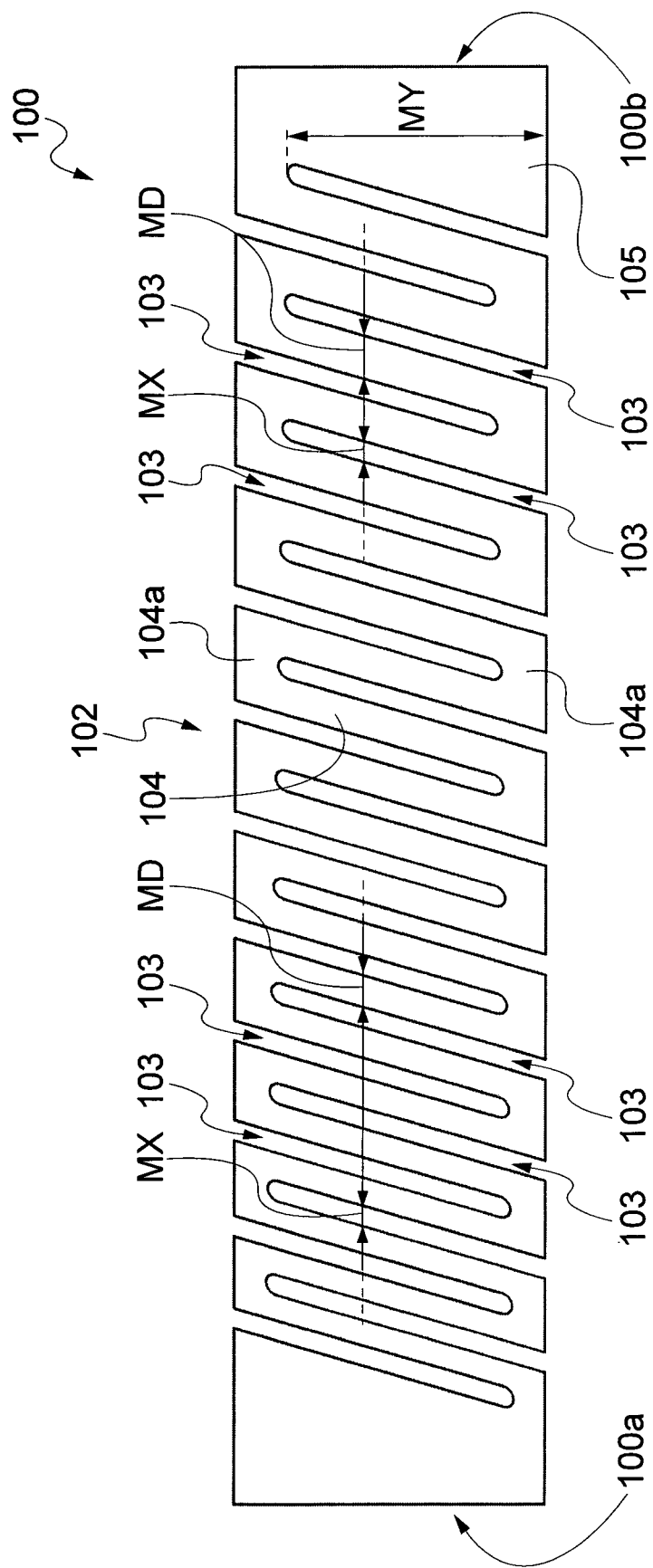
FIG. 7 is another possible embodiment of the spring according to the present invention, in which the notches are inclined with respect to the longitudinal development line.

For example, FIG. 7 shows an embodiment of the present invention in which the notches 103 are straight but not perpendicular to the development direction MS.

In general, the spring 100 is partitioned into a plurality of elements arranged in series along the development direction MS, here and in the following named "intermediate portions 104 of the spring 100".

In particular, an "intermediate portion 104 of the spring 100", or strip, is a spring segment comprised between two successive notches 103.

Typically, the intermediate portions 104 of the spring 100, in the following also "intermediate portions 104", are defined on two opposite sides by different notches 103 and are connected by connecting portions 104a, which join an intermediate portion 104 to the successive or preceding intermediate portion 104 along the development line MS.

In general, the shape of the intermediate portions 104 determines the elastic response of the spring 100 and, in particular, determines the elastic modulus of the spring 100.

The shape of the intermediate portions 104 depends on the shape and arrangement of the notches 103 made on the leaf 102 during the manufacturing of the spring 100.

As a result, the elastic response of the spring 100 directly depends on the shape and arrangement of the notches 103.

Therefore, by changing dimension(s) and/or position of the notches 103, a spring 100 with the desired elastic response can be made, in particular a spring 100 having variable elastic modulus, preferably variable along the longitudinal development line MS, so as to counter the above described effects of friction.

Figure 5:
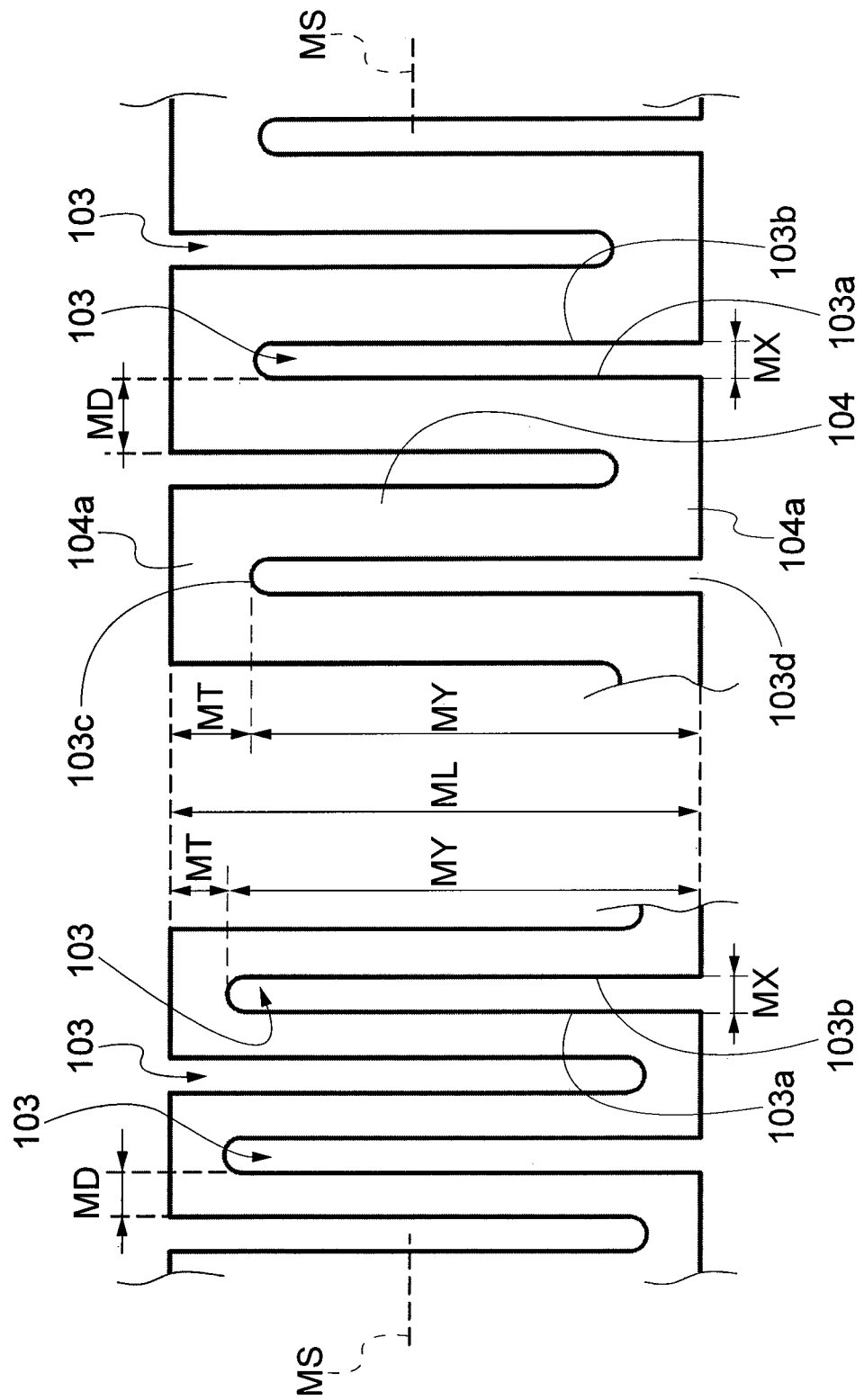
FIG. 5 is a magnified and broken-up view of the spring of FIG. 4.

In particular, the Applicant found that it is preferable to act on three parameters, namely length MY of the notches 103, width MX of the notches 103, distance MD between successive notches (all depicted in FIG. 5).

Variation of additional parameters of the notches 103, such as the notch profile, the notch direction, etc., falls nevertheless within the object of the present invention.

In general, as mentioned, according to the present invention the notches 103 are at least partially different from each other, and/or are differently spaced from each other.

The length MY of the notches 103 is measured along a direction perpendicular to the longitudinal development line MS and measures the distance between two opposite ends 103c, 103d of the notches 103.

The length MY of the notches 103 in particular defines the thickness MT of the connecting portion 104a of the intermediate portion 104. In more detail, the thickness MT of the connecting portion 104a is equal to the difference between the width ML of the leaf 102, i.e. the dimension perpendicular to the longitudinal development line MS, and the length MY of the notches.

The connecting portion 104a is the portion of the intermediate portion 104 which undergoes the greatest deformation during the operation of the spring 100. As the length MY increases (and thus the thickness MT of the connecting portion 104a decreases), the deformation resistance of the respective intermediate portion 104 decreases. In other words, by increasing the length MY of a notch 3, the elastic modulus of the spring 100 at this notch 103 is increased.

A further method to verify the variation of the length MY between different notches 103 consists in verifying if there is a line parallel to the longitudinal development line MS of the spring 100, which intersects only part of the notches 103 obtained on the same side of the body 102 of the spring 100. In particular, if there is such a line, at least two notches 103 have length different from one another.

The width MX of a notch 103 is the distance between two edges 103a, 103b of the notch, measured along a direction coincident with, or anyway parallel to, the longitudinal development line MS.

In order to evaluate the variation of width MX between the various notches 103, the width X of different notches is measured along the same line which is coincident with, or in any case at least parallel to, the longitudinal development line MS of the spring 100, as above described.

In a similar manner, the distance MD between two successive notches 103 is the distance between two facing edges of two successive and different notches 103.

In order to evaluate the variation of width MD between consecutive notches 103, the distance MD between consecutive notches 103 is measured along the same line which is coincident with, or in any case at least parallel to the longitudinal development line MS of the spring 100.

It should be noted that the measurement of the distance MD coincides with the measurement of the width of the intermediate portions 104.

On the other hand, the width of the connecting portion 104a is a function of both the distance MD between successive notches and the width MX of the notches 103. In view of the above, a greater width of the connecting portion 104a results in a greater deformation resistance of the spring 100 at such connection portion, that is a decreased local elastic modulus of the spring 100.

Figure 8:
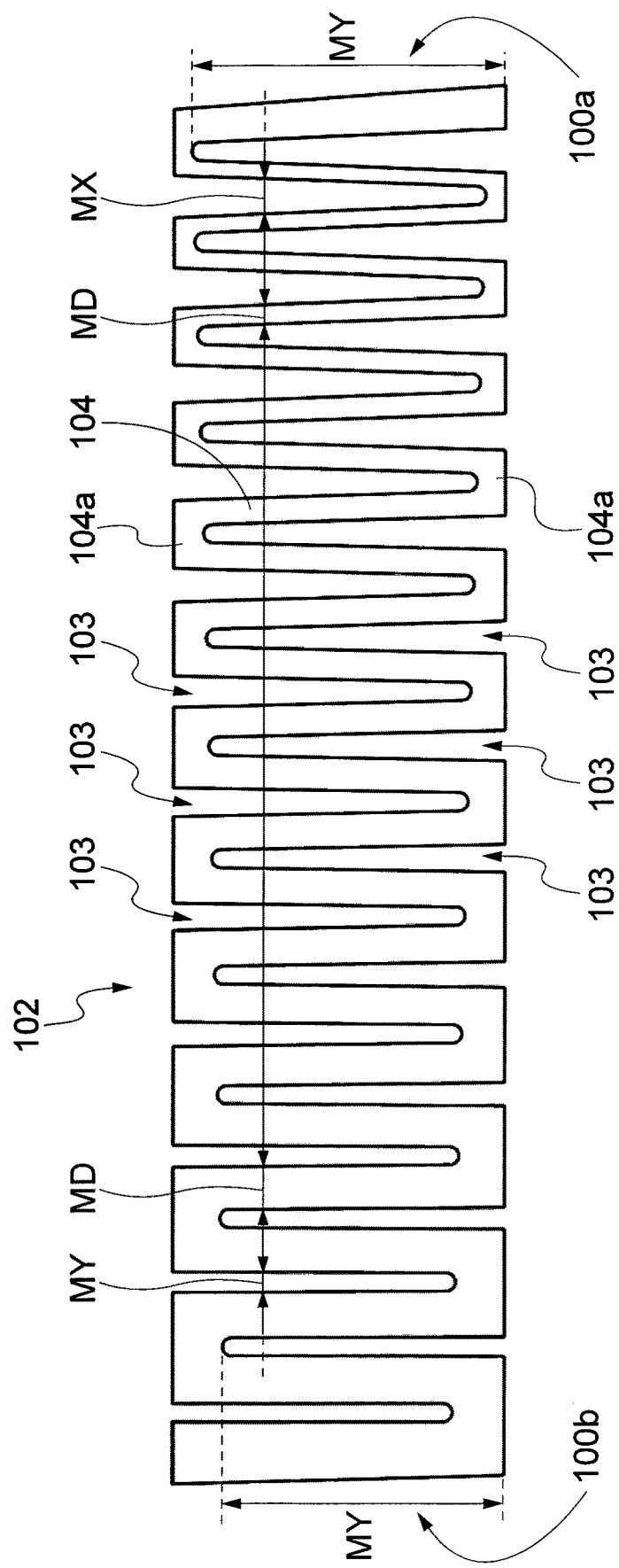
FIG. 8 is another possible embodiment of the spring according to the present invention, in which the notches are shown as having width variable along the length extent of the notch.
Figure 8A:
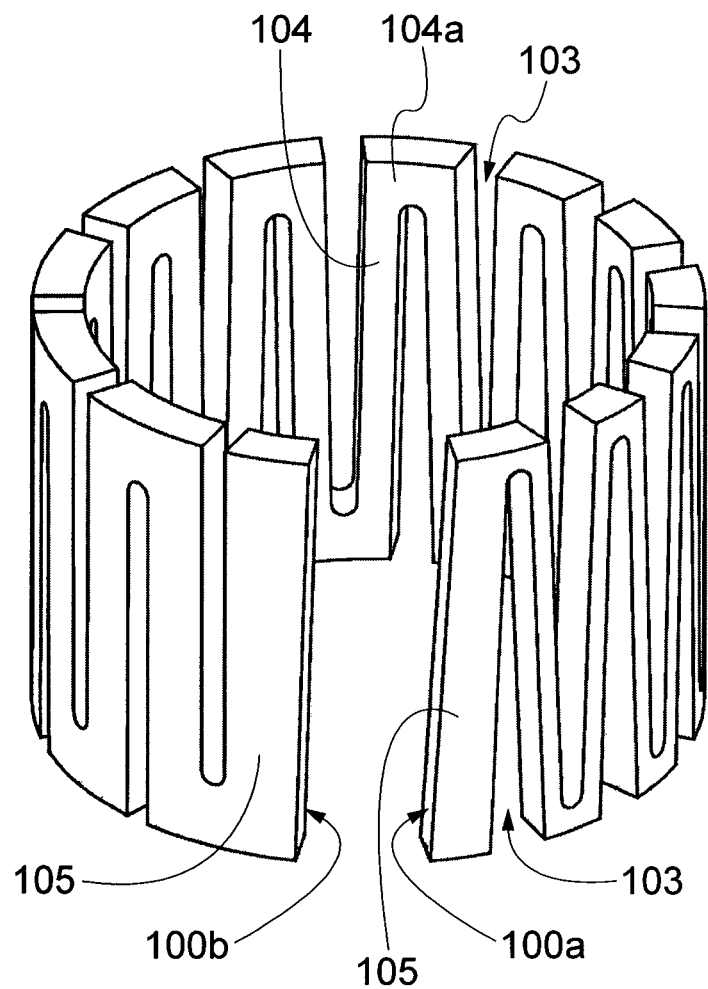
FIG. 8a are perspective view of the spring according to FIG. 8, the latter being bush bent.

In the embodiments shown in the attached FIGS. 4-7, among different notches two parameters vary, in particular the length MY and the distance MD of the notches 103. However, the width MX of the notches 103 is substantially the same for all the notches 103. An embodiment in which from one notch to another also the width MX varies is shown in FIG. 8, as better discussed in the following.

Referring to FIGS. 3-7, the distance MD increases along a way of the development direction MS, which in the figures is directed from left to right.

On the other hand, the length MY increases along a way of the development direction MS, which in the figures is directed from right to left. As a result, the thickness MT of the connecting portions 104a increases along a way of the development direction MS, which in the figures is directed from left to right, i.e. the way along which the distance MD among the various notches 103 increases.

In more detail, it should be noted that these quantities strictly increase, i.e. are different for all the notches 103 and continuously increase along the respective way of the longitudinal development line MS.

Therefore, the elastic modulus of the spring 100 decreases along a way, directed from left to right in figures, of the development direction MS.

Thanks to this feature the influence of the frictions acting on the spring 100, which could cause a not controlled and not known a priori deformation of the spring 100 itself, can be reduced. In particular, during the deformation of the spring 100 according to the present invention, the spring portions having higher elastic modulus tend to deform before the spring portions having lower elastic modulus.

Referring for example to the spring 100 of FIG. 4, it always tends to deform from left to right. In other words, considering for example a force compressing the spring 100, the intermediate portions of the spring 100 positioned on the left are compressed before the intermediate portions of the spring 100 positioned on the right.

Assuming that there is friction in the spring seat 100, for example greater friction at left portion in the spring 100 shown in the figures, it is possible to shape the spring 100 so that the deformation resistance of the intermediate portions of the spring 100 placed on the left summed to the friction action is still less than the deformation resistance provided by the intermediate portions of the spring 100 placed on the right in the spring 100.

On the contrary, springs of the known art are not able to give such a response due to their elastic modulus which is substantially unchanged along the whole length of the spring 100.

Various alternative embodiments, not shown, are possible. For example, it is possible to vary only one of the parameters MX, MY, MD or, alternatively, different combinations of these parameters.

Moreover, further parameters such as shape, direction, etc. of the notches can be varied in place of or in addition to the parameters MX, MY, MD.

For example, in the embodiment of FIG. 8, all three parameters MX, MY e MD change among different notches. Additionally, the shape of the various notches is different. In particular, some notches (placed on the left in the figure) have substantially a single value MX of constant width along the whole length MY of the notch itself, while other notches 103 (placed on the right in the figure) have variable width along their own length MY.

Moreover, an embodiment in which these parameters vary in strictly increasing way was described.

It is not excluded that a parameter of the notches 103 varies in simply increasing way, namely with some parameters unchanged among different notches. For example, the length MY of the notches could be changed every three notches, that is according to a stepped change.

Additionally, in some embodiments it is possible that the parameters vary alternately in increasing and decreasing ways, depending on the operational requirements of the spring 100.

According to an aspect of the present invention, at the two ends of the spring 100 there are contact portions 105 adapted to couple with external elements able to operate the spring.

These contact portions 105 may have different shapes, depending on the requirements imposed by such external elements.

In a first embodiment shown in FIG. 4, these portions are substantially shaped as the intermediate portions 104 of the spring and have dimensions similar to the intermediate portions 104 adjacent to the contact portions 105 themselves.

Figure 6:
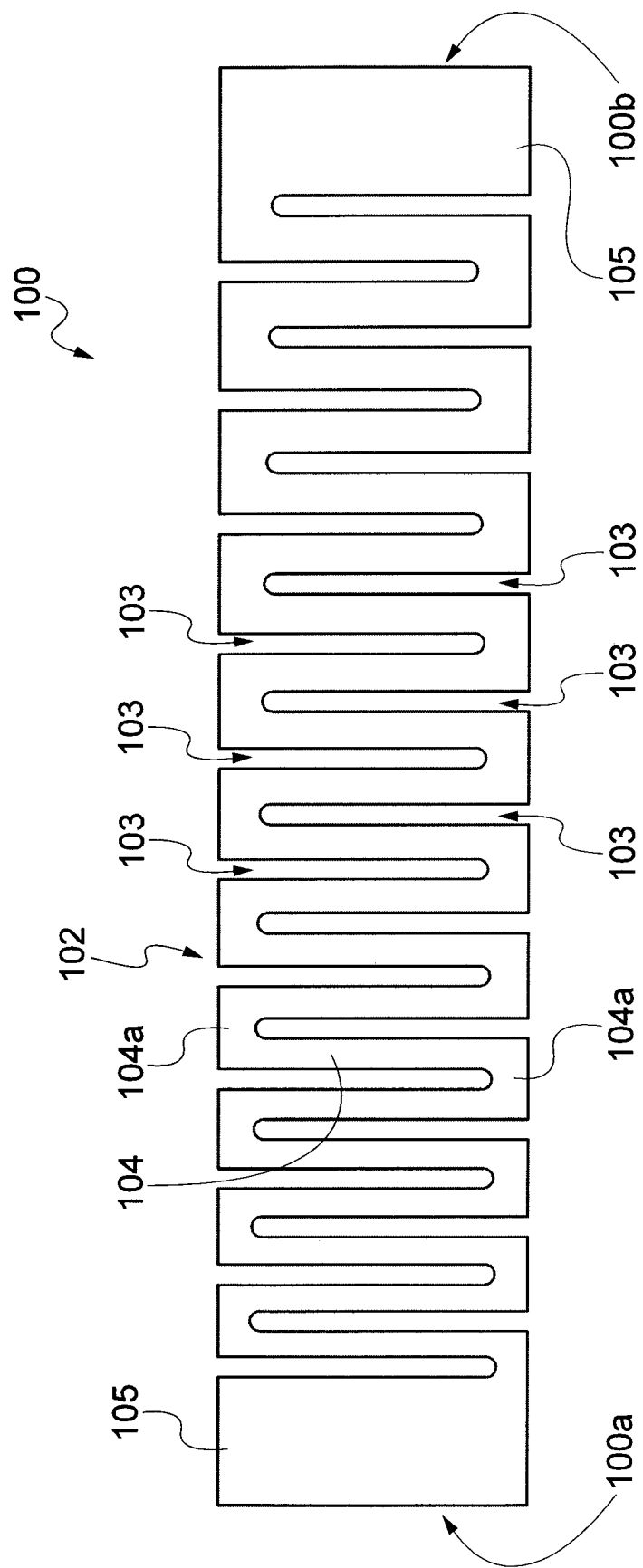
FIG. 6 is another possible embodiment of the spring according to the present invention, provided with contacting portions having greater size.

In an alternative embodiment shown for example in FIG. 6, the contact portions 105 have greater dimensions with respect to the intermediate portions 104 of the spring 100. In particular, the contact portions 105 have width measured along a direction parallel to the longitudinal development line MS, greater than the width of the intermediate portions 104 adjacent to the portions 105 themselves.

According to an aspect of the present invention, the thickness MT of the connecting portions 104a of an intermediate portion 104 is smaller than the width of the body 104a of the same intermediate portion of the spring 100.

In other words, per every pair of notches, the difference between the width ML of the leaf and the length MY of at least one of the two notches, as measured perpendicularly to the longitudinal development line, is greater than the distance MD between the two notches 103 of the pair.

Advantageously, the flat spring 100 having variable elastic modulus, according to the present invention, in combination with the means 30 for adjusting the preload, as described above, allows a considerable increase of efficiency of the propeller during its operation.

In particular, it should be noted that the means 30 for adjusting the preload act on the spring 100 directly or indirectly, preferably at the portions of the spring 100 with higher elastic modulus, i.e. at the portions of the spring 100 deforming before other spring portions, the applied force being equal.

As previously described, these portions typically have the intermediate portions 104 with a smaller dimension (i.e. thinner strips). In other words, these portions typically have notches 103 with greater length MY and/or width MX, and/or pairs of notches 103 arranged at smaller distance MD.

The means 30 for adjusting the preload allow to set the operation range of the spring 100, i.e. they allow to lay down when the spring will be operated with its deformation in order to modify the fluid dynamic pitch of the blades.

In particular, as described above referring to the elastic element 8, by modifying the preload it is possible to determine at which resistant torque opposing the propeller rotation, and then also at which engine operating conditions and in particular at which engine rotation speeds, the spring 100 will begin to deform and then it allows the modification of the fluid dynamic pitch for the high-speed navigation.

The means 30 for adjusting the preload of the spring 100 can modify the space S available for its extension, i.e. the space inside which the spring 100 is housed.

As shown in FIG. 1b, the space S is defined by two abutting surfaces 7a and 7b for the abutment of the ends 100a and 100b of the spring 100 and therefore such means 30 can change the position of at least one abutting surface preferably at the end of the spring 100 in which the distances MD among notches 103 and/or the different shape of the notches 103 allow/s higher elastic modulus to be obtained with respect to the other portions of the spring 103.

For this reason, the spring 100 is progressively deformed. In other words, the spring 100 is initially deformed at the areas with higher elastic modulus thereby defining an efficient and accurate adjustment of the fluid-dynamic pitch.

Thanks to the means 30 for adjusting the preload acting on the spring 100 preferably at the portions of the spring 100 having higher elastic modulus, it is possible to ensure that, during the deformation of the spring 100, the initial deformation always occurs at the portion of the spring 100 where the preload is applied, so that the preload itself is effective.

The invention claimed is:

1. A propeller (1) comprising a cylindrical casing (3), a hub (2) couplable to an engine and rotatably mounted at least partially in said cylindrical casing of the propeller, and at least one blade (4) rotatably pivoted to said cylindrical casing of the propeller, said hub (2) being rotatable with respect to said cylindrical casing of the propeller, or vice versa, to adjust the fluid dynamic pitch of said at least one blade (4), the propeller further comprising at least one elastic element (8) interposed between said hub (2) and said cylindrical casing (3) in a space (S) having an annular shape for adjusting the fluid dynamic pitch of said at least one blade, characterized in that said at least one elastic element (8) is preloaded to prevent its deformation until a resistant torque opposing the propeller rotation is lower than a torque generated by the preload of said at least one elastic element (8), said at least one blade being arranged on at least one first fluid dynamic pitch before the deformation of said at least one elastic element (8) begins, characterized by comprising means (30) for modifying the preload of said at least one elastic element (8), wherein said means (30) for modifying the preload of said elastic element (8) comprise at least one element, at least partially threaded, for the installation in at

TABLE I

Boat: Sun Odyssey 52.5 - Engine: Yanmar 4JH3-HTE 100 HP - Reduction ratio 2.45:1

PROPELLER WITH FIXED PITCH = 20°

| NAVIGATION SPEED (KNOTS) | POWER REQUIRED FOR NAVIGATION (ALL THE CONSUMED FUEL IS TURNED INTO BOAT THRUST (USED HP = 0.137 $V^3$) | TORQUE OPPOSING THE PROPELLER ROTATION (Nm = 5.4 $V^2$) | PITCH (DEGREES) | ENGINE REVOLUTIONS PER MINUTE (RPM = KNOTS/0.0024) | SHAFT POWER (AVAILABLE HP) | POWER NOT USED FOR NAVIGATION (THE ROTATION SPEED OF THE ENGINE IS UNNECESSARILY HIGH. PART OF THE FUEL CONSUMPTION IS TURNED INTO HEAT AND IS DISPERSED) (LOST HP) |
|---|---|---|---|---|---|---|
| 3 | 3.7 | 48 | 20° | 1250 | 20 | 163 (20-3.7) |
| 4 | 8.7 | 86 | 20° | 1660 | 35 | 263 (35-8.7) |
| 5 | 17.1 | 135 | 20° | 2080 | 58 | 40.9 (58-17.1) |
| 6 | 29.7 | 194 | 20° | 2500 | 80 | 50.4 (80-29.6) |
| 7 | 47.0 | 265 | 20° | 2910 | 94 | 47.0 (94-47.0) |
| 8 | 70.1 | 345 | 20° | 3330 | 99 | 28.9 (99-70.1) |
| 9 | 100.0 | 440 | 20° | 3800 | 100 | 0.0 (100-100.0) |

PROPELLER ACCORDING TO THE INVENTION WITH CRUISING PITCH = 32°

| NAVIGATION SPEED (KNOTS) | PITCH (DEGREES) | ENGINE REVOLUTIONS PER MINUTE (RPM = KNOTS*20/ 0.00237*PITCH) | SHAFT POWER (AVAILABLE HP) | POWER NOT USED FOR NAVIGATION (THE ROTATION SPEED OF THE ENGINE IS UNNECESSARILY HIGH. PART OF THE FUEL CONSUMPTION IS TURNED INTO HEAT AND IS DISPERSED) (LOST HP) |
|---|---|---|---|---|
| 3 | 32° | 800 | 13 | 93 (13-3.7) |
| 4 | 32° | 1050 | 17 | 83 (17-8.7) |
| 5 | 32° | 1300 | 24 | 6.9 (24-17.1) |
| 6 | 32° | 1560 | 33 | 3.4 (33-29.6) |
| 7 | 30° | 1940 | 50 | 3.0 (50-47.0) |
| 8 | 28° | 2370 | 72 | 1.9 (72-70.1) |
| 9 | 20° | 3800 | 100 | 0.0 (100-100.0) | least one seat (31) comprising at least one threaded portion (31a) and wherein said means (30) for modifying the preload of said elastic element (8) modify the space (S), having an annular shape, available for the extension of said elastic element (8).

2. The propeller according to claim 1, characterized in that said at least one blade is arranged on at least one first fluid dynamic pitch before the deformation of said at least one elastic element (8) begins.

3. The propeller according to claim 1, wherein said at least one blade is arranged on at least one first fluid dynamic pitch following the rotation according to a first rotation way (R1) of said hub (2) with respect to said cylindrical casing (3) of the propeller in an angular range (α) of free rotation of said hub (2) with respect to said cylindrical casing (3) of the propeller.

4. The propeller according to claim 3, characterized by comprising means (200) for setting said first fluid dynamic pitch before the deformation of said at least one elastic element (8) begins, said means (200) for setting said first fluid dynamic pitch modifies the size of said angular range (α) of free rotation of said hub (2) with respect to said cylindrical casing (3) of the propeller in said first rotation way (R1) of said hub (2) with respect to said cylindrical casing (3) of the propeller, said means (200) comprise at least one insert (200) to modify the size of the angular range (α) of free rotation of said hub (2) with respect to said cylindrical casing (3) of the propeller.

5. The propeller according to claim 1, wherein, when the resistant torque opposing the propeller rotation is higher than the torque generated by the preload of said at least one elastic element (8), said at least one elastic element is deformed and adjusts the modification of the fluid dynamic pitch of said at least one blade.

6. The propeller according to claim 1, wherein said means (30) for modifying the preload of said at least one elastic element (8) modify the position of at least one abutting end (7a) for at least one end (8a) of said at least one elastic element (8).

7. The propeller according to claim 1, said means (30) for modifying the preload of said at least one elastic element (8) comprising the at least one element extending through said cylindrical casing of the propeller.

8. The propeller according to claim 1, wherein said means (30) for modifying the preload of said elastic element (8) temporarily exclude said at least one elastic element (8) from the propeller operation.

9. The propeller according to claim 1, characterized by comprising at least one intermediate element (11) interposed between said hub (2) and said cylindrical casing (3) of the propeller,
wherein said at least one intermediate element (11) is provided with a first and a second contacting surfaces (12, 13) contacting said hub (2) which are spaced one from another and define an angular range (α) of free rotation of said hub (2) with respect to said cylindrical casing (3), wherein said at least one elastic element (8) is interposed between said cylindrical casing (3) and said at least one intermediate element (11).

10. The propeller according to claim 1, characterized by comprising at least one limit stop (40, 41) of the rotation of said hub (2) with respect to said cylindrical casing (3) of the propeller in order to set said fluid dynamic pitch of said at least one blade (4) following the rotation according to a first rotation way (R1) and/or a second rotation way (R2) of said hub (2) with respect to said cylindrical casing (2) of the propeller.

11. The propeller according to claim 10, wherein said at least one limit stop (40, 41) is adjustable by at least a second element, at least partially threaded, suitable to be installed in at least one seat (42) comprising at least one threaded portion (42a) to allow the axial displacement of said threaded element in said at least one threaded seat through the rotation of said threaded element, in order to modify, directly or indirectly, the position of said limit stop (40, 41) of the rotation of said hub (2) with respect to said cylindrical casing (3) of the propeller.

12. The propeller according to claim 1, wherein said at least one elastic element (8) is a flat spring (100), said spring having a longitudinal development line (MS) and comprising a plurality of notches (103) transversally arranged with respect to said longitudinal development line, characterized in that at least two distances (MD) between successive notches (103) are different from one another and/or at least two notches (103) have length and/or width different from one another.

13. The propeller according to claim 1, further comprising at least a second elastic element (8' 8") interposed between said cylindrical casing (3) and said hub (2) and designed to generate a torque for the rotation of said hub (2) with respect to said cylindrical casing (3) of the propeller, or vice versa, in at least one predetermined relative position, when said engine imposes a null engine torque to said hub (2).

14. The propeller according to claim 1, characterized by comprising reversible-locking means (405, 406, 406a, 406b) to lock the relative rotation between said hub (2) and said cylindrical casing (3) in at least one rotation way (R1, R2), in correspondence of at least one predetermined relative position.

15. The propeller according to claim 1, further comprising at least a second elastic element (8', 8") directly or indirectly interposed between the cylindrical casing (3) and the hub (2) and sized to eliminate shocks and dynamic stresses between cylindrical casing (3) and hub (2).

16. A flat spring (100) for a propeller according to claim 1, said spring having a longitudinal development line (MS) and comprising a plurality of notches (103) transversally arranged with respect to said longitudinal development line, characterized in that the distance between a first and second successive notch is different than the distance between a second and third successive notch and/or at least two notches (103) have at least width different from one another.

17. A propeller (1) comprising a cylindrical casing (3), a hub (2) couplable to an engine and rotatably mounted at least partially in said cylindrical casing of the propeller, and at least one blade (4) rotatably pivoted to said cylindrical casing of the propeller, said hub (2) being rotatable with respect to said cylindrical casing of the propeller, or vice versa, to adjust the fluid dynamic pitch of said at least one blade (4), characterized by comprising at least one elastic element (8') interposed between said cylindrical casing (3) and said hub (2) in a space (S) having annular shape and designed to generate a torque for the rotation of said hub (2) with respect to said cylindrical casing (3) of the propeller, or vice versa, in at least one predetermined relative position, when said engine imposes a null engine torque to said hub (2), said propeller further comprising means (30) for modifying the preload of said at least one elastic element (8'), wherein said means (30) for modifying the preload of said elastic element (8') comprise at least one element, at least partially threaded, for the installation in at least one seat (31) comprising at least one threaded portion (31a), and wherein said means (30) for modifying the preload of said elastic element (8) modify the space (S), having an annular shape, available for the extension of said elastic element (8).

18. A propeller (1) comprising a cylindrical casing (3), a hub (2) couplable to an engine and rotatably mounted at least partially in said cylindrical casing of the propeller, and at least one blade (4) rotatably pivoted to said cylindrical casing of the propeller, said hub (2) being rotatable with respect to said cylindrical casing of the propeller, or vice versa, to adjust the fluid dynamic pitch of said at least one blade (4), further comprising at least a second elastic element (8' 8") directly or indirectly interposed between cylindrical casing (3) and hub (2) and sized to eliminate shocks and dynamic stresses between cylindrical casing (3) and hub (2), wherein said elastic element (8"), sized to eliminate shocks and dynamic stresses between cylindrical casing (3) and hub (2), is arranged inside the hub (2) by interposing an intermediate element (2') between the hub (2) and a drive shaft, wherein said at least one elastic element (8') is a flat spring (100), said spring having a longitudinal development line (MS) and comprising a plurality of notches (103) transversally arranged with respect to said longitudinal development line, characterized in that the distance between a first and second successive notch is different than the distance between a second and third successive notch and/or at least two notches (103) have at least width different from one another.

19. The propeller according to claim 18, wherein said intermediate element (2') has tubular shape and is integral with the drive shaft.

* * * * *